US012791977B2

(12) United States Patent
Ma et al.

(10) Patent No.: US 12,791,977 B2
(45) Date of Patent: Nov. 10, 2026

(54) LIGHT-EMITTING DEVELOPING CARTRIDGE

(71) Applicant: Zhuhai Ninestar Information Technology Co. , Ltd, Zhuhai (CN)

(72) Inventors: Hailong Ma, Zhuhai (CN); Wenjie Zhao, Zhuhai (CN); Hao Yang, Zhuhai (CN); Xin Lv, Zhuhai (CN); Xiaolong Yang, Zhuhai (CN); Haoli Huang, Zhuhai (CN); Chen Cheng, Zhuhai (CN); Jiming Zhou, Zhuhai (CN); Chaoxing Liu, Zhuhai (CN); Luofa Su, Zhuhai (CN); Xueliang Lv, Zhuhai (CN); Lianjun Wu, Zhuhai (CN); Xiaoming Liang, Zhuhai (CN); Xinyu Wu, Zhuhai (CN); Xianwen Wang, Zhuhai (CN)

(73) Assignee: Zhuhai Ninestar Information Technology Co. , Ltd, Zhuhai (CN)

( * ) Notice: Subject to any disclaimer, the term of this patent is extended or adjusted under 35 U.S.C. 154(b) by 0 days.

(21) Appl. No.: 19/029,043

(22) Filed: Jan. 17, 2025

(65) Prior Publication Data

US 2025/0334921 A1 Oct. 30, 2025

(30) Foreign Application Priority Data

Apr. 25, 2024 (CN) ......................... 202420888093.5
Apr. 30, 2024 (CN) ......................... 202420942586.2
(Continued)

(51) Int. Cl.
*G03G 15/00* (2006.01)
*G03G 15/08* (2006.01)
*G03G 21/16* (2006.01)

(52) U.S. Cl.
CPC ..... *G03G 21/1652* (2013.01); *G03G 15/0863* (2013.01); *G03G 15/5004* (2013.01);
(Continued)

(58) Field of Classification Search
CPC ........... G03G 15/0863; G03G 15/5004; G03G 15/80; G03G 21/1647; G03G 21/1652; G03G 2221/163; G03G 2215/0697
See application file for complete search history.

(56) References Cited

U.S. PATENT DOCUMENTS 9,008,522 B2 † 4/2015 Itabashi
12,411,453 B2 † 9/2025 Zhu
2025/0085663 A1 † 3/2025 Tan

FOREIGN PATENT DOCUMENTS

CN 103182847 A 7/2013
CN 107621763 A 1/2018
(Continued)

*Primary Examiner* — Hoang X Ngo
(74) *Attorney, Agent, or Firm* — Anova Law Group, PLLC

(57) ABSTRACT

The present disclosure provides a developing cartridge. The developing cartridge includes a casing including a first side and a second side arranged oppositely in a first direction and including a third side and a fourth side arranged oppositely in a second direction intersecting the first direction; a developing roller positioned at the third side and rotatable around a first axis extending in the first direction; a coupling positioned at the first side for rotation; a light-emitting part capable of emitting light, where the light-emitting part is closer to the fourth side than the developing roller in the second direction; and an abutting part positioned at the second side.

11 Claims, 40 Drawing Sheets

(30) Foreign Application Priority Data

| | | |
|---|---|---|
| May 11, 2024 | (CN) | 202421023690.8 |
| May 29, 2024 | (CN) | 202421211473.1 |
| Jun. 25, 2024 | (CN) | 202421476703.7 |
| Jul. 2, 2024 | (CN) | 202421552481.2 |
| Jul. 17, 2024 | (CN) | 202421700055.9 |
| Aug. 6, 2024 | (CN) | 202421897209.8 |
| Aug. 17, 2024 | (CN) | 202422004697.1 |
| Sep. 29, 2024 | (CN) | 202411381904.3 |
| Oct. 22, 2024 | (CN) | 202422561396.9 |

(52) U.S. Cl.
CPC ......... *G03G 15/80* (2013.01); *G03G 21/1647* (2013.01); *G03G 2215/0697* (2013.01); *G03G 2221/163* (2013.01)

(56) References Cited

FOREIGN PATENT DOCUMENTS

| | | | | |
|---|---|---|---|---|
| CN | 207650556 U | † | 7/2018 |
| CN | 214846244 U | * | 11/2021 |
| CN | 116266038 A | | 6/2023 |
| CN | 117270349 A | | 12/2023 |
| CN | 220323728 U | † | 1/2024 |

* cited by examiner
† cited by third party

LIGHT-EMITTING DEVELOPING CARTRIDGE

CROSS-REFERENCE TO RELATED APPLICATION

This application claims the priority to Chinese patent application No. 202420888093.5, filed on Apr. 25, 2024, No. 202411381904.3, filed on Sep. 29, 2024, No. 202422561396.9, filed on Oct. 22, 2024, No. 202421476703.7, filed on Jun. 25, 2024, No. 202421700055.9, filed on Jul. 17, 2024, No. 202422004697.1, filed on Aug. 17, 2024, No. 202420942586.2, filed on Apr. 30, 2024, No. 202421023690.8, filed on May 11, 2024, No. 202421211473.1, filed on May 29, 2024, No. 202421552481.2, filed on Jul. 2, 2024, and No. 202421897209.8, filed on Aug. 6, 2024, the entirety of all of which is incorporated herein by reference.

TECHNICAL FIELD

The present disclosure generally relates to the field of image-forming technology and, more particularly, relates to a developing cartridge.

BACKGROUND

A developing cartridge is a detachable part widely used in an image-forming apparatus. The image-forming apparatus may be disposed with a detection apparatus which may be configured to detect whether installed developing cartridge matches. The detection apparatuses may be divided into an optical signal detection apparatus and an electrical signal detection apparatus. After the developing cartridge is installed in the image-forming apparatus, the developing cartridge may trigger the detection apparatus to make the image-forming apparatus generate an optical signal change or an electrical signal change. In the existing technology, a part for generating the optical signal or the electrical signal to change may be disposed on the image-forming apparatus, a movable portion may be disposed at the detection end of the developing cartridge to trigger above-mentioned part, and the driving end may transmit a driving force to the detection end through a transmission mechanism. When the image-forming apparatus is used for a long time, above-mentioned part may wear out, and the optical signal or the electrical signal cannot change accurately, which may result in the image-forming apparatus being unable to accurately identify the developing cartridge.

SUMMARY

One aspect of the present disclosure provides a developing cartridge. The developing cartridge includes a casing including a first side and a second side arranged oppositely in a first direction and including a third side and a fourth side arranged oppositely in a second direction intersecting the first direction; a developing roller positioned at the third side and rotatable around a first axis extending in the first direction; a coupling positioned at the first side for rotation; a light-emitting part capable of emitting light, where the light-emitting part is closer to the fourth side than the developing roller in the second direction; and an abutting part positioned at the second side.

Another aspect of the present disclosure provides a developing cartridge. The developing cartridge includes a casing including a first side and a second side arranged oppositely in a first direction and including a third side and a fourth side arranged oppositely in a second direction intersecting the first direction; a developing roller positioned at the third side and rotatable around a first axis extending in the first direction; a coupling positioned at the first side and rotatable around a second axis extending in the first direction; a conductive assembly including an electrical receiving portion and a grounding conductive part, where the electrical receiving portion is positioned at the second side, and the grounding conductive part is able to be electrically connected to the electrical receiving portion; and a detected part, where the detected part drives at least a part of the conductive assembly to move.

Other aspects of the present disclosure may be understood by those skilled in the art in light of the description, the claims, and the drawings of the present disclosure.

DETAILED DESCRIPTION

Figure 1:
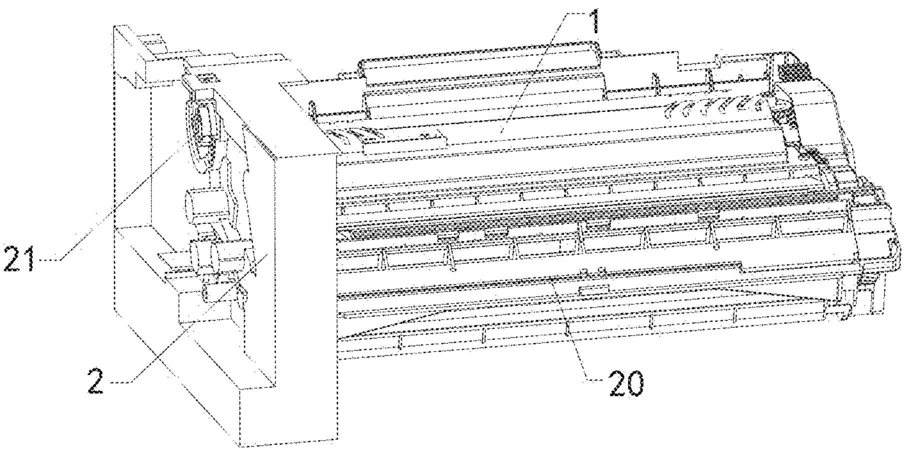
FIG. 1 illustrates a structural schematic of a developing cartridge installed on a main housing of an image-forming apparatus provided by exemplary embodiment one of the present disclosure.

In order to clearly describe the objectives, technical solutions and advantages of the present disclosure, the present disclosure is further described in detail with reference to the accompanying drawings and embodiments hereinafter. It should be understood that specific embodiments described herein are only configured to explain the present disclosure, but not to limit the present disclosure.

In the specification of the present disclosure, unless otherwise expressly specified and limited, the terms "first" and "second" are only used for the purpose of description and should not be construed as indicating or implying relative importance. Unless otherwise specified or explained, the term "plurality" refers to two or more; the terms "connection", "fixation" and the like should be understood in a broad sense. For example, "connection" may be a fixed connection, a detachable connection, an integral connection, or an electrical connection; and may be a direct connection or an indirect connection through an intermediate medium. For those skilled in the art, specific meanings of above-mentioned terms in the present disclosure should be understood according to specific cases.

In the specification of the present disclosure, it should be understood that directional words such as "upper" and "lower" described in embodiments of the present disclosure are described from the angles shown in the drawings and should not be construed as a limitation on embodiments of the present disclosure. In addition, in the context of the present disclosure, it should also be understood that when an element may be referred to being "on" or "under" another element, it may not only be directly connected "on" or "under" another element, but also indirectly connected "on" or "under" another element through intermediate elements.

In the present disclosure, the left-right direction indicated in the drawings is the first direction, the front-rear direction indicated in the drawings is the second direction, and the up-down direction indicated in the drawings is the third direction.

The present disclosure is further described in detail below in conjunction with the drawings.

Exemplary Embodiment One

As shown in FIG. 1, a developing cartridge 1 may be detachably installed on a drum cartridge 20 of an image-forming apparatus; the drum cartridge 20 may be disposed with a photosensitive drum; a main housing 2 of the image-forming apparatus may be disposed with a blocking part 21, a light-emitting apparatus and a light source detection apparatus; and the blocking part 21 may prevent the light source detection apparatus from detecting the light emitted by the light-emitting apparatus.

As shown in FIGS. 2-7, the developing cartridge 1 may include a casing 10, a transmission assembly, a first protective cover 111, an electrode 102, and a detected assembly.

Figure 2:
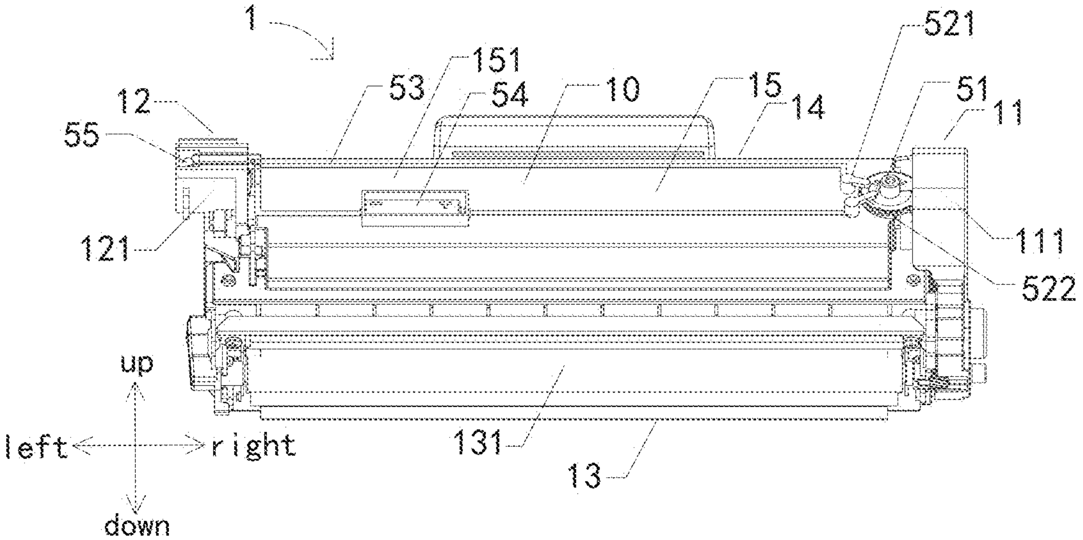
FIG. 2 illustrates a structural schematic of a developing cartridge provided by exemplary embodiment one of the present disclosure.
Figure 3:
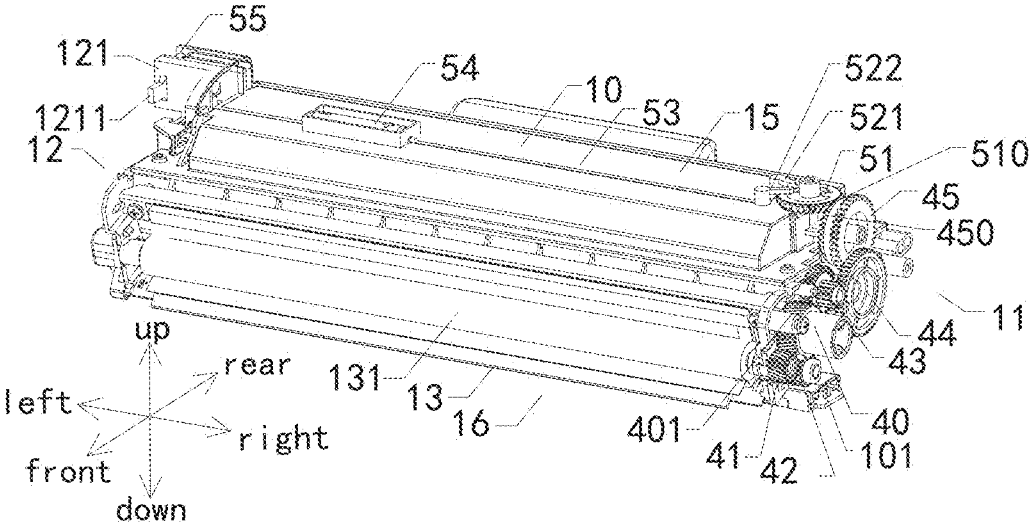
FIG. 3 illustrates a structural schematic of a developing cartridge from another viewing angle provided by exemplary embodiment one of the present disclosure.

As shown in FIGS. 2-3, the casing 10 is configured to accommodate developer therein; and the casing 10 may have a first side 11 (left side) and a second side 12 (right side) arranged oppositely in the first direction, a third side 13 (front side) and a fourth side 14 (rear side) arranged oppositely in the second direction, and a fifth side 15 (up or upper side) and a sixth side 16 (down or lower side) arranged oppositely in the third direction. The first direction, the second direction and the third direction may be intersected with each other, optionally, may be orthogonal to each other. For the convenience of description in one embodiment, the first direction is defined as the left-right direction, the second direction is defined as the front-rear direction, and the third direction is defined as the up-down direction. The first protective cover 111 may be detachably fixedly installed on the first side 11; the first protective cover 111 may at least cover the transmission assembly and be configured to protect the transmission assembly; and the second protective cover 121 may be detachably installed on the second side 12.

As shown in FIG. 3, the storage medium 101 may be located at the first side 11; and the storage medium 101 may be configured to store relevant information of the developing cartridge 1 and transmit relevant information of the developing cartridge 1 to the image-forming apparatus. The storage medium 101 may include an electrical contact surface. The electrical contact surface may be directly on the storage medium 101 to realize electrical connection with the storage medium 101 or realize electrical connection with the storage medium 101 through an intermediate part. The electrical contact surface may be configured to directly contact the image-forming apparatus to transfer the information in the storage medium 101 to the image-forming apparatus. The storage medium 101 may be supported by the casing 10, or by the first protective cover 111, or by both the casing 10 and the first protective cover 111.

As shown in FIGS. 2-3, the developing cartridge 1 may be disposed with a developing roller 131, a developer feeding roller and an agitator. The developing roller 131, the developer feeding roller, and the agitator may be all supported by the casing 10 and may rotate relative to the casing 10. The developing roller 131 may rotate around the first axis extending in the first direction, and the rotation axes of the developer feeding roller and the agitator may both extend in the first direction. The developer feeding roller may transfer the developer to the developing roller 131, and the developing roller 131 may be in contact with the photosensitive drum, and the developing roller 131 may transfer the developer to the photosensitive drum. The agitator may be configured to stir the developer in the casing 10 to prevent the developer from agglomerating.

Figure 6:
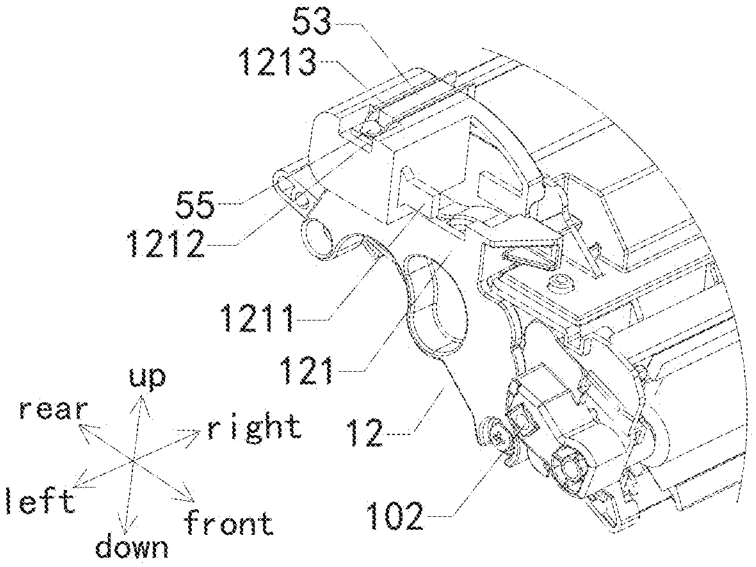
FIG. 6 illustrates a structural schematic of a second side provided by exemplary embodiment one of the present disclosure.

As shown in FIG. 6, the second side 12 may be also disposed with an electrode 102. The electrode 102 may be configured to contact the power supply terminal in the image-forming apparatus to receive the electrical energy outputted by the image-forming apparatus. After receiving the electrical energy outputted by the image-forming apparatus, the electrode 102 may transmit the electrical energy to at least one of the developing roller 131 and the developer feeding roller, such that the developing roller 131 and the developer feeding roller may be charged to absorb the developer.

As shown in FIG. 3, the transmission assembly may be disposed at the first side 11 and may include a coupling 40 rotatably installed on the first side 11; and the coupling 40 may rotate around the second axis extending in the first direction. The coupling 40 may include a driving gear 401 and a force receiving portion which are coaxially integrally formed, and the driving gear 401 may be closer to the first side 11 than the force receiving portion in the first direction. A coupling installation column extending in the first direction may be disposed on the sidewall of the first side 11, and the coupling 40 may be rotatably installed on the coupling installation column. The force receiving portion may be configured to be connected to the force output shaft on the image-forming apparatus to receive the force outputted by the image-forming apparatus and transmit the force to the gear on the transmission assembly.

The transmission assembly may also include a developing gear 41, a developer feeding gear 42, a first idler gear 43, an agitator gear 44 and a second idler gear 45. The developing gear 41 may be fixedly installed on one end of the developing roller 131 adjacent to the first side 11 in the first direction. The developing gear 41 may receive the force transmitted by the driving gear 401 and drive the shaft of the developing roller 131 to rotate together. The developer feeding gear 42 may be coaxially and fixedly installed on one end of the developer feeding roller adjacent to the first side 11 and rotate together with the developer feeding roller. The agitator gear 44 may be coaxially and fixedly installed on one end of the agitator adjacent to the first side 11 and rotate together with the agitator. The developing gear 41, the developer feeding gear 42 and the first idler gear 43 may be all engaged with the driving gear 401 to receive force; and the first idler gear 43 may be engaged with the agitator gear 44 to transmit force to the agitator gear 44. The agitator gear 44 may be engaged with the second idler gear 45 to rotate the second idler gear 45. The rotation axis of the second idler gear 45 may extend in the first direction. The second idler gear 45 may include a first bevel gear portion 450. The second idler gear 45 may include a toothless portion. The second idler gear 45 may be disengaged from the agitator gear 44 to stop rotation. In one embodiment, the number of gears of the transmission assembly and the engaging relationship between gears may be not limited, which may be set according to actual needs.

As shown in FIGS. 2-7, in one embodiment, the detected assembly may include a rotating part 51, a trigger part, a conductive part, a connecting part 53, a power supply part 54 and a light-emitting part 55. The connecting part 53 may electrically connect the power supply part 54, the light-emitting part 55 and the trigger part together. In one embodiment, the connecting part 53 may be a conductive part, optionally, a conductive steel sheet. In some embodiments, the connecting part 53 may also be a wire; and the trigger part, the conductive part, the power supply part 54 and the light-emitting part 55 may be connected by the connecting part 53 to form a conduction circuit and realize the transmission of electrical energy.

Figure 4:
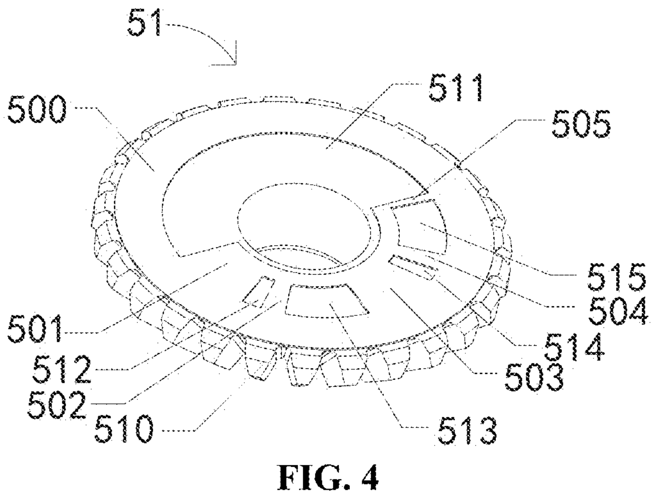
FIG. 4 illustrates a structural schematic of a rotating part provided by exemplary embodiment one of the present disclosure.

As shown in FIGS. 3-4, the rotating part 51 may be configured to be adjacent to the first side 11, and the rotating part 51 may include the second bevel gear portion 510. The second bevel gear portion 510 may be engaged with the first bevel gear portion 450, such that the rotating part 51 may receive the force transmitted by the second idler gear 45 to rotate. The rotation axis of the rotating part 51 may intersect the first direction. Optionally, the rotation axis of the rotating part 51 may extend in the third direction. When the toothless portion of the second idler gear 45 is opposite to the agitator gear 44, the rotating part 51 may follow the second idler gear 45 to stop rotation. In some embodiments, the second bevel gear portion 510 of the rotating part 51 may be toothless, and the second bevel gear portion 510 may be disengaged from the second idler gear 45 to stop rotation.

The trigger part may be at the top of the rotating part 51 and fixedly connected to the rotating part 51 by a welding or gluing manner. The trigger part may rotate with the rotating part 51. The trigger part may be made of a conductive material. Optionally the trigger part may be a conductive steel sheet with a roughly disc shape. The connecting part 53 may include the first conductive contact and the second conductive contact; and the trigger part may be between the first conductive contact and the second conductive contact. The trigger part may rotate with the rotating part 51 and configured to connect or disconnect the first conductive contact with the second conductive contact, thereby generating an electrical signal for controlling the light-emitting part 55 to emit light or be turned off. That is, the rotating part 51 in one embodiment may be configured as a detected part to control turn-on and turn-off of the circuit, that is, indirectly determine whether the circuit is turned on and off; and the trigger part on the rotating part may be configured as a switch. In some embodiments, the detected part may be a translation part (such as a rack).

The trigger part may include the first trigger portion 500 and the second trigger portion. The first trigger portion 500 may be a complete circle, and the second trigger portion may be on the inner side of the first trigger portion 500 along the radial direction of the rotating part 51. The second trigger portion may include a plurality of conductive blocks, and spacer blocks may be disposed between the plurality of conductive blocks, and the spacer blocks may be made of an insulating material. In some embodiments, the rotating part 51 may be partially made of a conductive material, or a conductive material may be disposed on the rotating part as the trigger part.

The second trigger portion may include the first conductive block 501, the second conductive block 502, the third conductive block 503, the fourth conductive block 504 and the fifth conductive block 505; and all conductive blocks may be arranged at intervals along the rotation direction of the rotating part 51. The spacer blocks may include the first spacer block 511, the second spacer block 512, the third spacer block 513, the fourth spacer block 514 and the fifth spacer block 515; and all spacer blocks may be also arranged at intervals along the rotation direction of the rotating part 51, such as the first conductive block 501 may be disposed between the first spacer block 511 and the second spacer block 512. In one embodiment, the number and shapes of the conductive blocks and the spacer blocks may not be limited, which may be set according to actual needs.

Figure 5:
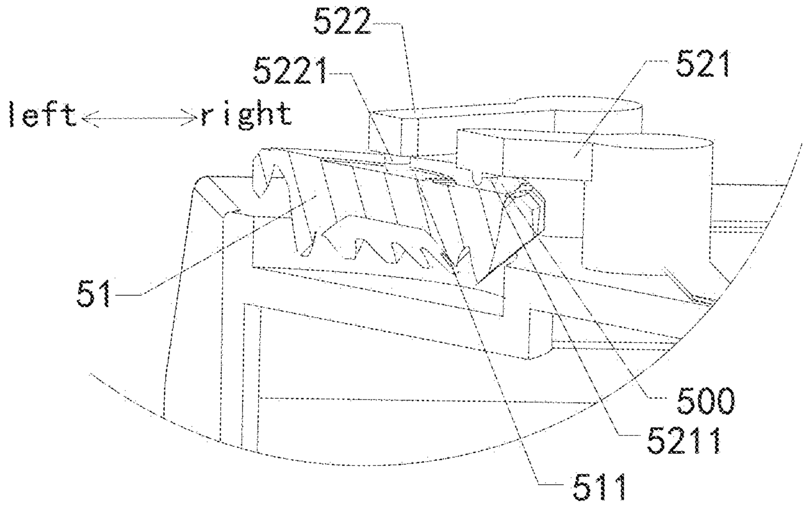
FIG. 5 illustrates a cross-sectional view of a rotating part and a connecting part provided by exemplary embodiment one of the present disclosure.

As shown in FIGS. 3 and 5, the conductive part may be made of a conductive material, which may be a conductive resin or a metal such as a conductive steel sheet; the conductive part may include the first conductive part 521 and the second conductive part 522; the first conductive part 521 and the second conductive part 522 may be not in contact with each other; and the first conductive part 521 and the second conductive part 522 may be electrically connected to the connecting part 53 respectively, but these two parts cannot directly contact for electrical connection. The first conductive part 521 may include a first contact protrusion 5211 (i.e., the first conductive contact), and the second conductive part 522 may include the second contact protrusion 5221 (i.e., the second conductive contact). In the first direction, the first contact protrusion 5211 and the second contact protrusion 5221 may be arranged respectively on the left side and the right side; that is, these two protrusions may be arranged to be staggered with each other in the first direction. In one embodiment, optionally, the first contact protrusion 5211 may be farther away from the rotation axis of the rotating part 51 than the second contact protrusion 5221. The first contact protrusion 5211 may be configured to contact the first trigger portion 500, and the second contact protrusion 5221 may be configured to contact the second trigger portion. When the first contact protrusion 5211 and the second contact protrusion 5221 are respectively in contact with the first trigger portion 500 and the second trigger portion simultaneously, the first conductive part 521 and the second conductive part 522 may be electrically connected to each other. When only the first contact protrusion 5211 is in contact with the first trigger portion 500, the first conductive part 521 and the second conductive part 522 may be not electrically connected to each other.

Figure 7:
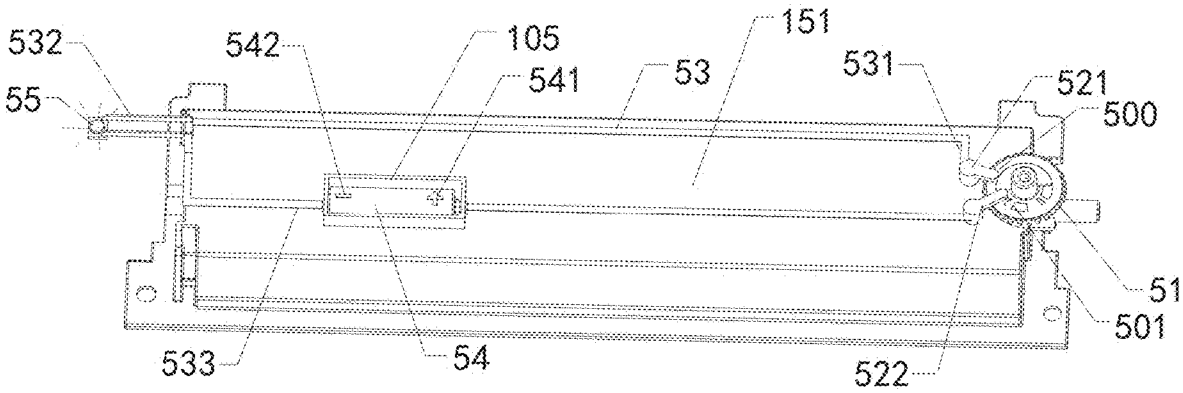
FIG. 7 illustrates a structural schematic of a developing cartridge when a circuit is in conduction provided by exemplary embodiment one of the present disclosure.

As shown in FIGS. 2 and 7, in one embodiment, the power supply part 54 may be, optionally, a battery; and the power supply part 54 may store electrical energy inside. When the power supply part 54 is in a conduction circuit, the power supply part 54 may release electrical energy and transfer the electrical energy to the elements in the circuit. The power supply part 54 may include a positive electrode 541 (+) and a negative electrode 542 (−); and the connecting part 53 may connect the positive electrode 541 and the negative electrode 542 respectively, such that the electrical energy may form a complete circuit. In one embodiment, optionally, the positive electrode 541 may be closer to the first side 11 than the negative electrode 542 in the first direction. In the first direction, the power supply part 54 may be between the light-emitting part 55 and the conductive part.

The light-emitting part 55 may be at the second side 12. The light-emitting part 55 may be connected to the connecting part 53 and receive the electrical energy released by the power supply part 54 to emit light when the circuit is in conduction state. The light-emitting part may be a lamp such as an LED lamp or a small plug bulb or may be other light-emitting device. In the second direction, the light-emitting part 55 may be farther away from the developing roller 131 than the electrode 102.

A top cover 151 may be disposed at the fifth side 15, and the first installation portion 105 may be disposed on the top cover 151. The first installation portion 105 may be a groove-shaped recess in the third direction. The first installation portion 105 may be configured to stably install the power supply part 54 on the casing 10. The connecting part 53 and the conductive part may be at the fifth side 15 and supported by the top cover 151.

As shown in FIG. 6, the second protective cover 121 may be disposed with an abutting part 1211, a second installation portion 1212 and a third installation portion 1213. The abutting part 1211 may be a protrusion extending in the second direction or the third direction. The abutting part 1211 may be configured to contact the blocking part 21. In some embodiments, the abutting part 1211 may be directly disposed on the casing 10 or may be located at the second side 12 as a separate part. In the second direction, the abutting part 1211 may be further away from the developing roller 131 than the electrode 102. In one embodiment, optionally, the abutting part 1211 may be closer to the developing roller 131 than the light-emitting part 55 in the second direction. The second installation portion 1212 may be configured to install the light-emitting part 55. The third installation portion 1213 may be a groove shape in the first direction. The third installation portion 1213 may be configured to support the portion of the connecting part 53 on the second protective cover 121, such that the connecting part 53 and the light-emitting part 55 may be stably connected to each other.

In one embodiment, according to the connection of the connecting part 53 to the conductive part, the light-emitting part 55 and the power supply part 54, the connecting part 53 may be divided into the first connecting portion 531, the second connecting portion 532 and the third connecting portion 533. The second connecting portion 532 and the third connecting portion 533 may be always connected to the light-emitting part 55 and the power supply part 54 respectively to maintain the conduction state. The first connecting portion 531 may determine whether entire circuit is in conduction according to whether the second conductive part 522 is in conduction by contacting the second trigger portion, thereby affecting whether the light-emitting part 55 emits light.

As shown in FIG. 7, when the first conductive part 521 is in contact with the first trigger portion 500 and the second conductive part 522 is in contact with the first spacer block 511, entire circuit may be in a disconnection state, and the light-emitting part 55 may not emit light; and when the first conductive part 521 is in contact with the first trigger portion 500 and the second conductive part 522 is in contact with the first conductive block 501, entire circuit may be in a conduction state, and the light-emitting part 55 may emit light.

According to the rotation of the rotating part 51, it may determine whether the second conductive part 522 is in contact with the conductive block in the second trigger portion, and whether the circuit is in conduction, and further determine whether the light-emitting part 55 emits light.

Figure 8:
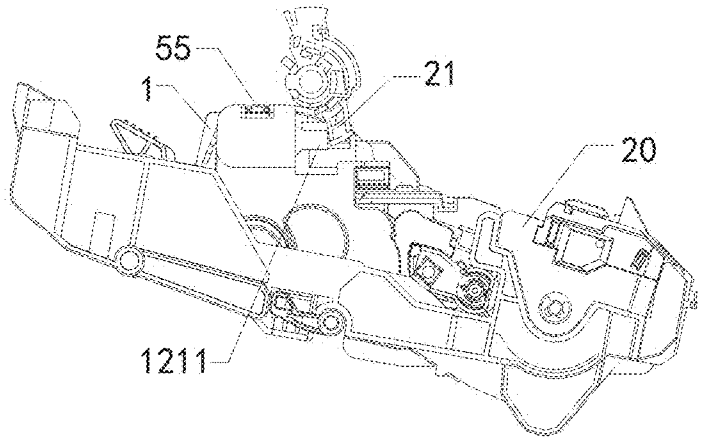
FIG. 8 illustrates a structural schematic of a blocking part being abutted against by an abutting part provided by exemplary embodiment one of the present disclosure.
Figure 9:
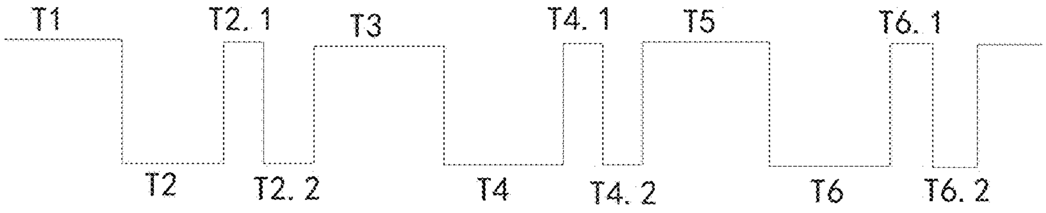
FIG. 9 illustrates a schematic of a signal generated by the image-forming apparatus provided by exemplary embodiment one of the present disclosure.

As shown in FIGS. 8-9, when the developing cartridge 1 is installed on the drum cartridge 20 and inside the image-forming apparatus, the abutting part 1211 may be abutted against the blocking part 21 and maintain the abutting state, such that the blocking part 21 may block the light emitted by the light-emitting apparatus inside the image-forming apparatus after movement, and the light source detection apparatus inside the image-forming apparatus cannot detect the light source and generate the first signal T1. At this point, the circuit on the developing cartridge 1 may be in the disconnection state, the second conductive part 522 may be in contact with the first spacer block 511, and the light-emitting part 55 may not emit light.

When the coupling 40 receives the force outputted by the image-forming apparatus, and after the rotating part 51 receives the force transmitted by the coupling 40 to rotate, the second conductive part 522 may pass over the first spacer block 511 to be in contact with the first conductive block 501, such that the circuit may be in the conduction state, the light-emitting part 55 may emit light under the action of the electrical energy released by the power supply part 54, and the light source detection apparatus may generate the second signal T2 after detecting the light source. As the rotating part 51 rotates, the second conductive part 522 may be continuously in contact with multiple spacer blocks and the conductive layer, such that the light-emitting part 55 may emit light and be turned off multiple times, and the image-forming apparatus may generate signals multiple times. The light-emitting and turn-off process may be same as above process, and only the light-emitting time length and interval length may be different, which may not be described in detail herein. The turn-off mentioned in one embodiment may be that the light-emitting part 55 may not emit light at all, or the intensity of emitted light may be insufficient to be detected by the light source detection apparatus.

When the rotating part 51 follows the second idler gear 45 to stop rotation, the second conductive part 522 may be in contact with the first spacer block 511 again, the circuit may be in the disconnection state, the light-emitting part 55 may be turned, and the light source detection apparatus cannot detect the light source.

In one embodiment, the number of times of the light source detected by the light source detection apparatus, the interval time lengths, and other information may be satisfied to form signals by determining whether the light-emitting part emits light, such that the image-forming apparatus may identify the developing cartridge 1. In one embodiment, the number of times of light-emission and the time lengths may not be limited, which may be set according to actual needs.

Exemplary Embodiment Two

Unless otherwise specified, the structure of the developing cartridge 1 in exemplary embodiment two may be same as the structure of the developing cartridge 1 in exemplary embodiment one. The difference between exemplary embodiment two and exemplary embodiment one is that the structure of the detected assembly may be different.

Figure 10:
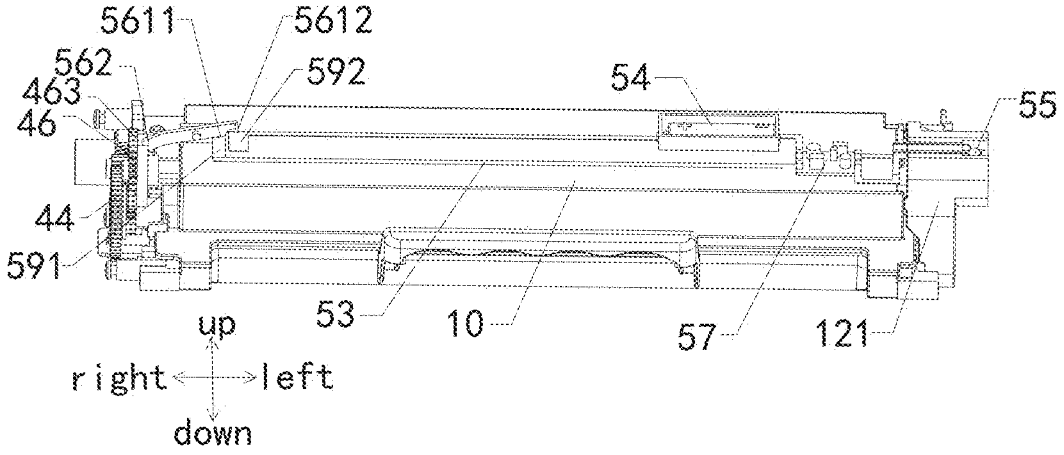
FIG. 10 illustrates a structural schematic of a developing cartridge provided by exemplary embodiment two of the present disclosure.
Figure 11:
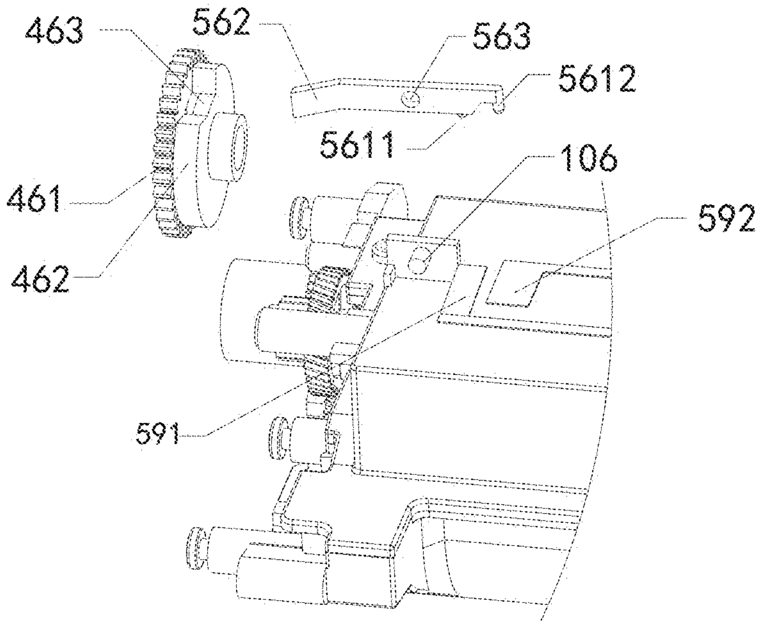
FIG. 11 illustrates a partial exploded view of a first side provided by exemplary embodiment two of the present disclosure.
Figure 12:
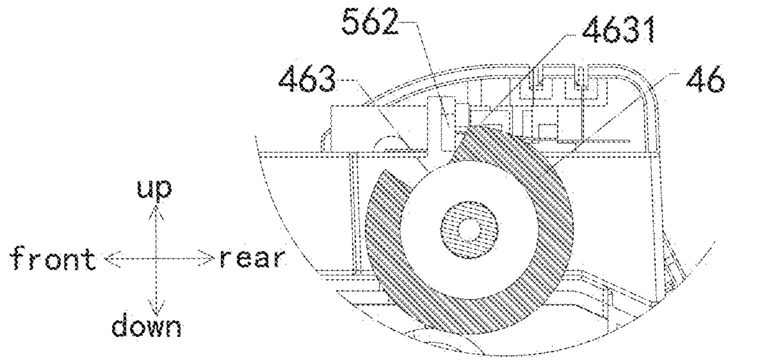
FIG. 12 illustrates a cross-sectional view of a switching part in contact with a rotating part provided by exemplary embodiment two of the present disclosure.

As shown in FIGS. 10-12, in one embodiment, the rotating part 46 may receive the force transmitted by the agitator gear 44 to rotate, and the rotation axis of the rotating part 46 may extend in the first direction; the rotating part 46 may include a gear portion 461, an abutting portion 462 and a recessed portion 463; the gear portion 461 may be toothless and engaged with the agitator gear 44 to rotate or disengaged from the agitator gear 44 to no longer rotate; in the first direction, the abutting portion 462 may be closer to the second side 12 than the gear portion 461; the recessed portion 463 is recessed along the radial direction of the rotating part 46; the recessed portion 463 and the abutting portion 462 may form a complete circle; an inclined surface 4631 may be disposed on the recessed portion 463; and the inclined surface 4631 may also be an arc surface.

In one embodiment, the detected assembly may include the power supply part 54 and the light-emitting part 55, which may be same as those parts in exemplary embodiment one and may not be described in detail herein. The detected assembly may also include a connecting part 53, a switching part 56 and a control unit 57. The connecting part 53 may be, optionally, a conductive steel sheet or a wire. The connecting part 53 may be configured to connect remaining parts in the detected assembly to form a conductive circuit, such that, the light-emitting part 55 may emit light, and the light source detection apparatus may detect the signal.

The casing 10 may be disposed with a supporting portion 106 which may be a cylindrical protrusion extending in the second direction. The switching part 56 may be a swing part. The switching part 56 may be disposed with a supported portion 563 which may be a circular hole. The switching part 56 and the supporting portion 106 may be matched by the shaft hole, such that the switching part 56 may be rotatably supported by the casing 10. The rotation axis of the switching part 56 may extend in the second direction. The switching part 56 may also include a trigger end (i.e., a switching portion) and an abutted end 562. The trigger end and the abutted end 562 may be respectively located at two ends of the switching part 56 in the first direction; the trigger end may be closer to the second side 12 than the abutted end 562; and the supported portion 563 may be located between two ends of the switching part 56. The trigger end may include the first trigger portion 5611 and the second trigger portion 5612 which may be protrusion-shaped and respectively arranged on the left side and the right side in the first direction. Optionally, the first trigger portion 5611 may be farther away from the second side 12 than the second trigger portion 5612. The abutted end 562 may be configured to contact the rotating part 46, such that the switching part 56 may swing relative to the casing 10. When the abutted end 562 is in the recessed portion 563 of the switching part 56, the trigger end may be in a lifted state; and when the abutted end 562 is abutted against the abutting portion 462, the trigger end may be in a press-down state. At least the trigger end of the switching part 56 may be made of a conductive material, or entire switching part 56 may be made of a conductive material.

The control unit 57 may include a control module and a storage module. The storage module may store a program for controlling the light-emitting part 55 to emit light and be turned off. The control module may execute the program and output the electrical signal for controlling the light-emitting element to emit light or be turned off. When the circuit, where the control unit 57 and the circuit are located, is in conduction, the light-emitting part 55 may emit light and be turned off according to the command of the control unit 57, and the time length and number of times of emitting light and not emitting light may be controlled by the control unit 57.

The connecting part 53 may be disposed with the first connecting portion 591 and the second connecting portion 592 which are adjacent to the first side 11. The first connecting portion 591 may have a certain elasticity. The first connecting portion 591 and the second connecting portion 592 may be not in direct contact and respectively arranged on the left side and the right side in the first direction. In the first direction, the second connecting portion 592 may be closer to the second side 12 than the first connecting portion 591. The first connection part 591 and the second connection part 592 may be in contact with the first trigger portion 5611 and the second trigger portion 5612, respectively. When the first connection part 591 is in contact with the first trigger portion 5611 and when the second connection part 592 is in contact with the second trigger portion 5612, that is, when the trigger end is in the press-down state, the connection part 53 may connect entire detected assembly into a conductive circuit, and the light-emitting part 55 may receive the electrical energy released by the power supply part 54 and may emit light and be turned off under the command sent by the control unit 57. That is, the first connecting portion 591 and the second connecting portion 592 in one embodiment may be configured as the first conductive part and the second conductive part respectively or may be conductive parts which are separately disposed to be in electrical contact with the switching part as in exemplary embodiment one.

When the developing cartridge 1 does not receive the force outputted by the image-forming apparatus, the abutted end 562 may be in the recessed portion 463 of the rotating part 46, the trigger end may be in the lifted state, at least the second connecting portion 592 may be not in contact with the second trigger portion 5612, entire circuit may be in the disconnection state, and the light-emitting part 55 may not emit light.

When the coupling 40 receives the force outputted by the image-forming apparatus and transmits the force to the rotating part 46 to rotate the rotating part 46, the abutted end 562 may be abutted against the inclined surface 4631 of the recessed part 463 and gradually disengage from the recessed part 463, and the switching part 56 may rotate relative to the casing 10. When the recessed portion 463 is out of contact with the abutting portion 562, the trigger end may be in the press-down state, the first connection portion 591 may be in contact with the first trigger portion 5611, and the second connection portion 592 may be in contact with the second trigger portion 5612. In such way, entire circuit may be in conduction, the light-emitting part 55 may emit light, and the first connection portion 591 may be pressed by the first trigger portion 5611 and have elastic force.

When the rotating part 46 continues to rotate, the light-emitting part 55 may switch between emitting light and not emitting light. When the rotating part 46 is disengaged from the agitator gear 44 and no longer rotates, the detection may end; the abutted end 562 may return to the recessed portion 463 again; the first connecting portion 591 may release the elastic force to make the switching part 56 swing along the opposite direction which may make the trigger end in the lifted state; at least the second connecting portion 592 may be not in contact with the second trigger portion 5612; and entire circuit may be in disconnection state. Optionally, an elastic part may be separately disposed to make the switching part 56 swing along the opposite direction; or the weight of the abutted end 562 may be configured to be greater than the weight of the trigger end, and the abutted end 562 may drive the switching part 56 to swing again under the action of gravity.

In one embodiment, the rotating part 46 may control the switching part 56 to move between the conduction position and the disconnection position; the control unit 57 may be started and/or terminated by the switching part 56; and the control unit 57 may generate the electrical signal to control the light-emitting part 55 to emit light or be turned off. That is, the rotating part 46 in one embodiment may be configured as the detected part for controlling the conduction and disconnection of the circuit.

Exemplary Embodiment Three

Unless otherwise specified, the structure of the developing cartridge 1 in exemplary embodiment three may be same as the structure of the developing cartridge 1 in exemplary embodiment one. The difference between exemplary embodiment three and exemplary embodiment one is that the detected assembly may also include a light guiding part 61.

Figure 13:
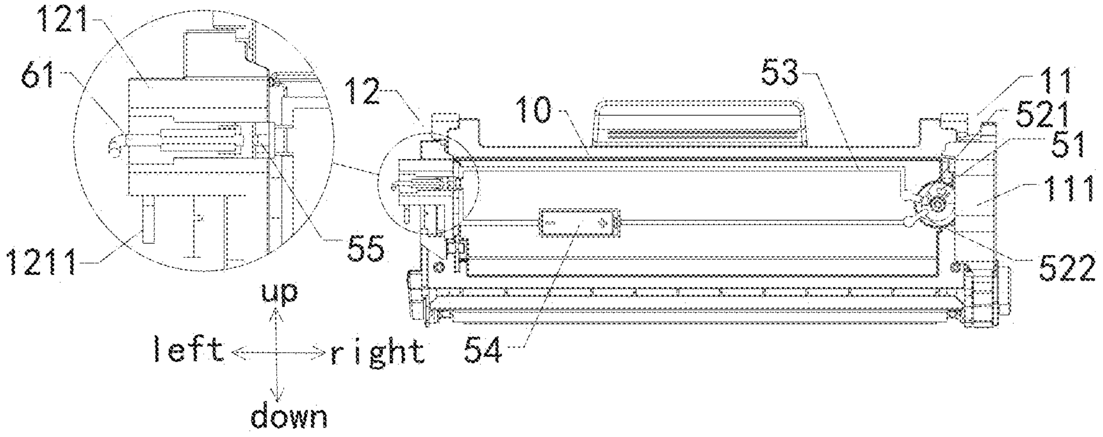
FIG. 13 illustrates a structural schematic of a developing cartridge provided by exemplary embodiment three of the present disclosure.
Figure 14:
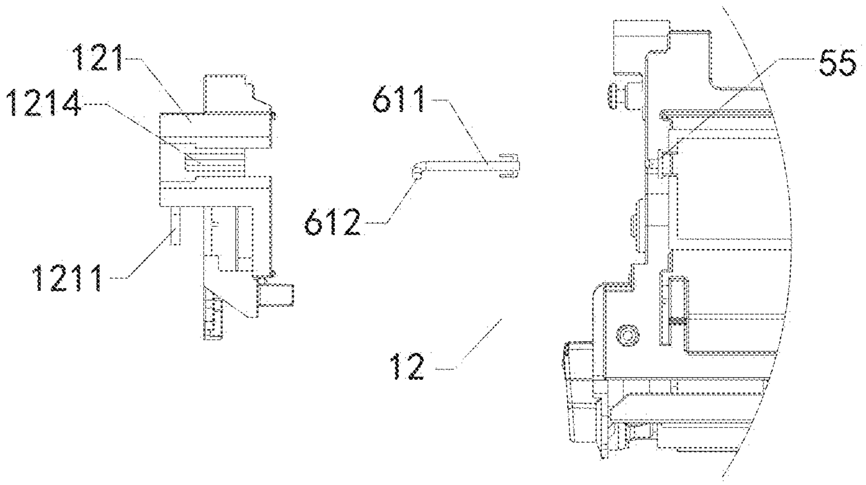
FIG. 14 illustrates a partial exploded view of a second side provided by exemplary embodiment three of the present disclosure.
Figure 15:
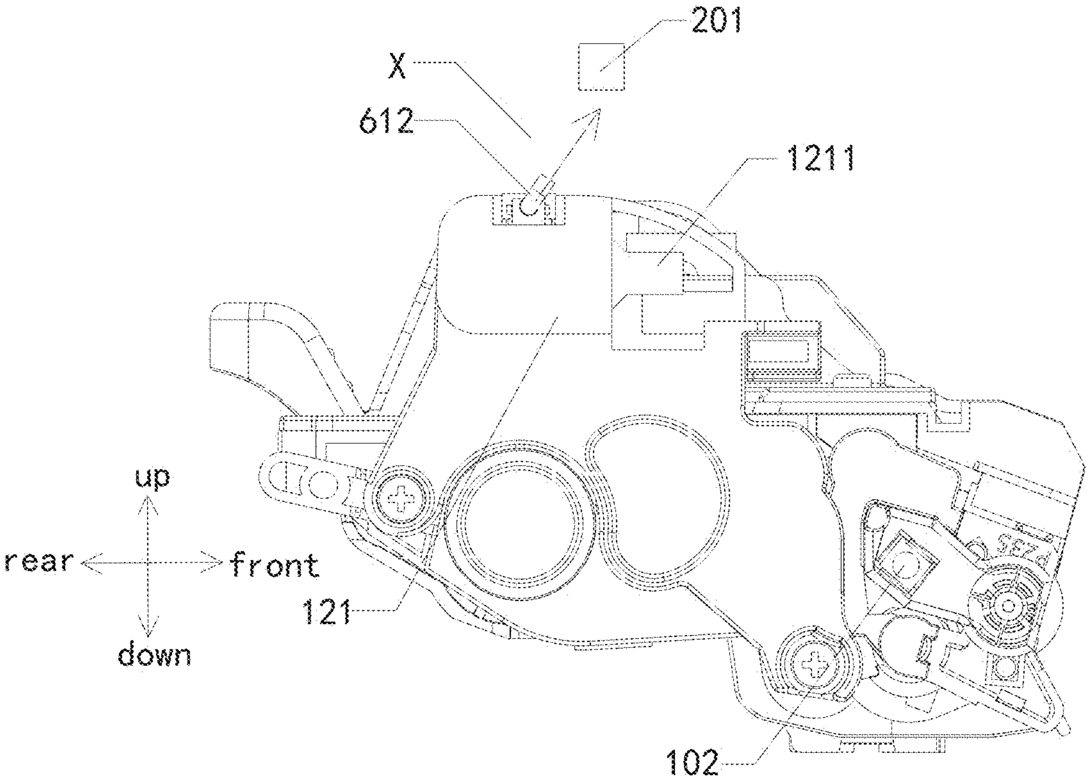
FIG. 15 illustrates a side view of a second side provided by exemplary embodiment three of the present disclosure.

As shown in FIGS. 13-15, the light-emitting part 55 may receive the electrical energy released by the power supply part 54 to emit light. The light emitted by the light-emitting part 55 may be not directly received by the light source detection apparatus 201 but indirectly transmitted to the light source detection apparatus through the light guiding part 61.

In one embodiment, the light-emitting part 55 may be disposed on the casing 10, optionally, at the fifth side 15; and the distance between the light-emitting part 55 and the second side 12 in the first direction may be less than the distance between the light-emitting part 55 and the first side 11. That is, the light-emitting part 55 may be supported by the casing 10. Therefore, the connecting part 53 connected to the light-emitting part 55 may also only need to be disposed on the casing 10, thereby simplifying the structure and installation difficulty of the connecting part 53. In some embodiments, the light-emitting part 55 may also be supported by the second protective cover 121.

The second protective cover 121 may be disposed with an installation groove 1214 extending in the first direction. The light guiding part 61 may be at least partially located in the installation groove 1214. The light guiding part 61 may be, optionally, fixedly installed in the installation groove 1214 in a locking manner. The light guiding part 61 may be, optionally, a light guiding column. The light guiding part 61 may include a light receiving portion 611 and a light transmitting portion 612. In the first direction, the light receiving portion 611 may be closer to the first side 11 than the light transmitting portion 612. The light receiving portion 611 may be a column extending in the first direction. The light receiving portion 611 may be disposed to be adjacent to the light-emitting part 55. A light inlet may be disposed on the light receiving portion 611. The light inlet may receive the light emitted by the light-emitting part 55. In the first direction, the light transmitting portion 612 may be farther away from the light-emitting part 55 than the light receiving portion 611. The light transmitting portion 612 and the light receiving portion 611 may be optionally formed in one piece or may be a combination of separate portions. The light transmitting portion 612 may be disposed to be protruding on the basis of the light receiving portion 611. The junction of the light transmitting portion 612 and the light receiving portion 611 may be a curved-line shape or a zigzagged-line shape. The light transmitting portion 612 may protrude upward in the third direction and protrude forward in the second direction; that is, the extension direction of the light transmitting portion 612 may intersect the second direction and the third direction. The light transmitting portion 612 may be disposed with a light outlet which may be configured to transmit the light source received by the light guiding part 61 to the outside. The light inlet of the light receiving portion 611 may receive the light emitted by the light-emitting part 55 and transmit the light source to the light transmitting portion 612 in a reflection manner inside the light guiding part 61, such that the light may be emitted from the light outlet along the X direction and transmitted to the light source detection apparatus 201.

A lock may be also disposed on the light guiding part 61, such that the light guiding part 61 may be stably disposed on the second protective cover 121. In some embodiments, the light guiding part 61 may also be supported by the casing 10 or supported by the casing 10 and the second protective cover 121.

Figure 16:
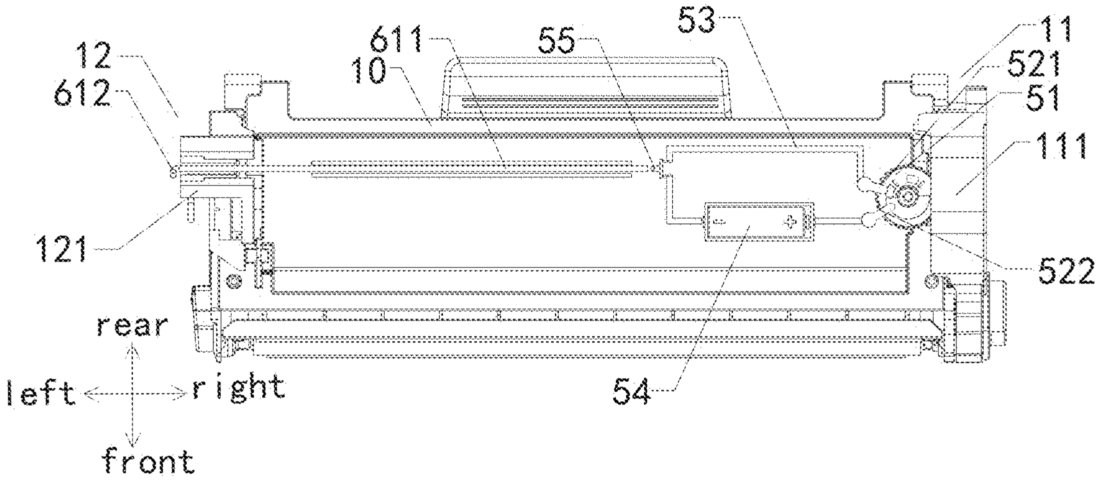
FIG. 16 illustrates another structural schematic of a developing cartridge provided by exemplary embodiment three of the present disclosure.

As shown in FIG. 16, in some embodiments, the light-emitting part 55 may be disposed to be adjacent to the first side 11. That is, the distance between the light-emitting part 55 and the second side 12 in the first direction may be greater than the distance between the light-emitting part 55 and the first side 11. Furthermore, the length of the light receiving portion 611 in the first direction may be increased, such that the light guiding part 61 may stably receive the light source transmitted by the light-emitting part 55. Such structure may further simplify the structure of the circuit where the light-emitting part 55 is located and reduce the production cost of the developing cartridge 1. Meanwhile, it may show that the position of the light-emitting part 55 in one embodiment may have no effect on whether the light-emitting part 55 stably transmits the light source to the light source detection apparatus, and the position of the light-emitting part 55 may be set according to actual needs.

Exemplary Embodiment Four

Unless otherwise specified, the structure of the developing cartridge 1 in exemplary embodiment four may be same as the structure of the developing cartridge 1 in exemplary embodiment three. The difference between exemplary embodiment four and exemplary embodiment three is that the structure of the light guiding part may be different.

Figure 17:
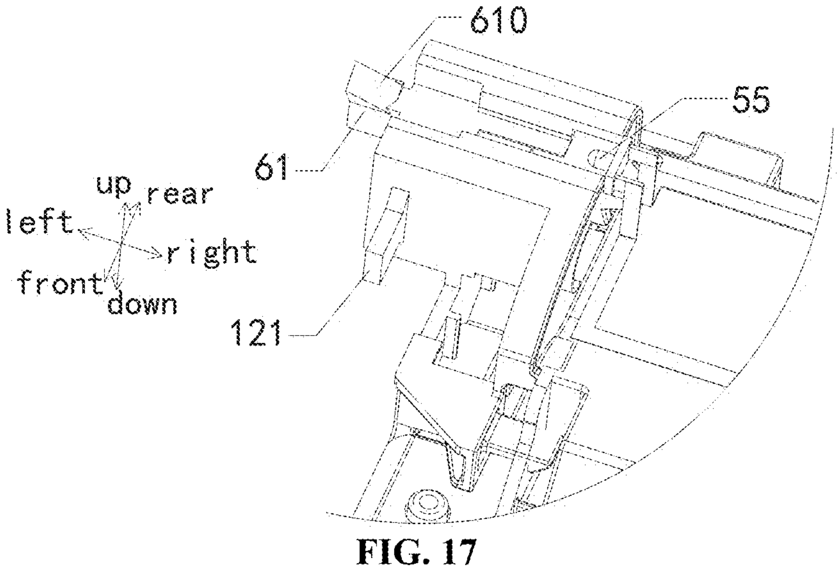
FIG. 17 illustrates a structural schematic of a second side provided by exemplary embodiment four of the present disclosure.
Figure 18:
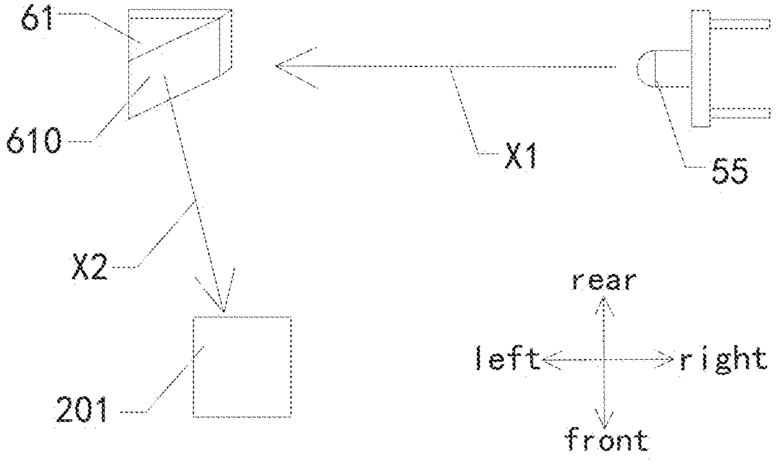
FIG. 18 illustrates a schematic of a light source emission path provided by exemplary embodiment four of the present disclosure.

As shown in FIGS. 17-18, in one embodiment, the light guiding part 61 may be a light guiding plate; and a light guiding surface 610 may be disposed on the light guiding part 61. The light guiding surface 610 may be a mirror surface or other surfaces with a reflective function. The extension direction of the light guiding surface 610 may be inclined relative to the first direction, the second direction and the third direction; that is, the light guiding surface 610 may extend to the left in the first direction, extend forward in the second direction and extend upward in the third direction. In one embodiment, the intersection angle between the light guiding surface 610 and the first direction, the second direction and the third direction, and the light source may not be limited, which may be fully or partially transmit the light to the light source detection apparatus 201.

When the light-emitting part 55 emits light, the light may be transmitted to the light guiding surface 610 along the X1 direction. In one embodiment, the X1 direction may be, optionally, in parallel with the first direction, or may be inclined relative to the first direction. After receiving the light, the light guiding surface 610 may reflect the light, and then the light may be reflected to the light source detection apparatus 201 along the X2 direction, and the X2 direction may intersect the X1 direction.

In one embodiment, the light-emitting part 55 may be disposed to be adjacent to the second side 12; or on the basis of the light being stably transmitted to the light-guiding surface 610, the light-emitting part 55 may be disposed to be adjacent to the first side 11, which may be further simplify the structure of the circuit where the light-emitting part 55 is located.

Exemplary Embodiment Five

Unless otherwise specified, the structure of the developing cartridge 1 in exemplary embodiment five may be same as the structure of the developing cartridge 1 in exemplary embodiment one. The difference between exemplary embodiment five and exemplary embodiment one is that the structure of the power supply part may be different. In one embodiment, there is no need to dispose the power supply part with its own electrical energy on the developing cartridge 1.

Figure 19:
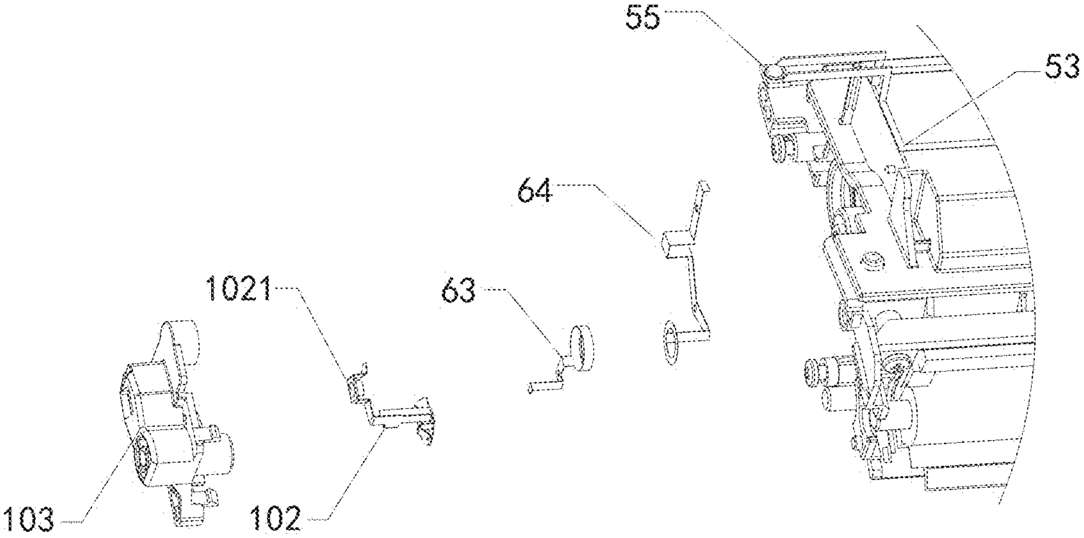
FIG. 19 illustrates an exploded view of a second side provided by exemplary embodiment five of the present disclosure.
Figure 20:
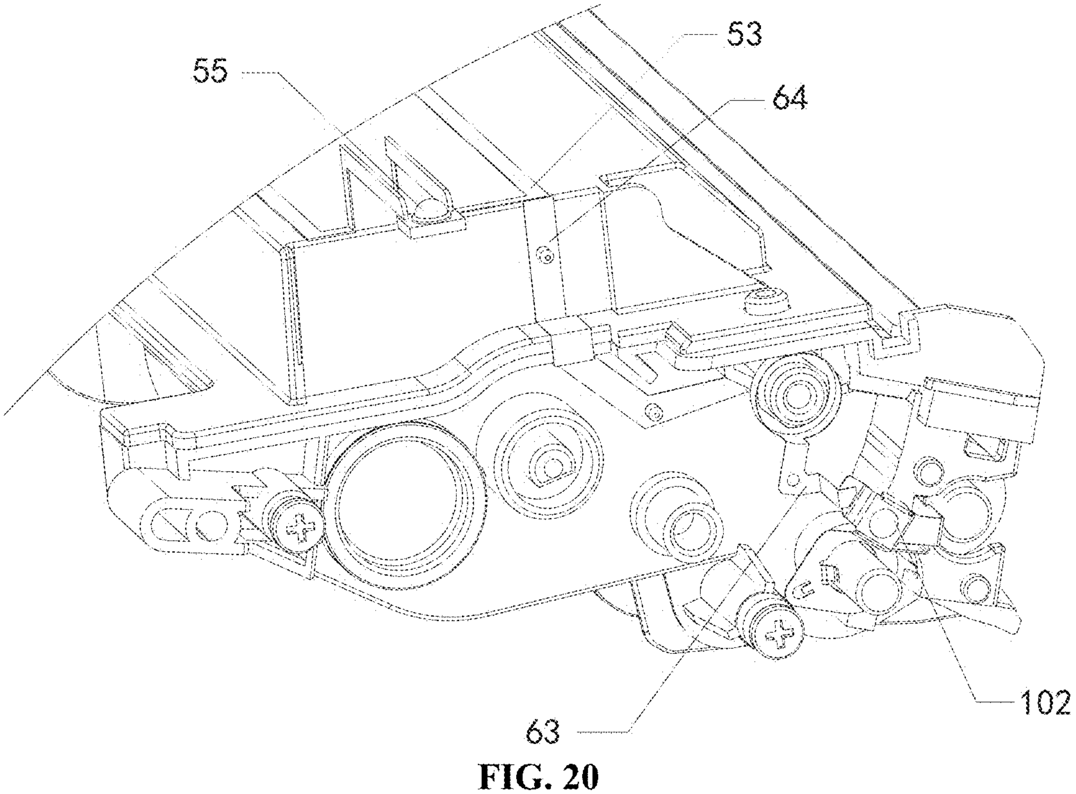
FIG. 20 illustrates a structural schematic of a second side after a second protective cover is hidden provided by exemplary embodiment five of the present disclosure.
Figure 21:
FIG. 21 illustrates a schematic of a circuit provided by exemplary embodiment five of the present disclosure.

As shown in FIGS. 19-21, an electrical transmission part may be disposed on the developing cartridge 1. The electrical transmission part may be configured to be electrically connected to the connecting part 53 and the electrode 102, such that the connecting part 53 may receive the electrical energy transmitted by the electrode 102, and the light-emitting part 55 may receive the electrical energy to emit light. That is, the electrode may be configured as the power supply part in one embodiment, which may satisfy the electrical energy requirement for the light-emitting part 55 to emit light.

A bearing 103 may be disposed at the second side 12 may rotatably support the developing roller 131 and the end of the developer feeding roller at the second side 12. The electrode 102 may be, optionally, a conductive steel sheet, and the electrode 102 may be supported by the bearing 103. The electrode 102 may include an electrical receiving portion 1021. The electrical receiving portion 1021 may be in contact with the power supply terminal in the image-forming apparatus to receive the electrical energy outputted by the image-forming apparatus. The electrode 1021 may transmit electrical energy to the developing roller 131 and the developer feeding roller and may be electrically connected to the connecting part 53 through the electrical transmission part to provide electrical energy.

In one embodiment, to reasonably configure the installation and arrangement of the electrical transmission parts, optionally, the electrical transmission part may include the first electrical transmission part 63 and the second electrical transmission part 64. Optionally, both the first electrical transmission part 63 and the second electrical transmission part 64 may be conductive steel sheets or other conductive materials. The first electrical transmission part 63 and the second electrical transmission part 64 may be supported by the casing 10, the bearing 103 or the second protective cover 121. In some embodiments, the first electrical transmission part 63 and the second electrical transmission part 64 may be formed into a single piece. The first electrical transmission part 63 may be in direct contact with the electrode 102 to receive the electrical energy transmitted by the electrode 102. One end of the second electrical transmission part 64 may be in contact with the first electrical transmission part 63, and another end of the second electrical transmission part 64 may be in contact with the connecting part 53. In such way, the first electrical transmission part 63 may transmit the electrical energy received from the electrode 102 to the connecting part 53 through the second electrical transmission part 64, such that the circuit where the light-emitting part 55 is located may receive external electrical energy. Furthermore, the electrical energy requirement of the light-emitting part 55 when the circuit is in conduction may be satisfied, thereby ensuring that the light-emitting part 55 may stably emit light and the light source detection apparatus 201 may detect the light source. The electrical transmission part and the connecting part 53 may be formed into a single piece, that is, the connecting part 53 may be directly in electrical contact with the electrode 102. Or the electrical transmission part may be directly in direct contact with the power supply terminal on the image-forming apparatus to receive electrical energy, and the electrical transmission part may be configured as the power supply part.

In one embodiment, a grounding part 62 may be also disposed. The grounding part 62 may be configured to enable the circuit of the light-emitting part 55 to form a complete loop, thereby ensuring the safety and stability of the circuit. In one embodiment, the grounding part 62 may be, optionally, configured to be adjacent to the first side 11; that is, the distance between the grounding part 62 and the second side 12 in the first direction may be greater than the distance between the grounding part 62 and the first side 11. One end of the grounding part 62 may be in contact with the trigger part, and another end of the grounding part 62 may be in contact with the outside of the developing cartridge 1, optionally, may be in contact with the metal part in the image-forming apparatus. In one embodiment, the grounding part 62 may be, optionally, a conductive elastic part such as a spring. The conductive elastic part may elastically avoid the interfering parts in the image-forming apparatus during the process of installing the developing cartridge 1 into the image-forming apparatus, which may not only ensure that the developing cartridge 1 may be stably installed in the image-forming apparatus, but also may stably contact the metal part in the image-forming apparatus after being installed in the image-forming apparatus.

The developing roller 131 may include a developing roller shaft and a developing body; the developing roller shaft may drive the developing body to rotate; and the developing body may be made of conductive rubber. The developer feeding roller may include a developer feeding roller shaft and a developer feeding body; the developer feeding roller shaft may drive the developer feeding body to rotate; and the developer feeding body may be made of conductive sponge. In one embodiment, the developing roller shaft may be electrically connected to the developing body; the developer feeding roller shaft may be electrically connected to the developer feeding body; and the developing body and the developer feeding body may be configured to absorb the developer. The electrode 102 may be directly in contact with the developing roller shaft and the developer feeding roller shaft to transfer electrical energy.

In some embodiments, the developing roller shaft and the developing body may be not electrically connected (i.e., insulated); the developing roller shaft may not receive electrical energy; and the developer feeding body may be in contact with the developing body to transfer electrical energy to the developing body. An intermediate conductive part such as a spring may be also disposed; and the intermediate conductive part may be electrically connected to the electrode 102 and the developing body to further enable the developing body to receive electrical energy. A layer thickness regulating blade for limiting the thickness of the developer layer on the developing body may be electrically connected to the electrode 102. The layer thickness regulating blade may be electrically connected to the developing body as an intermediate conductive part.

Exemplary Embodiment Six

Unless otherwise specified, the structure of the developing cartridge 1 in exemplary embodiment six may be same as the structure of the developing cartridge 1 in exemplary embodiment one. The difference between exemplary embodiment six and exemplary embodiment one is that the structure of the power supply part may be different.

Figure 22:
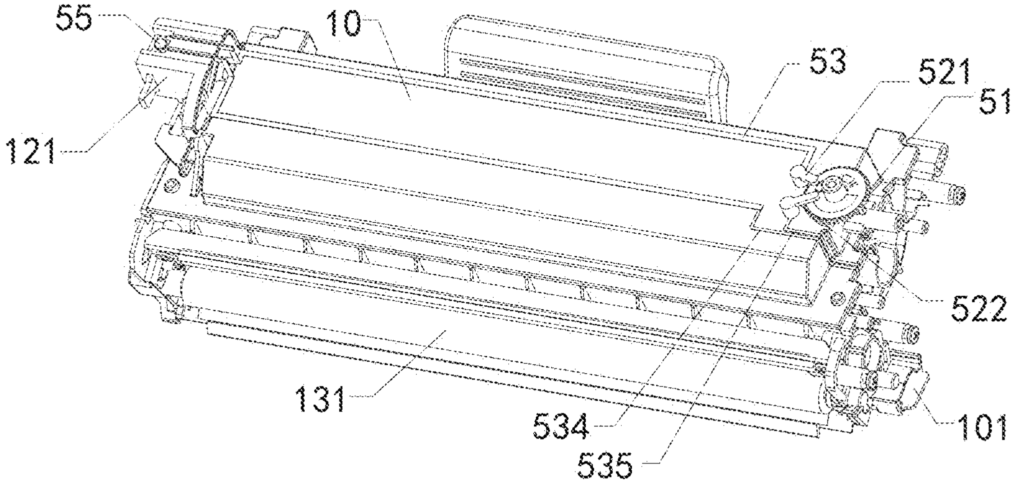
FIG. 22 illustrates a structural schematic of a developing cartridge provided by exemplary embodiment six of the present disclosure.
Figure 23:
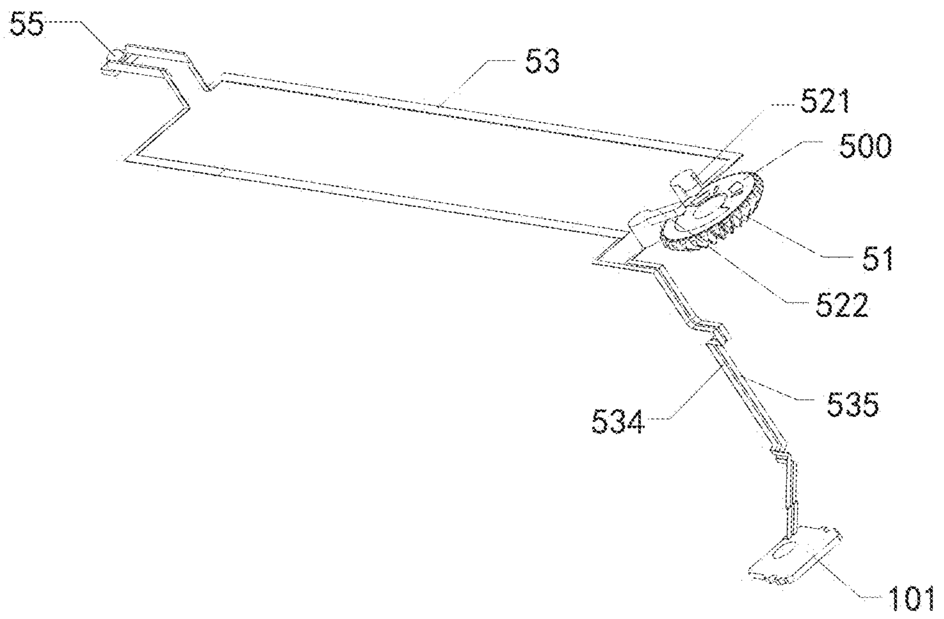
FIG. 23 illustrates a structural schematic of connection between a detected assembly and a storage medium provided by exemplary embodiment six of the present disclosure.

As shown in FIGS. 22-23, the electrical contact surface on the storage medium 101 in one embodiment may provide electrical energy for the circuit where the light-emitting part 55 is located; that is, the electrical contact surface may be configured as the power supply part in one embodiment. The connecting part 53 may include the first line 534 and the second line 535; and the first line 534 and the second line 535 may connect the power supply part, the light-emitting part 55 and the conductive element together to form the circuit.

The storage medium 101 may be disposed with multiple electrical contact surfaces. The electrical contact surfaces may be electrically connected to the storage medium 101. The electrical contact surfaces may include the first electrical contact surface and the second electrical contact surface, which may be arranged at intervals. The first line 534 may be in contact with the first electrical contact surface, and the second line 535 may be in contact with the second electrical contact surface. The first line 534 may be configured to receive the electrical energy transmitted by the first electrical contact surface and make the electrical energy return to the second electrical contact surface after passing through the light-emitting part 55, the conductive part and the second line 535. That is, in one embodiment, the first electrical contact surface may be configured as the positive electrode of the battery, and the second electrical contact surface may be configured as the negative electrode of the electrode.

In one embodiment, the first electrical contact surface may be configured as the power supply part to receive external electrical energy and transmit the energy to the light-emitting part 55 through the first line 534; and the second line 535 may be configured as the grounding part to be in contact with the external part to realize the circuit loop.

In another embodiment, the rotating part 51 and the conductive part may be not disposed; the circuit itself may be a complete loop; and the storage medium 101 may store the first information and the second information; the first information may be the information for controlling the light-emitting time length and the light-emitting interval of the light-emitting part 55; and the second information may be other information relative to the developing cartridge 1. After the developing cartridge 1 is installed in the image-forming apparatus, the electrical contact surface of the storage medium 101 may provide electrical energy to the light-emitting part 55 and also configured as the control unit to control the light-emitting part 55 to emit light at an appropriate time, such that the light source detection apparatus 201 may detect the light source and the image-forming apparatus may generate the signal.

Exemplary Embodiment Seven

Unless otherwise specified, the structure of the developing cartridge 1 in exemplary embodiment seven may be same as the structure of the developing cartridge 1 in exemplary embodiment one. The difference between exemplary embodiment seven and exemplary embodiment one is that the structure of the trigger part may be different.

As shown in FIGS. 24-27, the detected assembly in one embodiment may include a rotating part 60, a switching part 71, a connecting part 53, a power supply part 54 and a light-emitting part 55. The connecting part 53 may connect the switching part 71, the power supply part 54 and the light-emitting part 55 into one circuit. The connecting part 53, the power supply part 54 and the light-emitting part 55 may be same or similar to above-mentioned embodiment, which may not be described in detail herein.

The switching part 71 may be, optionally, configured to be adjacent to the first side 11. The switching part 71 may be configured as the switch to determine whether the circuit of the light-emitting part 55 forms a conduction path. A supporting part 107 may be disposed on the casing 10. The supporting part 107 may include a supporting column 1070 and a fixing lock 1071. The supporting column 1070 may extend in the third direction. The fixing lock 1071 may be an elastic lock. Optionally, there are multiple supporting columns 1070 and multiple fixing locks 1071. The switching part 71 may include the first hole 710 which is optionally a through hole extending in the third direction. The number of the first holes 710 may be matched with the number of the supporting columns 1070. The first hole 710 and the supporting column 1070 may be matched through shaft hole, such that the switching part 71 may be installed on the casing 10. The fixing lock 1071 may be clamped at two ends of the switching part 71 in the second direction to further stabilize the switching part 71. In other embodiments, the switching part 71 may fix the casing 10 by welding or screws.

The switching part 71 may further include a first line-connection terminal 712, a second line-connection terminal 713 and a trigger portion 72. The first line-connection terminal 712 may be connected to the power supply part 54 through the connecting part 53, and the second line-connection terminal 713 may be connected to an integrated board 550 through the connecting part 53. The trigger portion 72 may be a protrusion protruding in the first direction. The trigger portion 72 may be movably installed on the main body of the switching part 71, and further move relative to the main body of the switching part 71 in the first direction. The switching part 71 may include the second hole 711 extending in the first direction. The second hole 711 may be optionally a blind hole. The trigger portion 72 may be at least partially movable in the second hole 711. To ensure that the trigger portion 72 is separated from the second hole 711, a limit structure such as a lock may be disposed between the trigger portion 72 and the second hole 711. The first elastic portion 720 may be disposed between the trigger portion 72 and the sidewall of the second hole 711. The first elastic portion 720 may be optionally a compression spring, or other elastic medium. The first elastic portion 720 may be compressed and stretched in the first direction. The first position and the second position may be configured in the first direction; and the first position may be farther away from the second side 12 than the second position. When the trigger portion 72 is in the second position, the circuit of the light-emitting part 55 may be in conduction, and the light-emitting part 55 may emit light (the light source may be infrared light or other types of light sources); and when the trigger portion 72 is in the first position, the circuit of the light-emitting part 55 may be disconnected, and the light-emitting part 55 may not emit light. When the trigger portion 72 is acted upon by an external force, the trigger portion 72 may move in the first direction toward the second side 12, thereby moving from the first position to the second position, and the first elastic portion 720 may be compressed and continue to exert elastic force; and when the external force is removed, the trigger portion 72 may move in the first direction toward the first side 11 under the action of the first elastic portion 720, thereby moving from the second position to the first position.

The rotating part 60 may be rotatably disposed at the first side 11 and receive the force transmitted by the transmission assembly to rotate, and the rotation axis of the rotating part 60 may extend in the first direction. The rotating part 60 may include an engaging portion 600 and an abutting protrusion, and the engaging portion 600 may be toothless. The engaging portion 600 may be engaged with the agitator gear 44, such that the rotating part 60 may receive force to rotate. The toothless structure may make the engaging portion 600 to be disengaged from the agitator gear 44 and stop the rotating part 60 from rotating.

The abutting protrusion may be configured to be abutted against the trigger portion 72 and drive the trigger portion 72 to move in the first direction. The abutting protrusions may protrude in the first direction, and the number of the abutting protrusions may be configured to be multiple. Optionally, the abutting protrusions may include the first abutting protrusion 601, the second abutting protrusion 602 and the third abutting protrusion 603 which are arranged at intervals along the rotation direction of the rotating part 60. Along the rotation direction of the rotating part 60, the first abutting protrusion 601, the second abutting protrusion 602 and the third abutting protrusion 603 may be abutted against the trigger portion 72 sequentially and make the trigger portion 72 move in the first direction toward the second side 12. In order to make the abutment between the abutting protrusion and the trigger portion 72 smoother, the first abutting protrusion 601, the second abutting protrusion 602 and the third abutting protrusion 603 may be all disposed with abutting surfaces of inclined surfaces or arc surfaces; and the extension direction of the abutting surface may intersect the first direction. Similarly, an inclined surface may also be disposed on the trigger portion 72. The arc lengths corresponding to the first abutting protrusion 601, the second abutting protrusion 602 and the third abutting protrusion 603 may be same or different, and the angles between the abutting surfaces thereon and the first direction may be same or different, which may be set according to actual needs.

Figure 26:
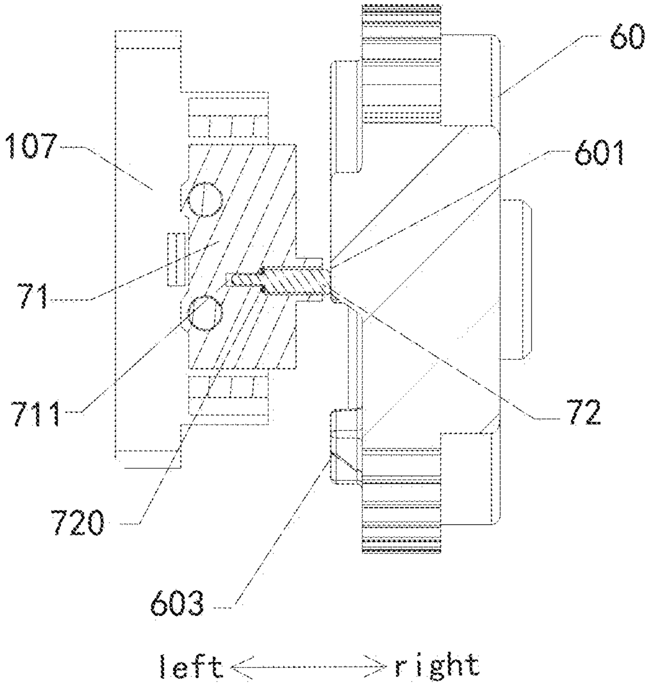
FIG. 26 illustrates a structural schematic of a trigger part in contact with an abutting protrusion provided by exemplary embodiment seven of the present disclosure.

As shown in FIG. 26, the rotating part 60 may receive the force transmitted by the transmission assembly to rotate; the first abutting protrusion 601 may be abutted against the trigger portion 72 to be in the second position; the circuit of the light-emitting part 55 may be in conduction; the light-emitting part 55 may receive the electrical energy released by the power supply part 54 to emit light; and the light source detection part 201 may detect the light source.

When the trigger portion 72 is located at the interval between the first abutting protrusion 601 and the third abutting protrusion 603, the trigger portion 72 may be in the first position under the action of the first elastic portion 720, and the circuit of the light-emitting part 55 may be disconnected.

That is, when the first abutting protrusion 601, the second abutting protrusion 602 and the third abutting protrusion 603 are abutted against the trigger portion 72, the trigger portion 72 may be in the second position, and the circuit may be in conduction; when the trigger portion 72 is located at the interval (i.e., located in the first position) under the action of the first elastic portion 720, the circuit may be disconnected.

It should be known that the light-emitting time length of the light-emitting part 55 may be determined according to the arc length of the abutting protrusion; the interval time length of the light-emitting part 55 may be determined according to the interval between the abutting protrusions; the number of times for the light-emitting part 55 to emit light may be determined according to the number of abutting protrusions; and the light-emitting speed of the light-emitting part 55 may be determined according to the moving speed of the trigger portion 72 (i.e., the inclination degree of the abutting inclined surface).

That is, in one embodiment, the circuit may be in conduction and disconnection through a manner that the plurality of abutting protrusions is sequentially abutted against the trigger portion 72 and the trigger portion 72 is sequentially separated (dis-abutted) from the plurality of abutting protrusions. In such way, the light-emitting part 55 may emit light and be turned off multiple times, which may satisfy the requirement of the image-forming apparatus.

Figure 24:
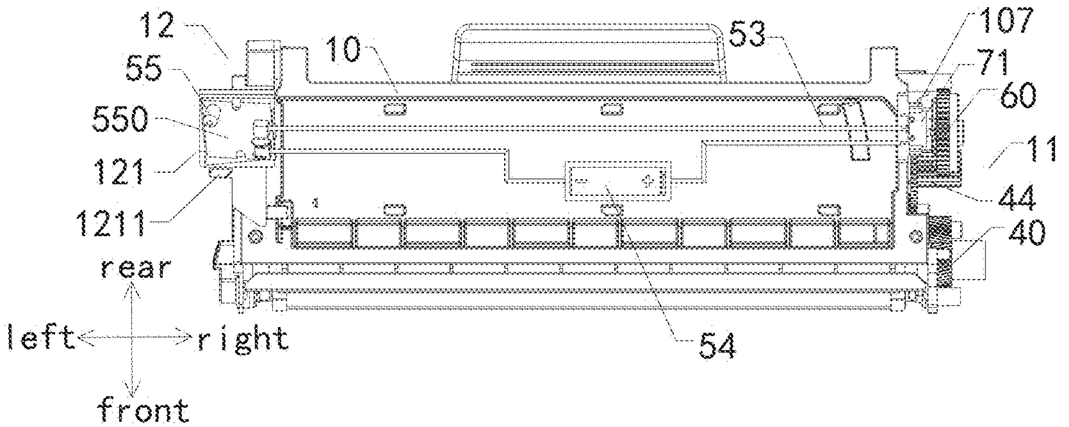
FIG. 24 illustrates a structural schematic of a developing cartridge provided by exemplary embodiment seven of the present disclosure.
Figure 25:
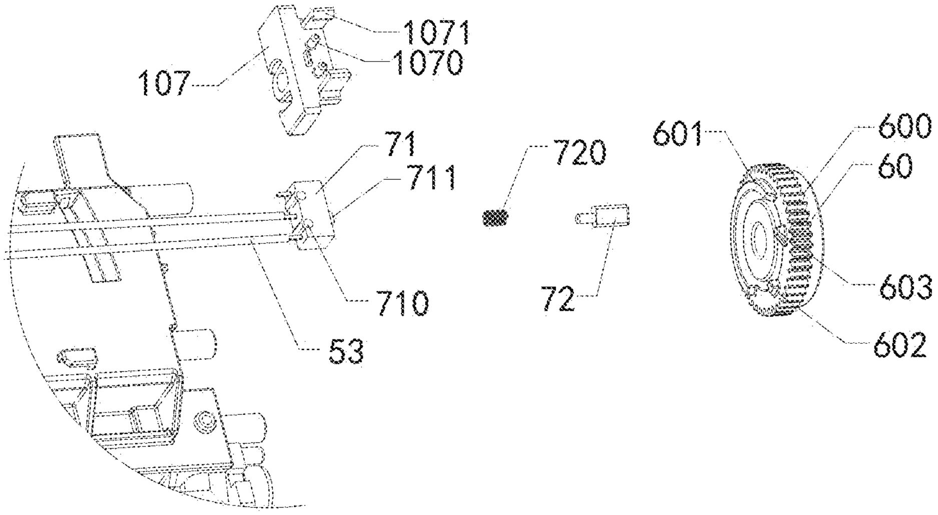
FIG. 25 illustrates an exploded view of a switching part and a rotating part provided by exemplary embodiment seven of the present disclosure.

As shown in FIG. 24, in one embodiment, the light-emitting part 55 may be on the integrated circuit board 550 which may be connected to the connecting part 53.

In another embodiment, the trigger portion 72 may move in a swinging manner after being abutted by the abutting protrusion, such that the circuit that the light-emitting part 55 is located may be in conduction.

Figure 27:
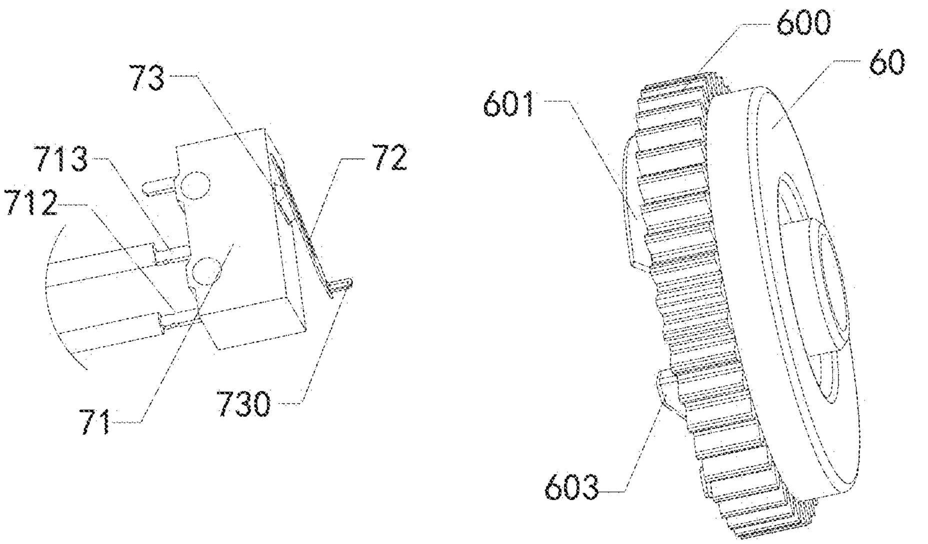
FIG. 27 illustrates a structural schematic of an intermediate part, an abutting protrusion and a trigger part which are in contact with each other provided by exemplary embodiment seven of the present disclosure.
Figure 28:
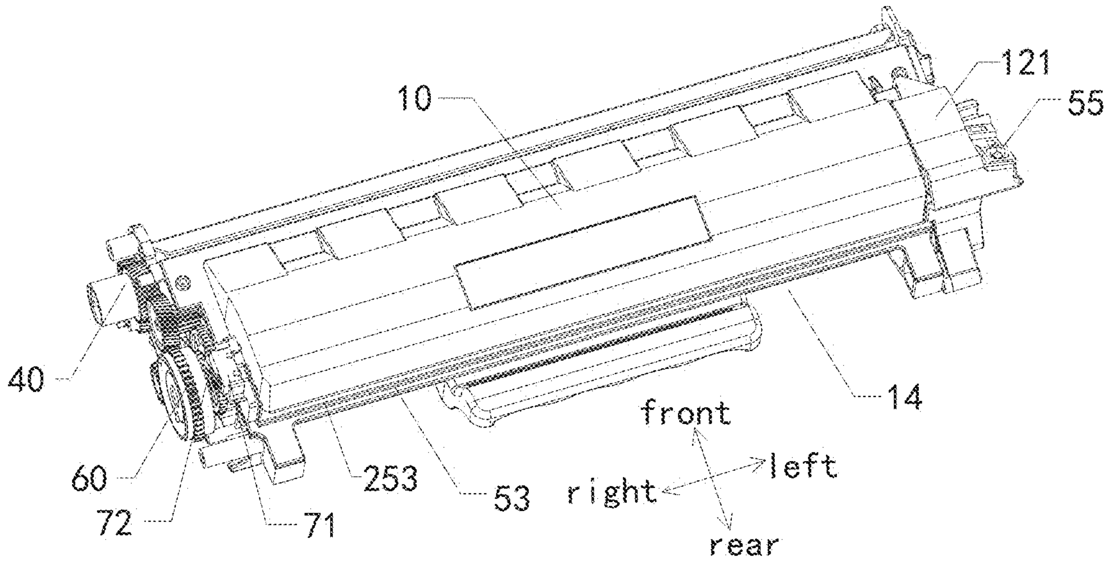
FIG. 28 illustrates a structural schematic of a developing cartridge provided by exemplary embodiment eight of the present disclosure.
Figure 29:
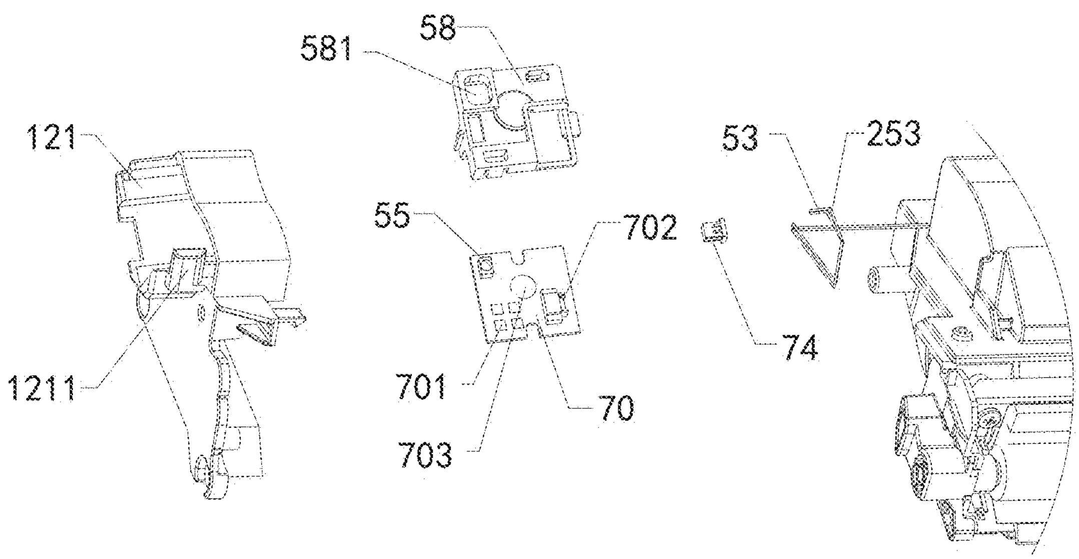
FIG. 29 illustrates an exploded view of a second side provided by exemplary embodiment eight of the present disclosure.
Figure 30:
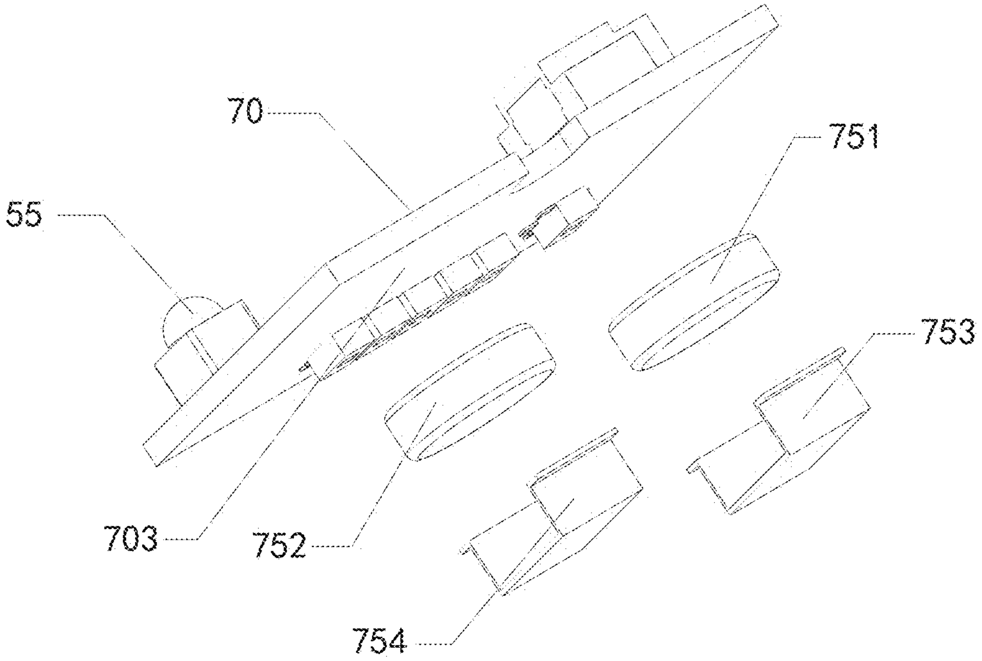
FIG. 30 illustrates an exploded view of a control unit and a power supply part provided by exemplary embodiment eight of the present disclosure.
Figure 31:
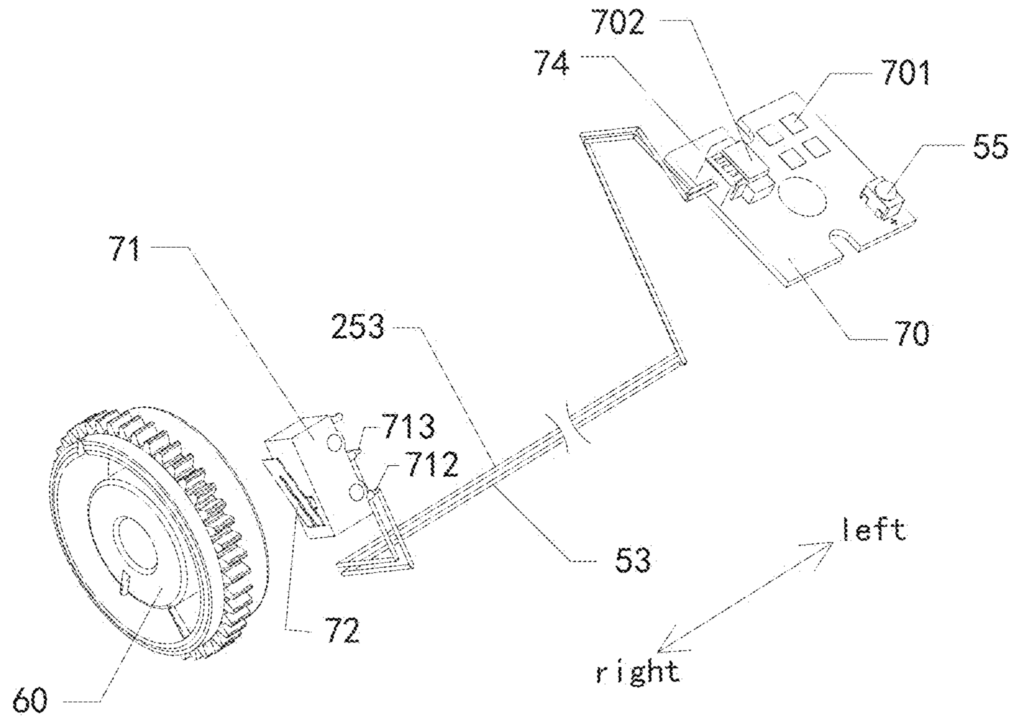
FIG. 31 illustrates a structural schematic of a detected assembly provided by exemplary embodiment eight of the present disclosure.

As shown in FIG. 27, in other embodiments, the trigger portion 72 may be not directly in contact with the abutting protrusion. An intermediate part 73 may be also disposed on the switching part 71; and the trigger portion 72 may be between the intermediate part 73 and the abutting protrusion. The intermediate part 73 may be abutted against the abutting protrusion to move and drive the trigger portion 72 to move. The intermediate part 73 may be plate-shaped. One end of the intermediate part 73 may be fixedly connected to the main body of the switching part 71; another end of the intermediate part 73 may be disposed with an abutted protrusion 730; and the abutting protrusion may be abutted against the abutted protrusion 730 to make the intermediate part 73 to swing, such that the intermediate part 73 may drive the trigger portion 72 to move in the first direction toward the second side 12.

In one embodiment, the switching part 71 may be a micro switch.

Exemplary Embodiment Eight

Unless otherwise specified, the structure of the developing cartridge 1 in exemplary embodiment eight may be same as the structure of the developing cartridge 1 in exemplary embodiment seven. The difference between exemplary embodiment eight and exemplary embodiment seven is that the structure of the detected assembly may be different.

As shown in FIGS. 28-34, the detected assembly in one embodiment may include the control unit 70, the rotating part 60, the switching part 71, the connecting part 53, the power supply part and the light-emitting part 55. The rotating part 60 may control the turn-on and turn-off of the switching part 71 to control whether the circuit of the light-emitting part 55 is in conduction. The switching part 71 may include the first line-connection terminal 712, the second line-connection terminal 713 and the trigger portion 72. The first line-connection terminal 712 and the second line-connection terminal 713 may be respectively connected to the control unit 70 through the connecting part 53.

The control unit 70 may be, optionally, an integrated circuit board, i.e., an IC chip. The control unit 70 may store information such as the number of light-emitting times and light-emitting durations (time) of the light-emitting part 55. The control unit 70 may control the light-emitting part 55 to emit light and determine the number of light-emitting times and light-emitting durations (time) of the light-emitting part 55 within a predetermined time. That is, in one embodiment, the light-emitting time and the number of light-emitting times of the light-emitting part 55 may be not controlled by the number of times of the rotating part 60 being abutted against the switching part 71. In one embodiment, only one abutting protrusion may be disposed, or only the end surface of the rotating part 60 may be abutted against the switching part 71. In one embodiment, the rotating part 60 may move in the first direction and be abutted against the switching part 71 with the end surface. In one embodiment, the light-emitting part 55 may be disposed on the control unit 70 by a manner of welding, plugging or the like, and may be electrically connected to the control unit 70. Furthermore, the light-emitting part 55 may be on the upper end surface of the control unit 70 facing upward in the third direction and may be on the side of the control unit 70 away from the first side 11 in the first direction and on the side away from the developing roller 131 in the second direction. That is, the light-emitting part 55 may be at the left rear position of the control unit 70. In the second direction, the distance L1 between the light-emitting part 55 and the rotation axis of the developing roller 131 may be between 50 mm and 75 mm, and optionally may be 62.5 mm in one embodiment. In the first direction, the electrode 102 may be at least partially closer to the first side 11 than the light-emitting part 55.

When the developing cartridge 1 is installed in the image-forming apparatus, in the second direction, the light source detection apparatus 201 in the image-forming apparatus may be in front of the light-emitting part 55. Therefore, the light-emitting direction X of the light-emitting part 55 (i.e., the main direction of the light emitted by the light-emitting part 55) may intersect the second direction and the third direction. In one embodiment, the angle A1 between X and the second direction may be 20°~80°. Optionally, the angle A1 in one embodiment may be 63°. In some embodiments, the light-emitting direction of the light-emitting part 55 may be directly in parallel with the third direction; or the light-emitting part 55 may be moved forward to the bottom or front of the light source detection element 201, and the light may be transmitted to the light source detection apparatus. That is, the angle of angle A1 may change according to the change of the size of L1, which may be not limited in one embodiment.

The control unit 70 may also include a writing unit 701, a first connection port 702, a storage module 703 and a control module. The writing unit 701 and the first connection port 702 are both located on same end surface of the control unit 70 as the light-emitting part 55. The writing part 701 may be a plurality of metal surfaces and may be configured to contact external parts to input information such as light-emitting time durations (length) and the number of light-emitting times of the light-emitting part 55 into the control unit 70. The storage module 703 may be configured to store the program written by the writing part 701 and send the program within a predetermined time. The storage module may adopt a flash memory chip or an EEPROM (Electrically Erasable Programmable read only memory). The control module may execute the program and output the electrical signal for controlling the light-emitting element to emit light or be turned off. The control module may adopt a micro-controller (MCU) or a programmable logic controller (PLC). The connecting part 53 may be fixed by the first plug-in part 74. The first plug-in part 74 may be inserted into the first connection port 702 to realize the electrical connection between the control unit 70 and the switching part 71. In one embodiment, the control unit 70 may be configured as the second storage medium different from the storage medium 101.

In one embodiment, the power supply may be electrically connected to the control unit 70 through an electrical contact manner. The power supply may be, optionally, a button battery. In one embodiment, the power supply unit may include the first power supply unit part 751 and the second power supply unit part 752 with a specification of 1.5V. In some embodiments, only one power supply part with a specification of 3V may be disposed. The first power supply part 751 and the second power supply part 752 may be in electrical contact at the lower end surface of the control unit 70 in the third direction to transfer electrical energy; that is, the light-emitting part 55 and the power supply may be on different end surfaces of the control unit 70 in the third direction. In order to prevent the power supply part from being out of contact with the control unit 70, a limiting part may be also disposed. The limiting part may be fixedly connected to the control unit 70 by a welding or gluing manner. The power supply part may be limited between the limiting part and the lower end surface.

In one embodiment, the limiting part may include the first limiting part 753 and the second limiting part 754. The first limiting part 753 and the second limiting part 754 may limit the first power supply part 751 and the second power supply part 752 respectively. The limiting part may be, optionally, a steel sheet. The positive electrode of the power supply part may be in contact with the lower end surface of the control unit 70, and the negative electrode of the power supply part may be in contact with the limiting part.

The control unit 70 may be also disposed with other electronic elements such as resistors, capacitors and transistors located at the lower end surface to form a complete electronic system. In one embodiment, specific positions of the electronic elements may be not limited, which may be set according to actual needs.

An installation part 58 may be also disposed at the second side 12. The installation part 58 may be configured to support the control unit 70. The installation part 58 may be combined with the control unit 70 by a locking manner. The installation part 58 may at least cover the upper end surface of the control unit 70 to protect the control unit 70. The installation part 58 may be configured with an exposure hole 581. The exposure hole 581 may be configured to expose the light-emitting part 55, such that the light emitted from the light-emitting part 55 may be detected by the light source detection apparatus. When the installation part 58 is connected to the control unit 70, the installation part 58 may be fixedly connected to the second protective cover 121 by a locking or screwing manner or may be fixedly connected to the casing 10.

In one embodiment, the connecting part 53 may be at least partially located at the fourth side 14. That is, the connecting part 53 may be connected to the switching part 71, bend after extending in the second direction and may extend to the left in the first direction to the second side 12, and then be electrically connected to the control unit 70. This structure may improve the wiring manner of the connecting part and hide the connecting part 53 at the fourth side 14 to prevent the connecting part 53 from being interfered with by external parts. The fourth side 14 may be disposed with an accommodating portion may be disposed at the fourth side 14 to accommodate the connecting part 53 therein or may be disposed with an installation lock to support the connecting part 53.

When the rotating part 60 receives the force transmitted by the coupling 40 to rotate, the rotating part 60 may be abutted against the switching part 71 to make the switching part 71 in a turn-on state, and the light-emitting part 55 may emit light and be turned off under the control of the control unit 70, such that the light source detection apparatus may detect the light source and generate the signal. When the rotating part 60 stops rotating, the rotating part 60 may be disengaged from the switching part 71, the switch may be disconnected, the control unit 70 may stop sending commands to the light-emitting part 55, and the light-emitting part 55 may be turned off. That is, in one embodiment, the rotating part 60, as a detected part, may make the switching part 71 to be turned on, such that the control unit 70 may send commands.

In one embodiment, the rotating part 60 may change from non-contact to continuous contact with the switching part 71; that is, the switching part 71 may not need to be disconnected again after being disconnected and turned on. The command sent by the control unit 70 may only make the light-emitting part 55 change between light-emitting and turn-off within a certain period of time. The turn-on of the switching part 71 may only transmit the signal to the control unit 70 to start sending commands.

It should be known that in one embodiment, the control unit 70 may send commands to the light-emitting part 55 multiple times; that is, when the rotating part 60 is engaged with the agitator gear 44 again to receive force and rotate, and when the rotating part 60 triggers the switching part 71 again, the control unit 70 may send commands to the light-emitting part 55 again.

Figure 35:
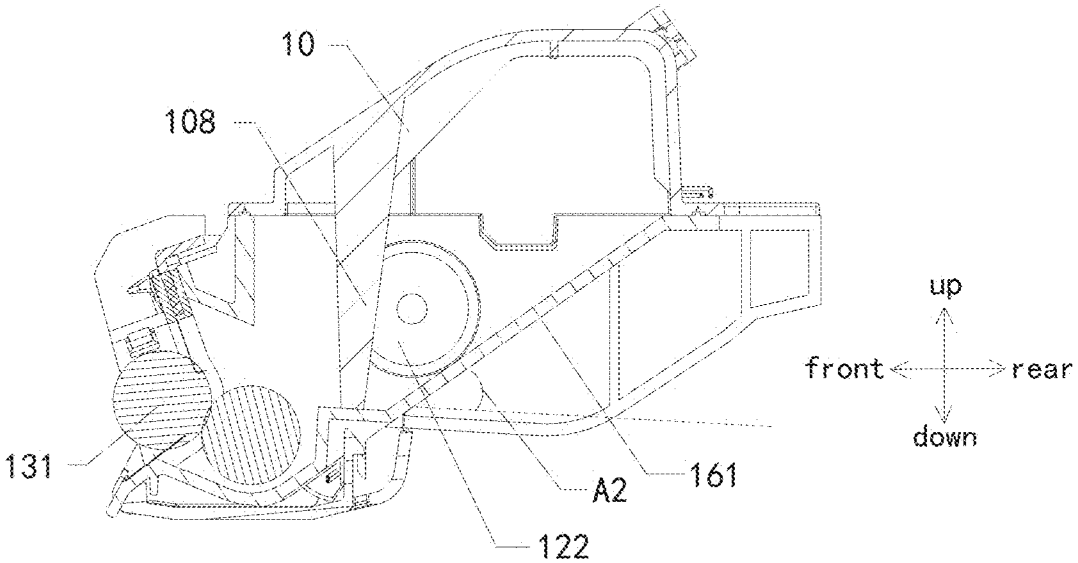
FIG. 35 illustrates a cross-sectional view of a developing cartridge provided by exemplary embodiment eight of the present disclosure.

As shown in FIG. 35, in one embodiment, the agitator may be no longer disposed; the bottom wall 161 of the casing 10 may be inclined relative to the second direction; and the bottom wall 161 may extend forward in the second direction and extend downward in the third direction. An angle A2 may be between the bottom wall 161 and the second direction, and the magnitude of the angle A2 may be 20°~70°. In one embodiment, A2 may be, optionally, 46° or 35°. The developer in the casing 10 may flow along the extension direction of the bottom wall 161 under the action of gravity, that is, flow toward the developing roller 131 and the developer feeding roller. Such structure may ensure that the developing roller 131 and the developer feeding roller may stably absorb the developer without the agitator. A reinforcing column 108 may be also disposed in the casing 10. The reinforcing column 108 may extend in the third direction. The reinforcing column 108 may be between two ends of the cover of the casing 10 in the second direction.

Figure 34:
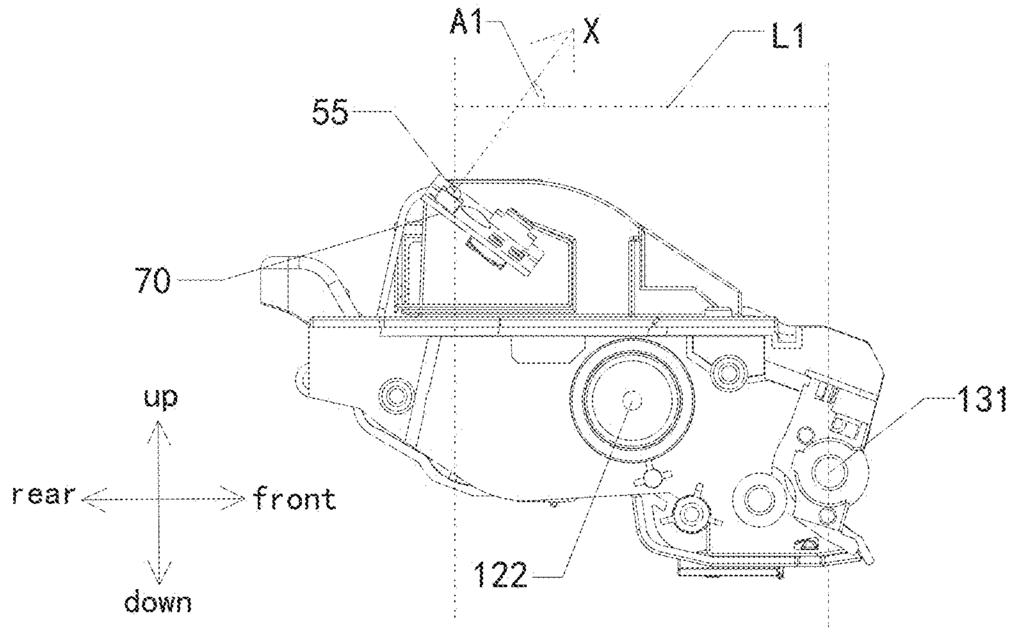
FIG. 34 illustrates a side view of a second side provided by exemplary embodiment eight of the present disclosure.

As shown in FIGS. 34-35, a developer filling port 122 may be also disposed at the second side 12, and the developer 122 may be filled into the casing 10 through the developer filling port 122. In the third direction, the bottom wall 161 may be at least partially below the developer filling port 122. In the second direction, the developer filling port 122 may be between the light-emitting part 55 and the developing roller 131 and between the rotating part 60 and the coupling 40. When viewed from the first direction, the reinforcing column 108 may be at least partially overlapped with the developer filling port 122.

As shown in FIG. 35, the developing cartridge 1 may further include a cover plate 163 and the storage medium 101. The cover plate 163 may extend in the first direction and is fixedly disposed at the sixth side 16 by a locking or screw manner. An installation portion 1631 for installation the storage medium 101 may be disposed on the cover plate 163. The installation portion 1631 may extend in the first direction and be located at the first side 11.

The developing cartridge 1 may also include a bearing 103 and a connecting plate 104 installed on the second side 12; the bearing 103 may be at the front end of the casing 10 in the second direction; the second protective cover 121 may be at the rear end of the casing 10 in the second direction; the connecting plate 104 may be installed on the outer surface of the second protective cover 121 and the bearing 103; and the rear end of the bearing 103 and the front end of the second protective cover 121 may be fixed to the casing 10 through the connecting plate 104. The front end of the bearing 103 may be fixedly connected to the casing 10 by a lock; the rear end of the second protective cover 121 may be fixedly connected to the casing 10 by a locking or screwing manner; the front end of the connecting plate 104 may fix the rear end of the bearing 103 to the casing 10 by a screw; and the rear end of the connecting plate 104 may fix the front end of the second protective cover 121 to the casing 10 by a screw.

Figure 32:
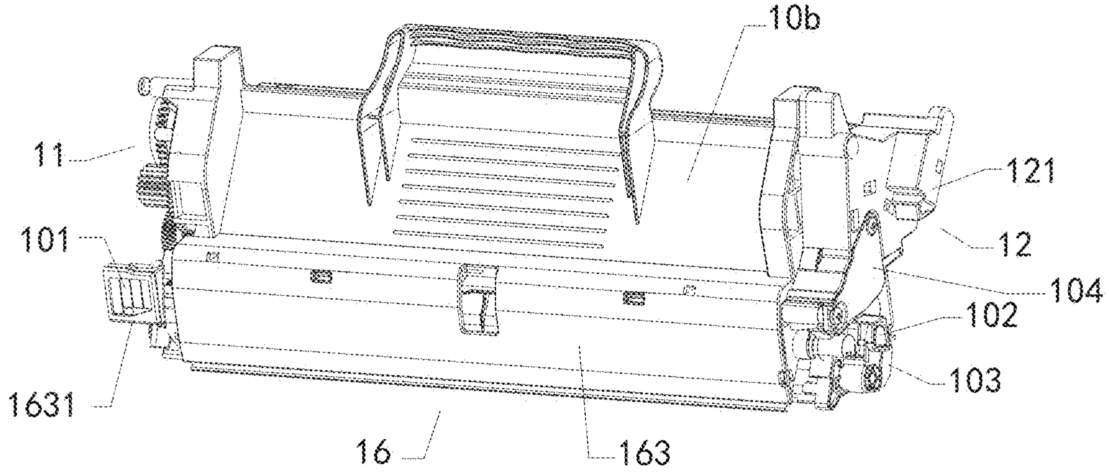
FIG. 32 illustrates a structural schematic of a developing cartridge installed with a cover plate provided by exemplary embodiment eight of the present disclosure.
Figure 33:
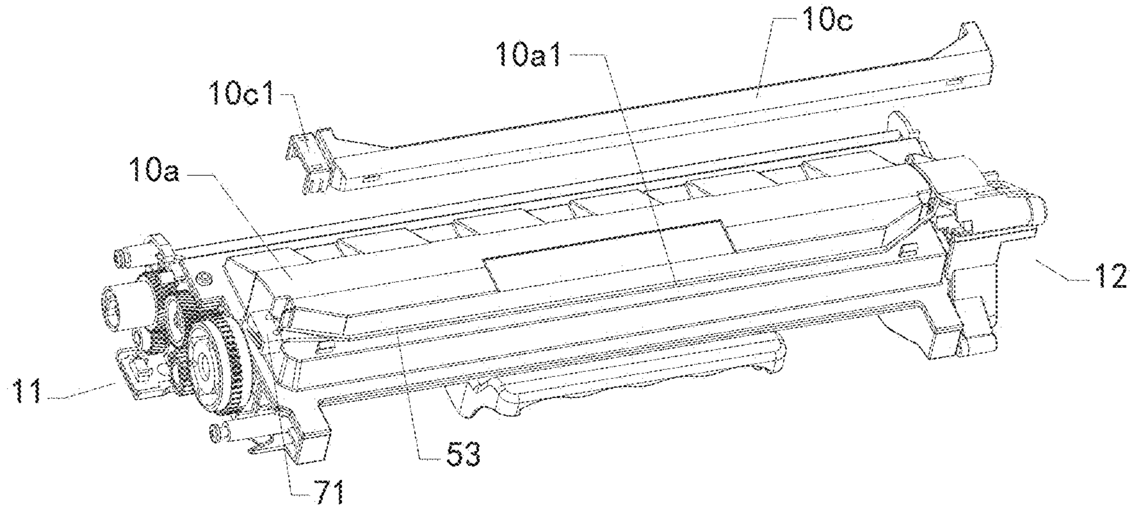
FIG. 33 illustrates a structural schematic of a developing cartridge installed with a protective cover provided by exemplary embodiment eight of the present disclosure.

As shown in FIGS. 32-33, the casing 10 of the developing cartridge 1 may include an upper cover 10*a* and a lower cover 10*b*. The upper cover 10*a* and the lower cover 10*b* may be welded together to form an accommodating cavity for accommodating the developer. The cover plate 163 may be installed on the bottom surface of the lower cover 10*b*, which may be connected by a locking or screwing manner.

The casing 10 of the developing cartridge 1 may also include a protective cover 10*c* which may extend in the first direction. The upper cover 10*a* may be disposed with an accommodating portion 10*a*1 for accommodating the connecting part 53 at the rear end in the second direction. The accommodating portion 10*a*1 may be recessed downward relative to the upper surface of the upper cover 10*a*. The protective cover 10*c* may be installed on the accommodating portion 10*a*1 to protect the connecting part 53.

A protective portion 10*c*1 for protecting the switching part 71 may be disposed at one end of the protective cover 10*c*. After the protective cover 10*c* is installed on the upper cover 10*a*, the protective portion 10*c*1 may cover the switching part 71 to protect the switching part 71 from damage.

Exemplary Embodiment Nine

Unless otherwise specified, the structure of the developing cartridge 1 in exemplary embodiment nine may be same as the structure of the developing cartridge 1 in exemplary embodiment eight. The difference between exemplary embodiment nine and exemplary embodiment eight is that the structure of the switching part may be different.

Figure 36:
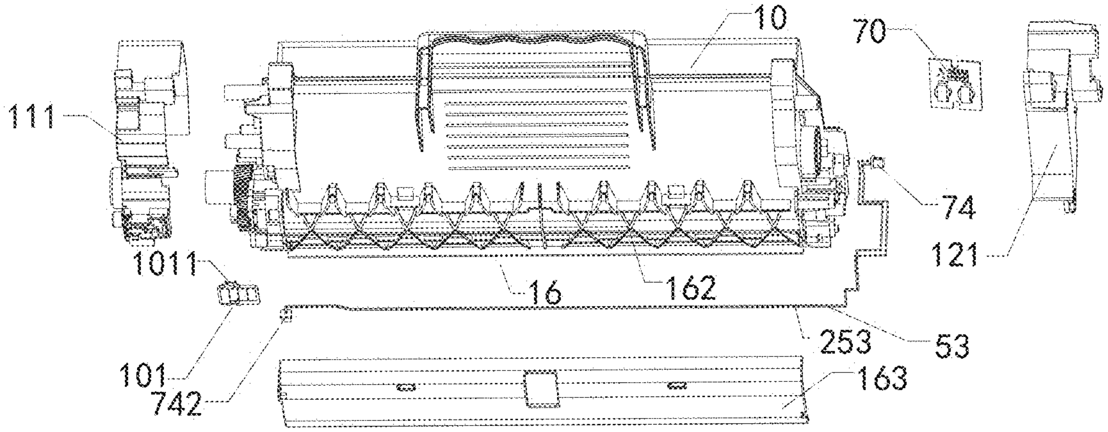
FIG. 36 illustrates a partial exploded view of a developing cartridge provided by exemplary embodiment nine of the present disclosure.
Figure 37:
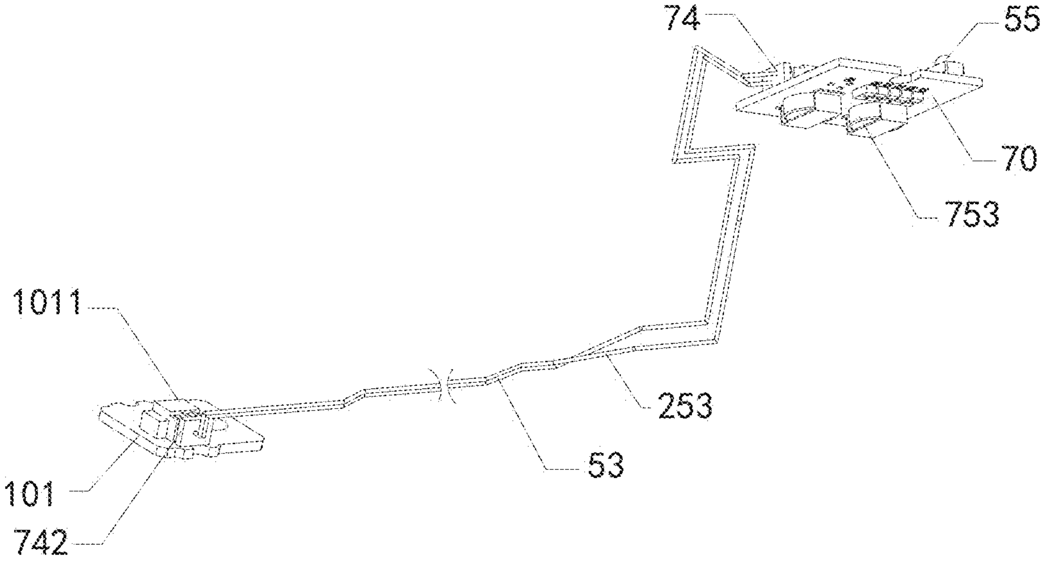
FIG. 37 illustrates a structural schematic of connection of a storage medium and a control unit provided by exemplary embodiment nine of the present disclosure.

As shown in FIGS. 36-37, the switching part in one embodiment may be the storage medium 101, one end of the connecting part 53 may be electrically connected to the control unit 70, and another end of the connecting part 53 may be electrically connected to the storage medium 101. When the developing cartridge 1 is installed in the image-forming apparatus, and when the electrical contact surface of the storage medium 101 is in electrical contact with the electrical contact pin in the image-forming apparatus, the control unit 70 may receive a signal transmitted by the storage medium 101 through the connecting part 53, and such signal may make the control unit 70 to start sending commands to control the light-emitting part 55 to emit light and be turned off. That is, the function of the switch in one embodiment may be no longer to determine the conduction and disconnection of the circuit where the light-emitting part 55 is located, but to send a signal to the control unit 70 to start outputting commands. The circuit where the light-emitting part 55 is located may be always in the conduction state. The commands sent by the control unit 70 may the light-emitting part 55 to change between emitting light and not emitting light within a period of time, rather than always being in the state of alternating between emitting light and not emitting light. The second plug-in part 742 may be disposed on the developing cartridge 1. One end of the connecting part 53 may be connected to the first plug-in part 74, and another end of the connecting part 53 may be connected to the second plug-in part 742. The second connecting part 1011 may be disposed on the storage medium 101. The second plug-in part 742 may be inserted into the second connecting part 1011, such that the storage medium 101 may be electrically connected to the connecting part 53, and the storage medium 101 may be electrically connected to the control unit 70.

In one embodiment, the connecting part 53 may be at least partially at the sixth side 16 (i.e., the bottom) of the casing 10, and extend from the sixth side 16 in the third direction to be connected to the control unit 70. The first accommodating groove extending in the first direction may be disposed at the sixth side 16, and the second accommodating groove extending in the third direction may be disposed at the second side 12, such that the connecting part 53 may be installed.

The electrode 102 may also be configured as a signal source to trigger the control unit 70. After the electrode 102 is turned on (powered on), an electrical signal may be released to the control unit 70 through the connecting part 53. After the control unit 70 collects the electrical signal, the control unit 70 may start to control the light-emitting part 55 to emit light and be turned off.

A step-down unit may also be disposed between the electrode 102 and the connecting part 53. The step-down unit may reduce the external electrical energy received by the electrode 102 to the electrical energy adapted by the control unit 70.

The cover plate 163 may cover at least a part of the connecting part 53, such that the part of the connecting part 53 located at the sixth side 16 may be protected.

In one embodiment, a resetting part may also be disposed on the control unit 70. Optionally, the resetting part may be a metal surface. When the control unit 70 needs to send the command to the light-emitting part 55 again, the metal part may be configured to contact the resetting part and the writing part 701 simultaneously, that is, the resetting part and the writing part 701 may be electrically connected to each other, such that the control unit 70 may be reset.

The storage medium 101 in one embodiment may also be disposed on the cover plate 163.

A rib 162 may be also disposed at the sixth side 16 and configured to increase the strength of the casing 10. The rib 162 may be also covered by the cover plate 163.

The structure of the detected assembly in one embodiment may be simplified compared to above-mentioned embodiments, and only need to dispose the coupling 40, the developing gear 41 and the developer feeding gear 42, which may further simplify the structure and cost of the developing cartridge 1.

Exemplary Embodiment Ten

Unless otherwise specified, the structure of the developing cartridge 1 in exemplary embodiment ten may be same as the structure of the developing cartridge 1 in exemplary embodiment eight. The difference between exemplary embodiment ten and exemplary embodiment eight is that the structure of the switching part may be different.

Figure 38:
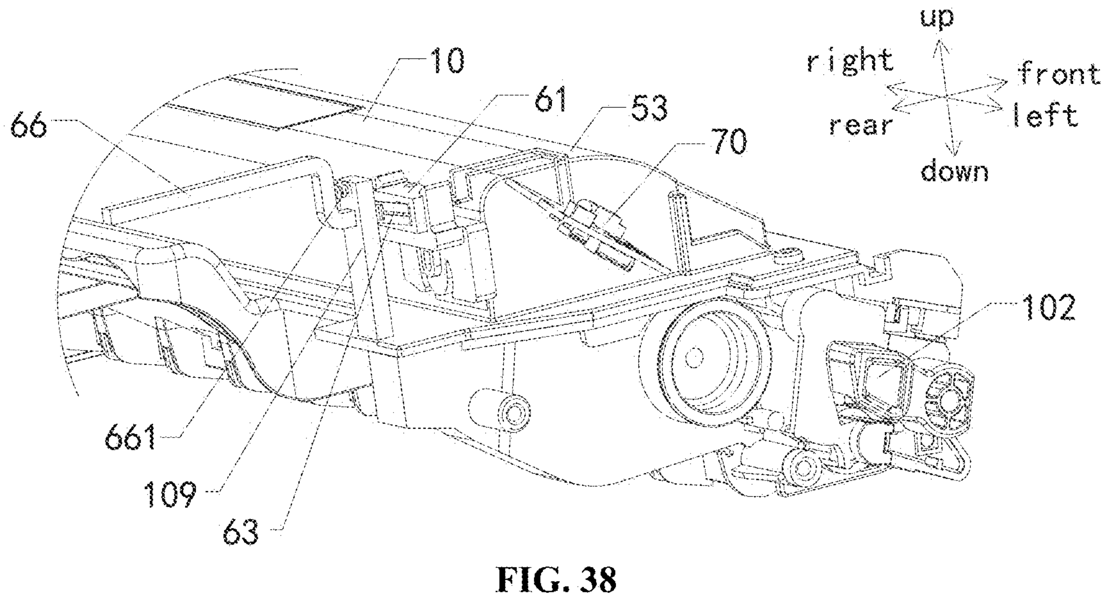
FIG. 38 illustrates a structural schematic of a second side after a second protective cover is hidden provided by exemplary embodiment ten of the present disclosure.
Figure 39:
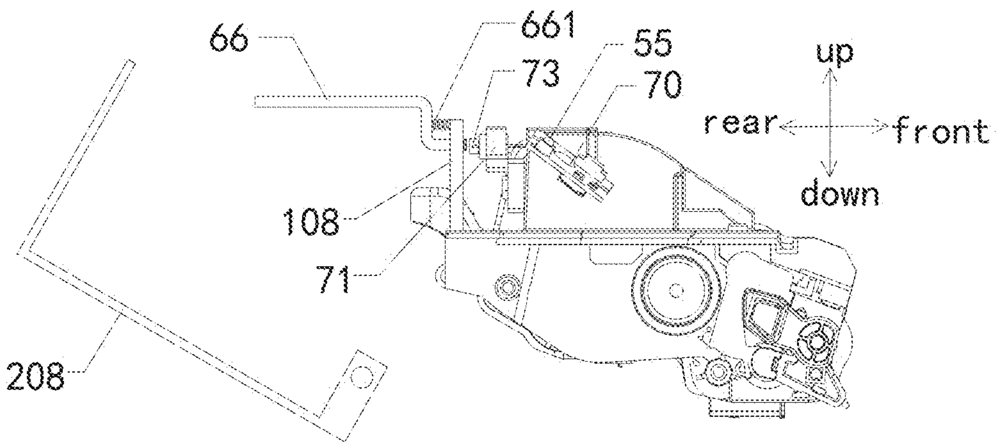
FIG. 39 illustrates a structural schematic of a door cover not closed and a switching part not closed provided by exemplary embodiment ten of the present disclosure.

As shown in FIGS. 38-39, in one embodiment, the switching part 63 may be disposed at the fourth side 14. Optionally, the switching part 63 may be disposed to be adjacent to the second side 12 in the first direction, which may save the length of the connecting part 55. The developing cartridge 1 may be also disposed with a sliding part 66, which may slide relative to the casing 10 in the second direction. In the second direction, the sliding part 66 may be farther away from the developing roller 131 than the switching part 71 and may be configured to be abutted against the abutting part 73 to make the switching part 61 in a turn-on state.

The casing 10 may be disposed with a supporting protrusion 109 extending in the third direction. The supporting protrusion 109 may be a column shape and movably support the sliding part 66. The supporting protrusion 109 may include a through hole passing through in the second direction, and the sliding part 66 may be inserted into the through hole to be slidably connected to the supporting protrusion 109. An elastic part 661 may be disposed between the supporting protrusion 208 and the sliding part 66. Optionally, the elastic part 661 may be a compression spring. The elastic part 66 may be configured to prevent the sliding part 66 from sliding forward in the second direction.

When the developing cartridge 1 is installed to the image-forming apparatus but a door cover 202 of the image-forming apparatus is not closed, the switching part 71 may be in the turn-off (disconnected) state, and the control unit 70 cannot send the command to make the light-emitting part 55 emit light. When the door cover 202 begins to gradually close, the door cover 202 may be abutted against one end of the sliding part 66, such that the sliding part 66 may overcome the elastic force of the elastic part 661 and slide forward in the second direction; and another end of the sliding part 66 may be abutted against the trigger portion 73, such that the switching part 71 may be turned-on. At this point, the control unit 70 may send the command to switch the light-emitting part 55 between emitting light and not emitting light within a predetermined time.

Exemplary Embodiment Eleven

Unless otherwise specified, the structure of the developing cartridge 1 in exemplary embodiment eleven may be same as the structure of the developing cartridge 1 in exemplary embodiment eight. The difference between exemplary embodiment eleven and exemplary embodiment eight is that the structure of the switching part may be different.

Figure 40:
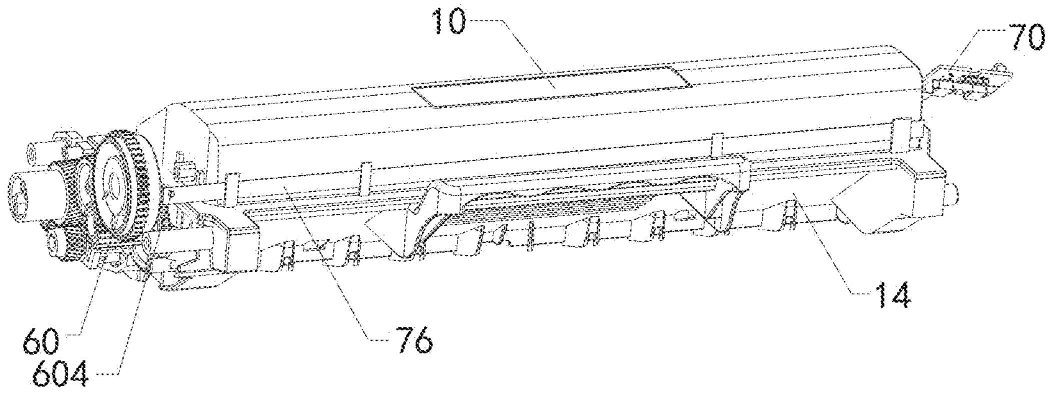
FIG. 40 illustrates a structural schematic of a developing cartridge provided by exemplary embodiment eleven of the present disclosure.
Figure 41:
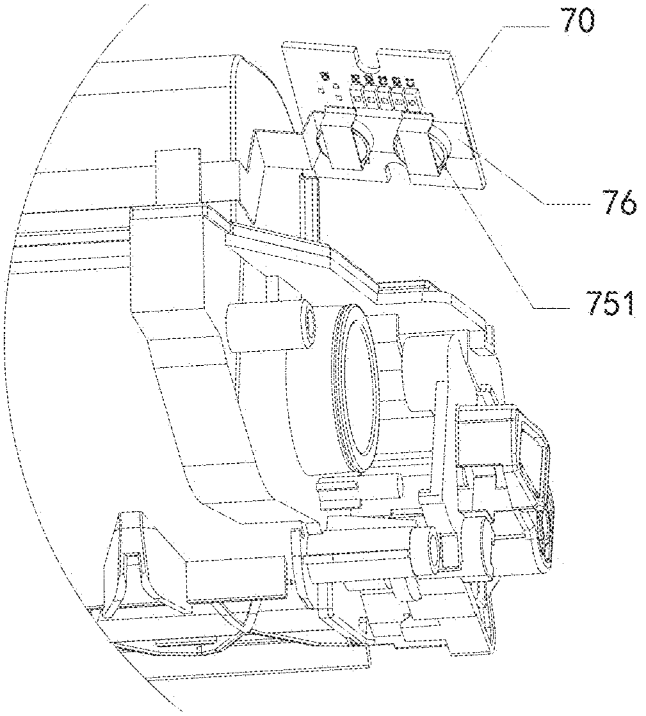
FIG. 41 illustrates a structural schematic of an insulating part isolating a power supply part and a control unit provided by exemplary embodiment eleven of the present disclosure.
Figure 42:
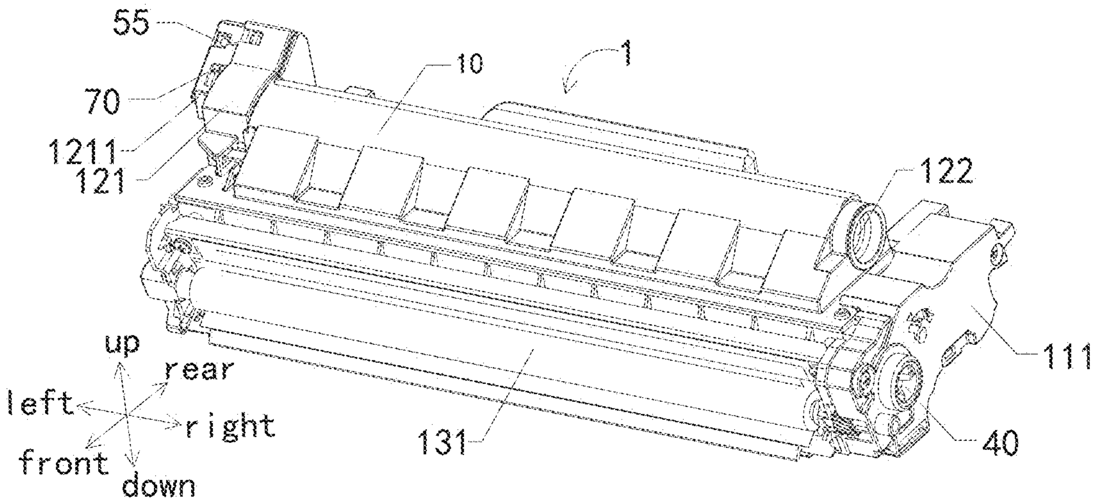
FIG. 42 illustrates a structural schematic of a developing cartridge provided by exemplary embodiment twelve of the present disclosure.
Figure 43:
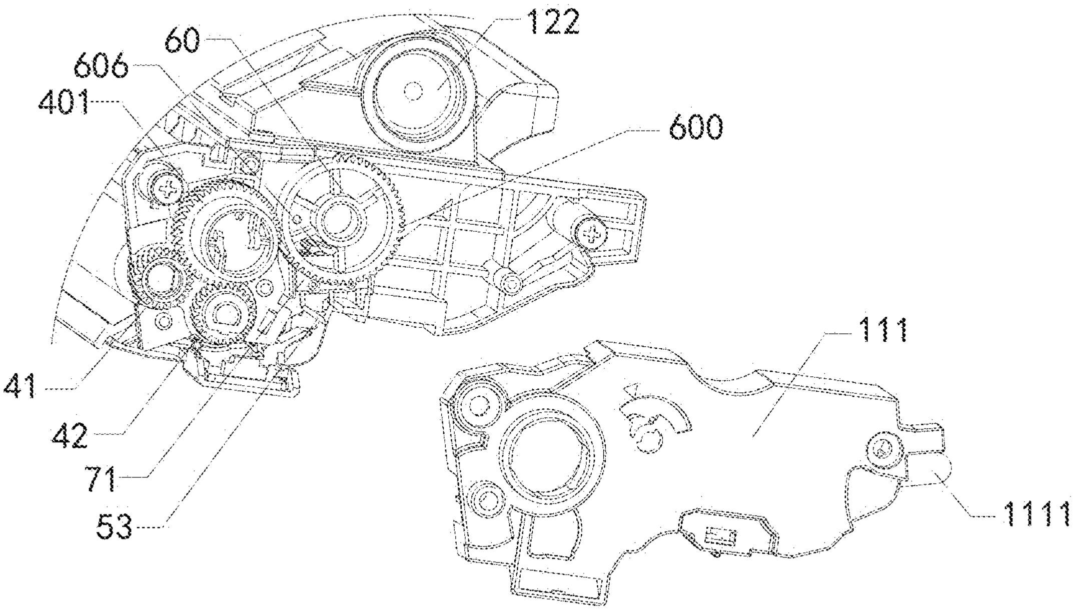
FIG. 43 illustrates a partial exploded view of a first side provided by exemplary embodiment twelve of the present disclosure.
Figure 44:
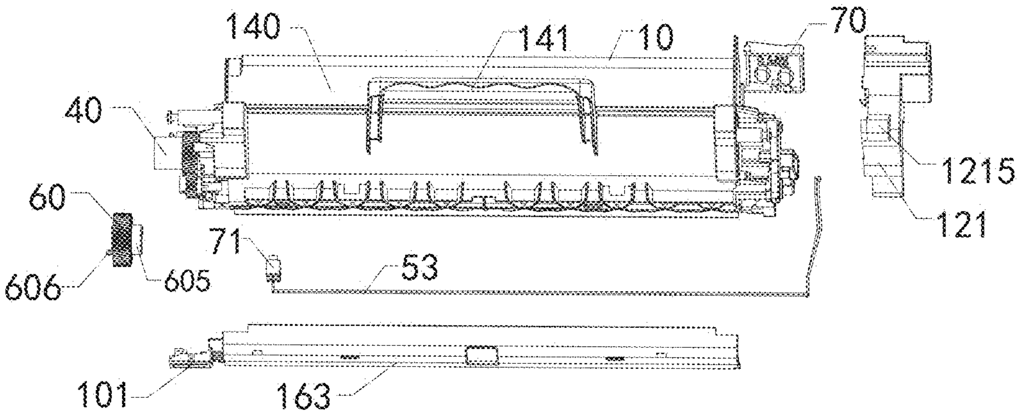
FIG. 44 illustrates a partial exploded view of a developing cartridge provided by exemplary embodiment twelve of the present disclosure.
Figure 45:
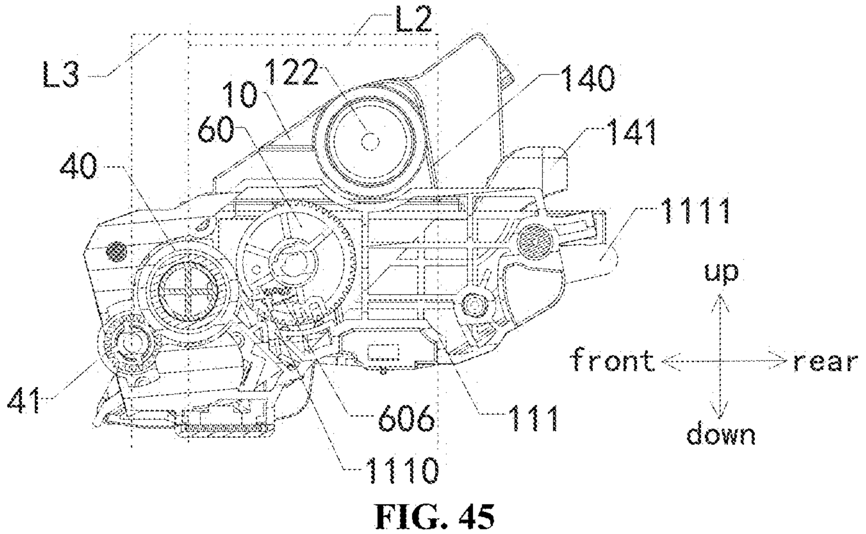
FIG. 45 illustrates a cross-sectional view of a developing cartridge provided by exemplary embodiment twelve of the present disclosure.
Figure 46:
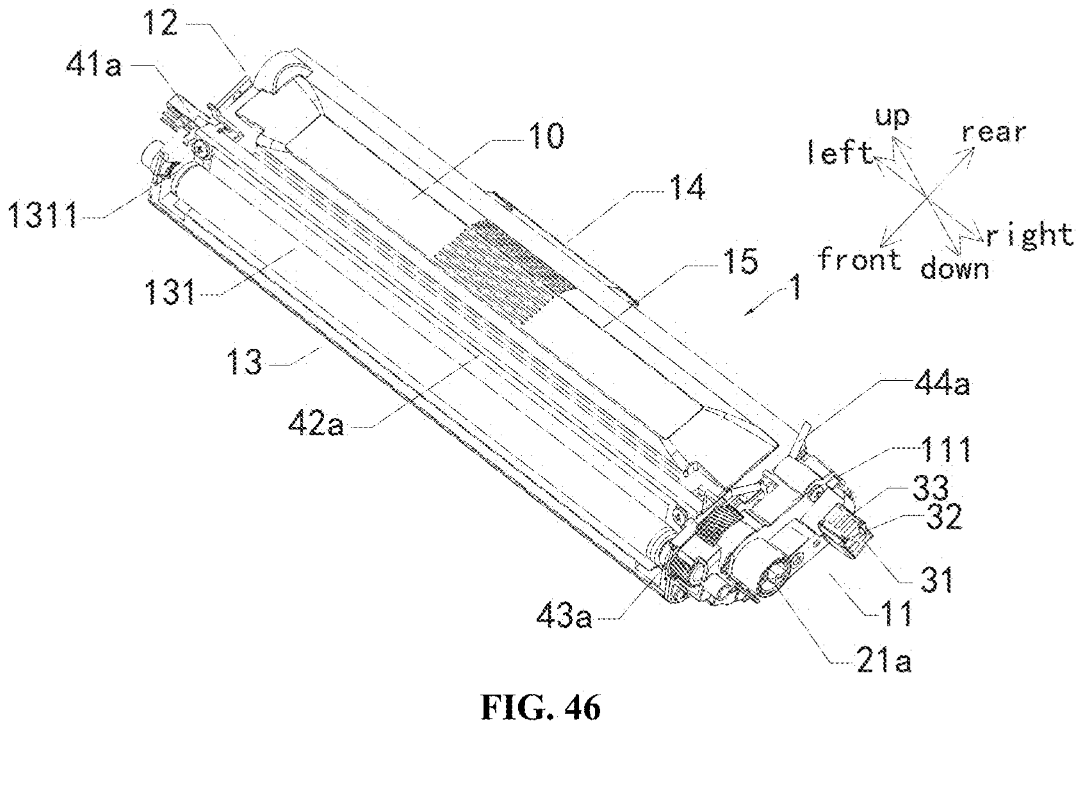
FIG. 46 illustrates a structural schematic of a developing cartridge provided by exemplary embodiment thirteen of the present disclosure.
Figure 47:
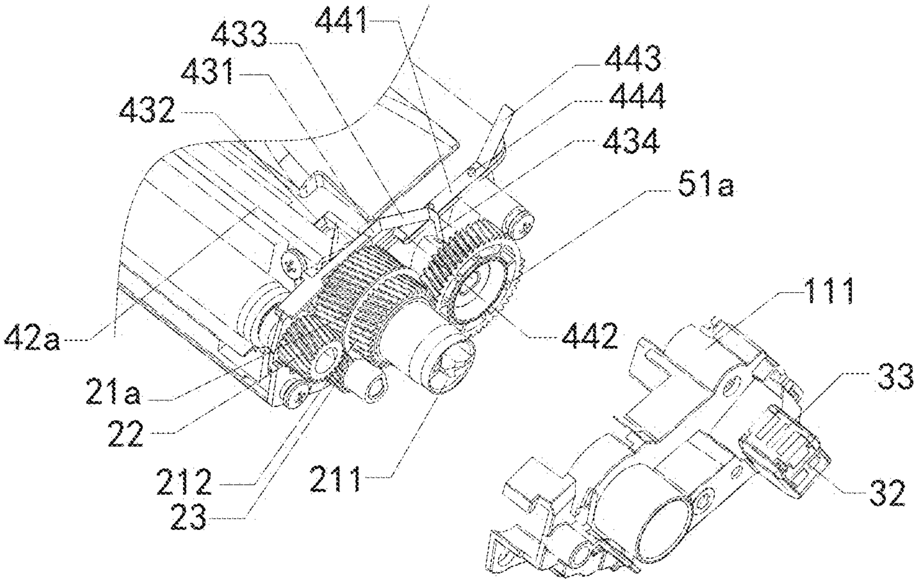
FIG. 47 illustrates a structural schematic of a first side after a first protective cover is separated from a casing provided by exemplary embodiment thirteen of the present disclosure.
Figure 48:
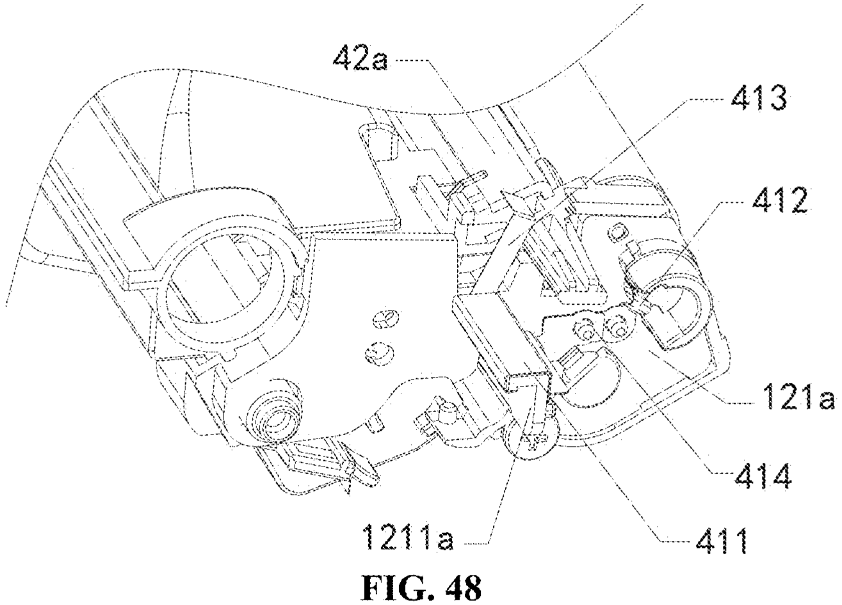
FIG. 48 illustrates a structural schematic of a second side provided by exemplary embodiment thirteen of the present disclosure.
Figure 49:
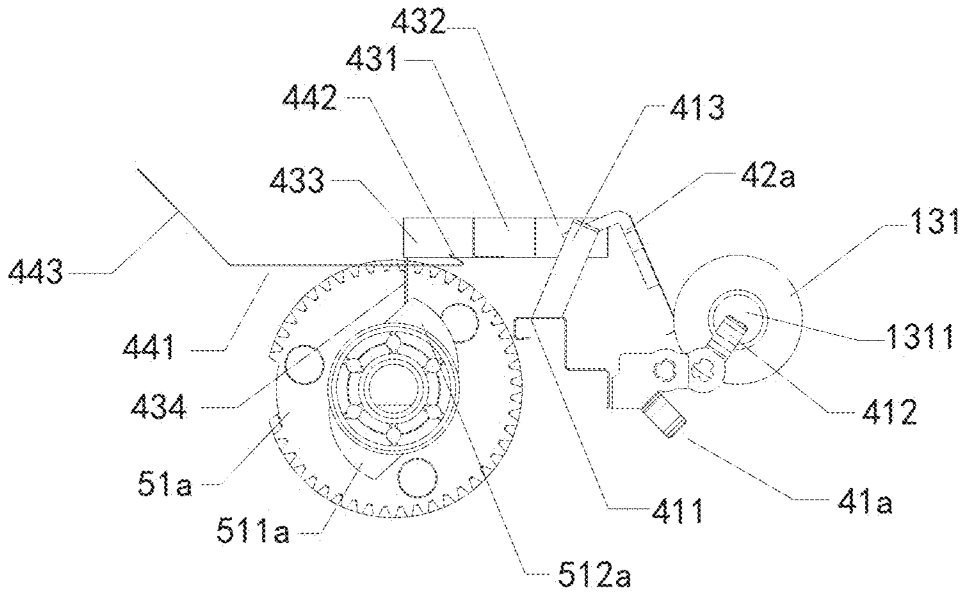
FIG. 49 illustrates a structural schematic of a developing roller, a conductive assembly and a first rotating part when viewed from left to right provided by exemplary embodiment thirteen of the present disclosure.
Figure 50:
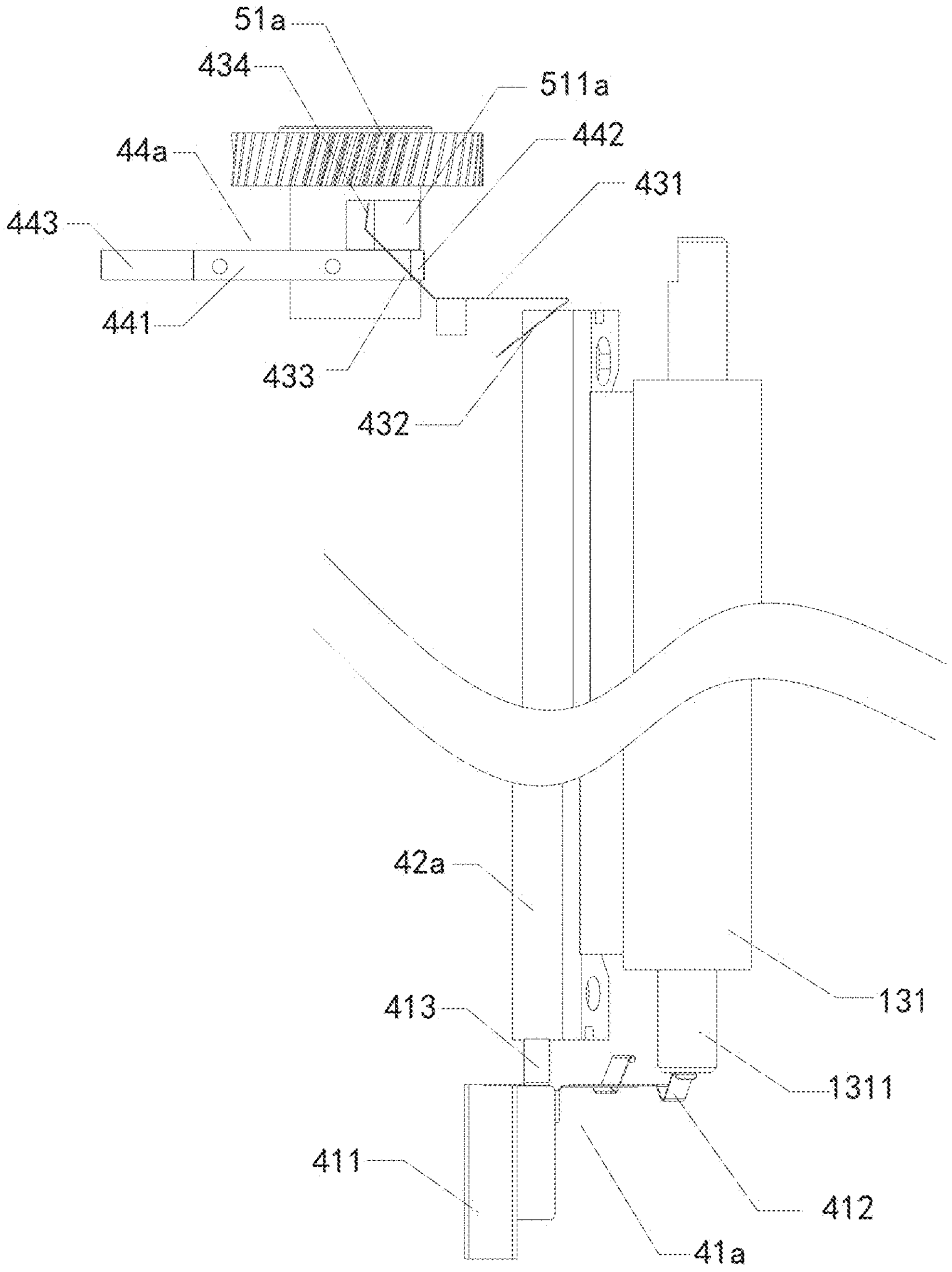
FIG. 50 illustrates a structural schematic of a developing roller, a conductive assembly and a first rotating part when viewed from top to bottom provided by exemplary embodiment thirteen of the present disclosure.
Figure 51:
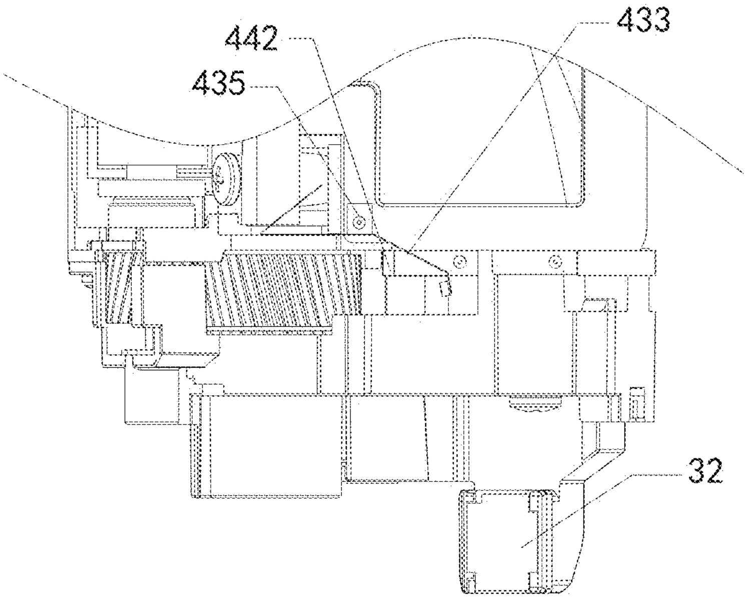
FIG. 51 illustrates a partial structural schematic of a first side when a movable portion is in a separation position provided by exemplary embodiment thirteen of the present disclosure.
Figure 52:
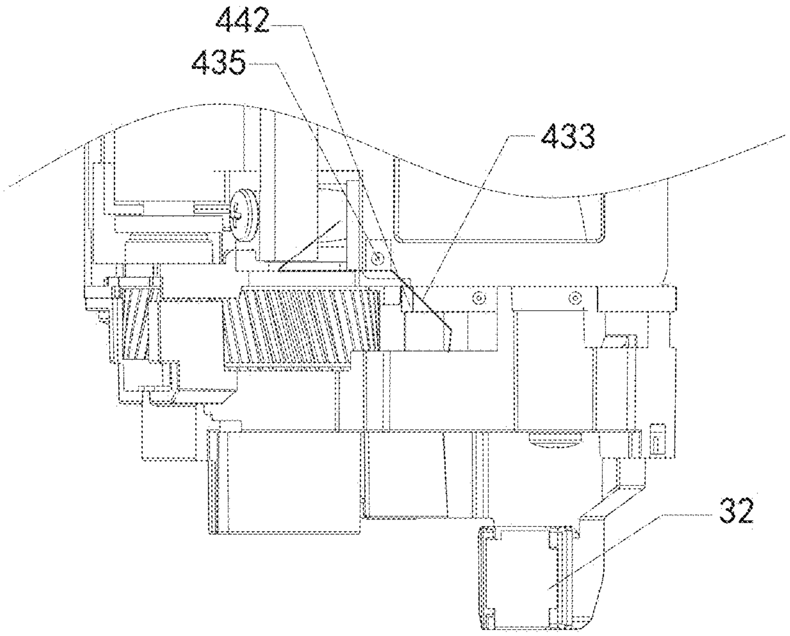
FIG. 52 illustrates a partial structural schematic of a first side when a movable portion is in a contact position provided by exemplary embodiment thirteen of the present disclosure.

As shown in FIGS. 40-41, the switching part in one embodiment may be an insulating part 76. The insulating part 76 may be, optionally, an insulating belt. The insulating part 76 may extend in the first direction. One end of the insulating belt 76 may be fixedly connected to the rotating part 60, and the other end of the insulating belt 76 may be between the lower end surface of the power supply part and the control unit 70 which may isolate the power supply part and the control unit 70 and also prevent the power supply part and the control unit 70 from being electrically connected to each other.

The rotating part 60 may be disposed with a connecting protrusion 604, and the insulating part 76 may be disposed with a hole portion. The hole portion may be combined with the connecting protrusion 604 to be fixedly connected to each other. When the rotating part 60 receives the force transmitted by the coupling 40 to rotate, the rotating part 60 may drive entire insulating part 76 to move, such that the portion of the insulating part 76 located at the lower end surface of the power supply part and the control unit 70 may be pulled out from the position between the power supply part and the control unit 70; the power supply part and the control unit 70 may be electrically connected to each other; and the control unit 70 may make the light-emitting part 55 emit light.

An installation groove or installation lock or other parts may be disposed at the fourth side 14 to support the insulating part 76.

In one embodiment, the insulating part 76 may also be manually pulled out from the position between the power supply part and the lower end surface of the control unit 70.

The purpose of providing the insulating part 76 in one embodiment may be to prevent the electrical energy of the power supply part from being consumed when the developing cartridge 1 is not installed in the image-forming apparatus.

Exemplary Embodiment Twelve

Unless otherwise specified, the structure of the developing cartridge 1 in exemplary embodiment twelve may be same as the structure of the developing cartridge 1 in exemplary embodiment eight. The difference between exemplary embodiment twelve and exemplary embodiment eight is that the structure of the transmission assembly may be different.

As shown in FIGS. 42-45, the transmission assembly in one embodiment may only include the coupling 40, the developing gear 41 and the developer feeding gear 42. The engaging portion 600 of the rotating part 60 may be directly engaged with the driving gear 401 to receive force to rotate; and after rotation, may be disengaged from the driving gear 401 to no longer rotate. Such structure may simplify the structure of the first side 11, thereby reducing the cost of the developing cartridge 1. Accordingly, in one embodiment, the switching part 71 in contact with the rotating part 60 may be also disposed to be adjacent to the coupling 40; the connecting part 53 may extend from the first side 11 to the second side 12 through the sixth side 16; and the connecting part 53 may be covered by the cover plate 163.

In addition to the abutting protrusion 605, the rotating part 60 may be also disposed with a limited protrusion 606. The first protective cover 111 may be correspondingly disposed with a limiting protrusion 1110. The limited protrusion 606 may be in contact with the limiting protrusion 1110. When the rotating part 60 is not rotating or after the rotation is completed, the limiting protrusion 1110 may prevent the rotating part 60 from shaking.

The developer filling port 122 may be disposed at the first side 11; and when viewed from the first direction, the developer filling port 122 may not be overlapped with the first protective cover 111.

The developing cartridge 1 may include the first pushing portion 1111 at the first side 11 and the second pushing portion 1215 at the second side 12; and the first pushing portion 1111 and the second pushing portion 1215 may be configured to receive the pushing force applied by the drum cartridge to ensure that the developing roller 131 and the photosensitive drum are in close contact. In one embodiment, optionally, the first forced pushing portion 1111 may be disposed at the rear end of the first protective cover 111, and the second forced pushing portion 1215 may be disposed at the rear end of the second protective cover 121. In the first direction, a handle 141 may be between the first forced pushing portion 1111 and the second forced pushing portion 1215. In the first direction, the handle 141 may be closer to the developing roller 131 than the first forced pushing portion 1111 and the second forced pushing portion 1215.

In one embodiment, in the second direction, the rear wall 140 of the casing 10 (i.e., the end wall of the fourth side 14) may be closer to the rotation axis of the coupling 40 than the first forced pushing part 1111; the first distance L1 may be between the rotation axis of the coupling 40 and the rear wall 140 in the second direction; and the magnitude of the first distance L1 may be 40 mm~55 mm. In one embodiment, the first distance L1 may be, optionally, 48 mm. In the second direction, the second distance L2 may be between the rotation axis of the developing roller 131 and the rear wall 140; and the magnitude of the second distance L2 may be 50 mm~65 mm. In one embodiment, the second distance L2 may be, optionally, 58 mm. The extension direction of the rear wall 140 may be inclined relative to the third direction (the first distance L1 may be calculated from the farthest part) or may be in parallel with the third direction.

Exemplary Embodiment Thirteen

Unless otherwise specified, the structure of the developing cartridge 1 in exemplary embodiment thirteen may be same as the structure of the developing cartridge 1 in exemplary embodiment one. The difference between exemplary embodiment thirteen and exemplary embodiment one is that the structure of the detected assembly may be different.

As shown in FIGS. 46-52, the developing cartridge 1 may include the casing 10, a conductive assembly and the transmission assembly.

The developing roller 131 may include the developing body and the developing roller shaft 1311 which are coaxially arranged. The developing body may be fixedly covered on the circumferential surface of the developing roller shaft 1311. The developing roller shaft 1311 may support the developing body and drive the developing body to rotate. The developer feeding roller may include the developer feeding body and the developer feeding roller shaft. The developer feeding roller shaft may drive the developer feeding body to rotate.

The transmission assembly may be at the first side 11. The transmission assembly may include a coupling 21*a*, a developing gear 22, and a developer feeding gear 23. The coupling 21*a* may include a force receiving portion 211 and a driving gear 212 which are coaxially arranged; and the coupling 21*a* may transmit force to the developing roller 131 and the developer feeding roller. The developing gear 22 may be fixedly installed on the right end of the developing roller shaft 1311 and engaged with the driving gear 212 to drive the developing roller 131 to rotate. The developer feeding gear 23 may be fixedly installed on the right end of the developer feeding roller shaft and engaged with the driving gear 212 to drive the developer feeding roller to rotate.

In some embodiments, the developing cartridge 1 may further include an agitator which may be rotatably installed in the casing 10. The agitator may include an agitator shaft and an agitator blade. The agitator blade may rotate with the agitator shaft. The agitator blade may be configured to stir the developer in the casing 10, and the rotation axis of the agitator may extend in the first direction. The transmission assembly may be correspondingly disposed with an agitator gear which may be fixedly installed on the right end of the agitator shaft. The agitator gear may receive the force transmitted by the coupling 21*a* and drive the agitator to rotate. In other embodiments, the transmission assembly may also include any number of idler gears or transmission gears.

The conductive assembly may be configured to receive the voltage provided by the image-forming apparatus and supply force to the developing roller 131. The conductive assembly may include a first conductive part 41*a*, a second conductive part 42*a*, an intermediate conductive part 43*a*, and a grounding conductive part 44*a*.

The first conductive part 41*a* may be fixedly disposed at the second side 12. The first conductive part 41*a* may include an electrical receiving portion 411, a developing contact portion 412, a first conducting portion 413 and a developer feeding contact portion 414 which may be electrically connected to each other. The electrical receiving portion 411 may extend to the left in the direction away from the casing 10. The developing contact portion 412 may extend in the front-rear direction. The developing contact portion 412 may be configured to be in contact with and electrically connected to the developing roller shaft 1311. The developer feeding contact portion 414 may be electrically connected to the developer feeding roller. The first conducting portion 413 may extend in the up-down direction, and the first conducting portion 413 may be configured to be in contact with and electrically connected to the second conductive part 42*a*. The second side 12 may be fixedly installed with the second bracket 121*a*. The second supporting hole for supporting the developing roller shaft 1311 may be disposed on the second bracket 121*a*. The developing contact portion 412 may pass through the second bracket 121*a* and extend into the second supporting hole to be in contact with and electrically connected to the developing roller shaft 1311. The second bracket 121*a* may be disposed with the second supporting portion 1211*a* protruding to the left. The second supporting portion 1211*a* may be configured to support the electrical receiving portion 411. The second bracket 121*a* may be also fixedly disposed with the second positioning protrusion, and the first conductive part 41*a* may be disposed with the first positioning hole. The second positioning protrusion may be inserted into the first positioning hole to position the first conductive part 41*a*, which may prevent the first conductive part 41*a* from falling off or shaking from the casing 10. In one embodiment, the first conductive part 41*a* may be made of a conductive material such as a conductive metal sheet, a metal wire, or a conductive resin.

The second conductive part 42*a* may be configured to transfer the electrical potential from the second side 12 to the first side 11. In one embodiment, the second conductive part 42*a* may be, optionally, a layer thickness regulating blade. Another end of the layer thickness regulating blade may be abutted against the circumferential surface of the developing body, such that when the developing roller 131 rotates, the developer carried on the developing body may be controlled by the layer thickness regulating blade when passing through the layer thickness regulating blade, which may prevent uneven developer thickness. The layer thickness regulating blade may be made of a conductive metal material or a conductive resin material and extend in the first direction from the first side 11 to the second side 12.

The intermediate conductive part 43*a* may be at the first side 11. The intermediate conductive part 43*a* may include a third conductive portion 432, a third main body portion 431, a third positioning portion and a movable portion 433. In one embodiment, the intermediate conductive part 43*a* may be made of a bent metal sheet as a whole or may be made of a conductive material such as conductive resin. The third main body portion 431 may extend in the front-rear direction. The third main body portion 431 may be between the third conductive portion 432 and the movable portion 433 in the front-rear direction. The third positioning portion may be connected to the left end of the third main body portion 431, and the third positioning hole may be formed on the third positioning portion. The casing 10 may be disposed with the third positioning column 435 inserted into the third positioning hole, such that the intermediate conductive part 43*a* may be positioned by the third positioning column 435, which may prevent the intermediate conductive part 43*a* from falling off or shaking from the casing 10. The third conductive portion 432 may be at the front end of the third main body portion 431, and the movable portion 433 may be at the rear end of the third main body portion 431. The third conductive portion 432 may be in contact with the layer thickness regulating blade. In order to prevent poor contact, the third conductive portion 432 may be bent in a "V" shape, such that when the third conductive portion 432 is inserted into the gap between the right end of the layer thickness regulating blade and the first side 11, the third conductive portion 432 may be squeezed to produce elastic deformation, and the third conductive portion 432 and the layer thickness regulating blade may be more closely contacted under the action of elastic force. In addition, the third conductive portion 432 may be clamped between the right end of the layer thickness regulating blade and the first side 11 to further position the intermediate conductive part 43*a*, which may further prevent the intermediate conductive part 43*a* from falling off or shaking from the casing 10. An angle may be formed between the movable portion 433 and the third main body portion 431 by metal bending, and the extension direction of the movable portion 433 may intersect the extension direction of the third main body portion 431. Therefore, the rear end of the movable portion 433 may be further to the right than the front end. The movable portion 433 may move between the contact position and the separation position. When the movable portion 433 is in the separation position, the first angle may be between the movable portion 433 and the third main body portion 431; when the movable portion 433 is in the contact position, the second angle may be between the movable portion 433 and the third main body portion 431; and the first angle may be greater than the second angle. When the movable portion 433 is in the contact position, the movable portion 433 may be in contact with and electrically connected to the grounding conductive part 44*a*. When the movable portion 433 is in the separation position, the movable portion 433 may be not in contact with and electrically connected to the grounding conductive part 44*a*. The rear end of the movable portion 433 may be also fixedly disposed with the first driven portion 434 which may be formed by extending downward from the rear end of the movable portion 433.

The grounding conductive part 44*a* may include a fourth main body portion 441, a first electrical contact portion 442 and a second electrical contact portion 443. In one embodiment, the grounding conductive part 44*a* may be made of a metal sheet as a whole and may also be made of a conductive material such as conductive resin. The first electrical contact portion 442 may be at the front end of the fourth main body portion 441, and the second electrical contact portion 443 may be at the rear end of the fourth main body portion 441. The first electrical contact portion 442 may have an upwardly tilted bent portion. When viewed from top to bottom, the projection of the movable portion 433 may be overlapped with the projection of the fourth main body portion 441. However, the movable portion 433 may be above the fourth main body portion 441 and there is a gap between the movable portion 433 and the fourth main body portion 441 along the vertical direction. The bent portion of the first electrical contact portion 442 may be overlapped with the movable portion 433 along the vertical direction, such that the movable portion 433 may contact the bent portion of the first electrical contact portion 442 when the movable portion 433 moves. The fourth positioning hole may be formed on the fourth main body portion 441, and the fourth positioning column 444 may be also disposed on the casing 10. The fourth positioning column 444 may protrude upward to be inserted into the fourth positioning hole, thereby positioning the grounding conductive part 44*a* and preventing the grounding conductive part 44*a* from falling off and shaking from the casing 10. The first electrical contact portion 442 may be configured to be in electrical contact with the movable portion 433, and the second electrical contact portion 443 may be configured to be in electrical contact with the grounding part in the image-forming apparatus. In one embodiment, the first conductive part 41*a*, the second conductive part 42*a*, the intermediate conductive part 43*a*, and the grounding conductive part 44*a* may be formed into a single piece or partially formed into a single piece.

The developing cartridge 1 of one embodiment may also include the control assembly which may be configured to control the movable portion 433 to move between the contact position and the separation position. The control assembly may include the first rotating part 51*a* which may be a toothless gear. The first rotating part 51*a* may be engaged with the driving gear 212, thereby receiving force from the coupling 21*a* to rotate. The rotation axis of the first rotating part 51*a* may extend in the first direction. The first rotating part 51*a* may be rotatably located at the first side 11 and supported by the first supporting shaft protruding to the right in the first direction. The first rotating part 51*a* may be disposed with the first control protrusion 511*a* and the second control protrusion 512*a*. The first control protrusion 511*a* and the second control protrusion 512*a* may protrude to the left in the first direction and from the left end surface of the first rotating part 51*a*. In one embodiment, the number of control protrusions on the first rotating part 51*a* may not be limited. The first control protrusion 511*a* may be disposed with the first contact surface, and the second control protrusion 512*a* may be disposed with the second contact surface. The first contact surface and the second contact surface may be configured to contact the first driven part 434 and push the first driven part 434, such that the first driven part 434 may drive the movable portion 433 to move. The first contact surface and the second contact surface may be arc surfaces (the arc surfaces include inclined surfaces), and the contact may be smoother by setting the arc surfaces.

The developing cartridge 1 of one embodiment may also include an identification assembly. The identification assembly may include the first chip 32. The first chip 32 may include a storage medium and an electrical contact surface 33. The storage medium may be electrically connected to the electrical contact surface 33. The storage medium and the electrical contact surface 33 may be separate or formed into a single piece. The electrical contact surface 33 may be configured to be in contact with and electrically connected to the electrical contact terminal in the image-forming apparatus, such that the image-forming apparatus may read the information stored in the storage medium (such as the model, lifetime, capacity and the like of the developing cartridge) through the electrical contact surface 33. The electrical contact surface 33 may be at the first side 11, and the third direction may be the normal direction of the electrical contact surface 33. In one embodiment, the storage medium and the electrical contact surface 33 may be jointly disposed and fixed on the substrate; the substrate may be supported by the chip holder 31 and fixed on the chip holder 31; and the chip holder 31 may be fixedly disposed at the first side 11. Optionally, the chip holder 31 and the first protective cover 111 may be formed into a single piece. The electrical contact surface 33 may be a copper sheet or a conductive metal sheet fixedly disposed on the substrate. In other embodiments, the storage medium and the substrate may also be separately disposed with the electrical contact surface 33. If the storage medium is disposed at the second side 12, the storage medium may be electrically connected to the electrical contact surface 33 through conductive elements such as wires. In other embodiments, the identification assembly may not be disposed.

The following is the operation process of the control assembly and the conductive assembly. When the developing cartridge 1 is installed in the image-forming apparatus, the electrical receiving portion 411 may be in contact with and electrically connected to the power supply terminal in the image-forming apparatus (electricity may be provided to the power supply terminal by the power supply circuit in the image-forming apparatus), and the second electrical contact portion 443 may be in contact with and electrically connected to the grounding part in the image-forming apparatus. In an initial state, the movable portion 433 may be in the separation position; that is, electrical connection may be not between the intermediate conductive part 43*a* and the grounding conductive part 44*a*.

After the image-forming apparatus is started, the coupling 21*a* may rotate and drive the first rotating part 51*a* to rotate, such that the first rotating part 51*a* may move from the position engaged with the driving gear to the position disengaged from the driving gear. Meanwhile, normal potential provided by the power supply terminal may be guided to the developing roller shaft 1311 through the first conductive part 41*a*, such that the developing roller shaft 1311 may have same potential as the power supply terminal, and furthermore a potential difference may be generated between the developing roller 131 and the developer in the casing 10 to absorb the developer.

As the first rotating part 51*a* rotates, in the process of the first rotating part 51*a* moving from the position engaged with the driving gear to the position disengaged from the driving gear, the duration from the first rotating part 51*a* starting to rotate to the first control protrusion 511*a* contacting the first driven part 434 may be T1. During such process, the movable portion 433 may be in the separation position, such that the potential may be normal during such process.

During the movement of the first rotating part 51*a* from the position engaged with the driving gear to the position disengaged from the driving gear, the first control protrusion 511*a* may be in contact with the first driven portion 434, and the first driven portion 434 may be pushed to drive the movable portion 433 to move from the separation position to the contact position, such that the intermediate conductive part 43*a* may be electrically connected to the grounding conductive part 44*a*. Since the grounding conductive part 44*a* is electrically connected to the grounding part in the image-forming apparatus, the potentials of the power supply terminal, the first conductive part 41*a*, the second conductive part 42*a*, the intermediate conductive part 43*a*, and the grounding conductive part 44*a* may be all reduced to the ground potential, and corresponding duration may be T2, such that the detection apparatus in the image-forming apparatus (in electrical connection with the power supply terminal) may detect one change in the potential.

Subsequently, as the first rotating part 51*a* rotates, the first control protrusion 511*a* may be disengaged from the first driven part 434. At this point, under the elastic action of the movable portion 433 itself, the movable portion 433 may move from the contact position to the separation position, such that the potential may return to the potential provided by the power supply circuit, and corresponding duration may be T3.

Subsequently, as the first rotating part 51*a* rotates, the second control protrusion 512*a* may be in contact with the first driven part 434 and make the movable portion 433 move from the separation position to the contact position again, such that the potential may be reduced to the ground potential again, and corresponding duration may be T4.

Subsequently, as the first rotating part 51*a* rotates, the second control protrusion 512*a* may be disengaged from the first driven portion 434, and the movable portion 433 may move from the contact position to the separation position under the action of elasticity and remain in the separation position without moving.

That is, in one embodiment, the first rotating part 51*a* may be configured as the detected part which may receive the force transmitted by the coupling 21*a* to move; the first control protrusion 511*a* and the second control protrusion

512*a* may be configured as detected protrusions; the detected protrusions may follow the movement of the detected part to control potential change; and the control assembly may be configured as the detected assembly.

Finally, the first rotating part 51*a* may move to the position disengaged from the driving gear and stop rotation, thereby completing the detection process.

The detection apparatus in the image-forming apparatus may determine the information of the developing cartridge 1 (such as new and old, model, and capacity) by the number of times the potential reduced to the ground potential, the duration of maintaining the potential reduced to the ground potential each time, and the duration of maintaining normal potential between two times of ground potentials.

For example, in one embodiment, if the developing cartridge 1 is an old developing cartridge 1 that has been used, the first rotating part 51*a* may be in the state disengaged from the driving gear at the beginning, such that the movable portion 433 may not move and the potential may not change.

Furthermore, if the second control protrusion 512*a* is not disposed in one embodiment, the number of times of the potential reduced to the ground potential may be only once, and the image-forming apparatus determines that the developing cartridge 1 may be new and print 3000 sheets of paper. If the number of times of the potential reduced to the ground potential is two, the image-forming apparatus determines that the developing cartridge 1 may be new and print 6000 sheets of paper. Similarly, those skilled in the art may also increase the number of control protrusions.

Furthermore, those skilled in the art may also adjust the duration of T1 by adjusting the distance between the first control protrusion 511*a* and the toothless portion on the first rotating part 51*a* along the rotation direction. If the distance between the toothless portion and the first control protrusion 511*a* is long, T1 may increase; otherwise T1 may decrease.

Those skilled in the art may also adjust the duration of T2 by adjusting the size of the first control protrusion 511*a* along the circumferential direction; if the size increases, T2 may increase; otherwise T2 may decrease.

T3 may be adjusted by adjusting the distance between the first control protrusion 511*a* and the second control protrusion 512*a* along the circumferential direction; if the distance increases, T3 may increase; otherwise T3 may decrease.

T4 may be adjusted by adjusting the size of the second control protrusion 512*a* along the circumferential direction; if the size increases, T4 may increase; otherwise T4 may decrease.

In one embodiment, the following numerical ranges for T1, T2, T3, and T4 may be obtained; and the developing cartridge 1 may be installed in the image-forming apparatus without error in the ranges: 200 ms≤T1≤2000 ms, 80 ms≤T2≤1200 ms, 300 ms≤T3≤600 ms, and 80 ms≤T4≤500 ms.

Exemplary Embodiment Fourteen

Unless otherwise specified, the structure of the developing cartridge 1 of exemplary embodiment fourteen may be same as the structure of the developing cartridge 1 of exemplary embodiment thirteen.

Figure 53:
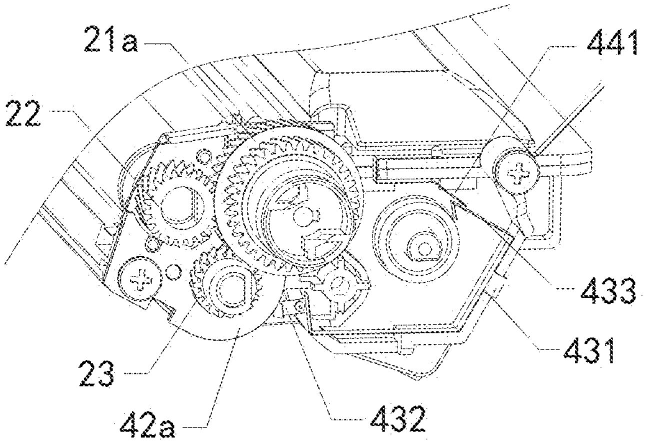
FIG. 53 illustrates a structural schematic of a first side after a first rotating part and a first protective cover are hidden provided by exemplary embodiment fourteen of the present disclosure.

As shown in FIG. 53, the difference between exemplary embodiment fourteen and exemplary embodiment thirteen is the following. The second conductive part may be the developing roller shaft 1311 which may receive the potential transmitted by the first conductive part 41*a* and transmit the potential to the first side 11. The first bracket 42*b* may be fixedly installed on the first side 11. The first bracket 42*b* may be configured to rotatably support the right end of the developing roller 131 shaft. The first bracket 42*b* may be made of conductive resin. The first bracket 42*b* may be configured as a transition conductive part to receive the potential transmitted by the developing roller 1311. In one embodiment, the second conductive part may also be a developer feeding roller shaft or a separate conductive part.

The third conductive portion 432 of the intermediate conductive part 43*a* may be in contact with and electrically connected to the first bracket 42*b*. The third main body portion 431 may be fixed to the first side 11. The movable portion 433 may be fixedly connected to the upper end of the third main body portion 431. The movable portion 433 may tilt forward relative to the third main body portion 431. The first driven portion 434 may be disposed at the front end of the movable portion 433 and have an angle with the movable portion 433. The first driven portion 434 may tilt downward relative to the movable portion 433.

The first electrical contact portion 442 of the grounding conductive part 44*a* may be on the upper side of the movable portion 433.

In one embodiment, the first angle when the movable portion 433 is in the separation position may be less than the second angle when the movable portion 433 is in the contact position.

In one embodiment, in the process of the first rotating part 51*a* rotating from the position engaged with the driving gear to the position disengaged from the driving gear, the first control protrusion 511*a* and the second control protrusion 512*a* may contact the first driven part 434 and push the movable portion 433 to swing upward, thereby moving from the separation position to the contact position.

In one embodiment, the first magnetic part (the first control protrusion) and the second magnetic part (the second control protrusion) may be disposed on the first rotating part. The third magnetic part may be fixedly installed on the movable portion; and the movable portion may be at the lower side of the first electrical contact portion of the grounding conductive part and have a gap along the vertical direction. The distance between the movable portion and the rotation axis of the first rotating part along the vertical direction may be greater than the radius of the circle formed by the path passed by the first magnetic part and the second magnetic part as the first rotating part rotates. The movable portion and the third magnetic part may be above the rotation axis of the first rotating part.

During the rotation of the first rotating part, when successively passing through the highest point of corresponding motion trajectories, the first magnetic part and the second magnetic part may respectively generate repulsive forces on the third magnetic part, such that the third magnetic part may drive the movable portion to move upward, thereby making the movable portion to be in contact with and electrically connected to the first electrical contact portion.

Exemplary Embodiment Fifteen

Unless otherwise specified, the structure of the developing cartridge 1 of exemplary embodiment fifteen may be same as the structure of the developing cartridge 1 of exemplary embodiment thirteen.

Figure 54:
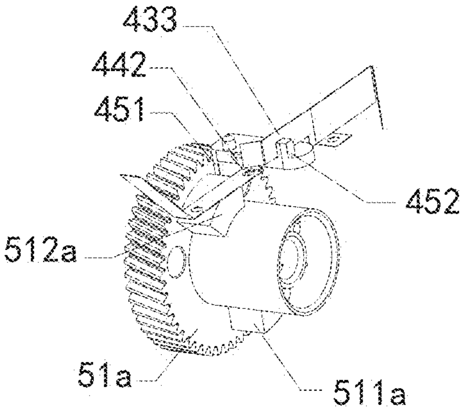
FIG. 54 illustrates a structural schematic of a first rotating part, an intermediate conductive part, a grounding conductive part, and a swinging part provided by exemplary embodiment fifteen of the present disclosure.

As shown in FIG. 54, the difference between exemplary embodiment fifteen and exemplary embodiment thirteen is the following. The developing cartridge 1 may also include a swinging part 45*a* which is located at the front side of the grounding conductive part 44*a*. The casing 10 may be disposed with a swinging shaft extending along the up-down direction. The swinging part 45*a* may be installed on the swinging shaft by swinging around the swinging shaft. The swinging part 45*a* may be disposed with the second driven portion 451 and the second coupling 452. The second driven portion 451 may be at the right end of the swing part 45*a* and extend downward, and the second coupling 452 may be at the left end of the swing part 45*a* and extend upward. The left end surface of the intermediate conductive part 43*a* may be in contact with the second coupling 452. The upper end of the swinging part 45*a* may be also disposed with a resetting protrusion which may protrude upward. The resetting protrusion may be on the right side of the swinging shaft. A resetting elastic part may be installed between the resetting protrusion and the fourth positioning column 444. In one embodiment, the resetting elastic part may be a tension spring, and the swing shaft may be between the second driven portion 451 and the second coupling 452.

During the process of the first rotating part 51*a* rotating from the position engaged with the driving gear to the position disengaged from the driving gear, the second driven portion 451 may be sequentially touched by the first control protrusion 511*a* and the second control protrusion 512*a*, such that the swing part 45*a* may swing, and furthermore the second coupling 452 may push the movable portion 433 from the separation position to the contact position.

When the first control protrusion 531*a* and the second control protrusion 532*a* are out of contact with the second driven portion 451, the swinging part 45*a* may swing along opposite direction under the elastic force of the resetting elastic part, such that the movable portion 433 may be no longer pushed, and the movable portion 433 may move from the contact position to the separation position under the elastic action of itself.

Exemplary Embodiment Sixteen

Unless otherwise specified, the structure of the developing cartridge 1 of exemplary embodiment sixteen may be same as the structure of the developing cartridge 1 of exemplary embodiment fourteen.

Figure 55:
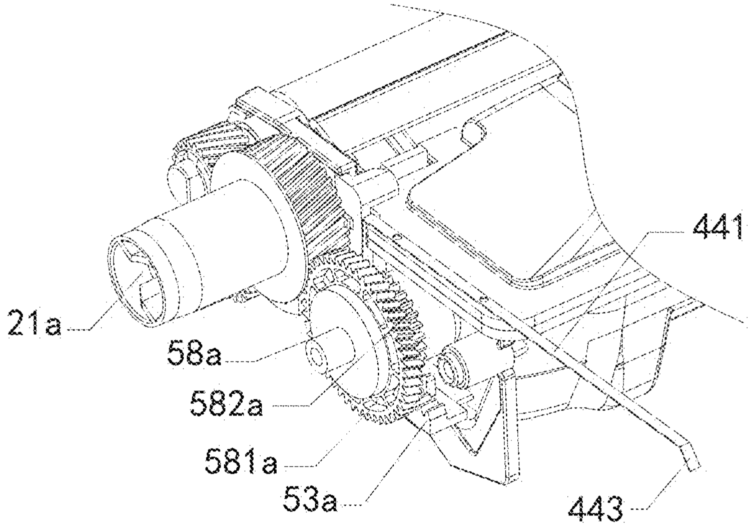
FIG. 55 illustrates a structural schematic of a first side after a first protective cover is hidden provided by exemplary embodiment sixteen of the present disclosure.
Figure 56:
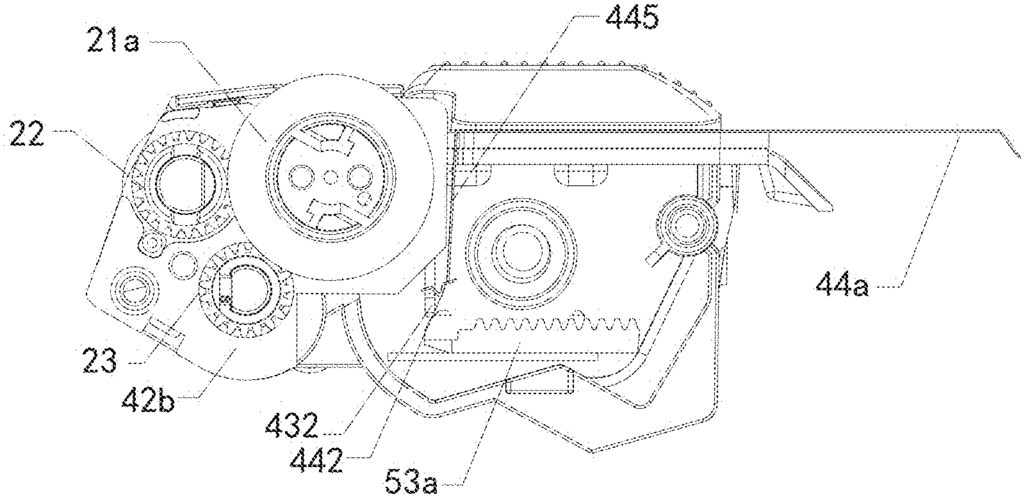
FIG. 56 illustrates a structural schematic of a first side after a transmission gear is hidden when viewed from right to left provided by exemplary embodiment sixteen of the present disclosure.
Figure 57:
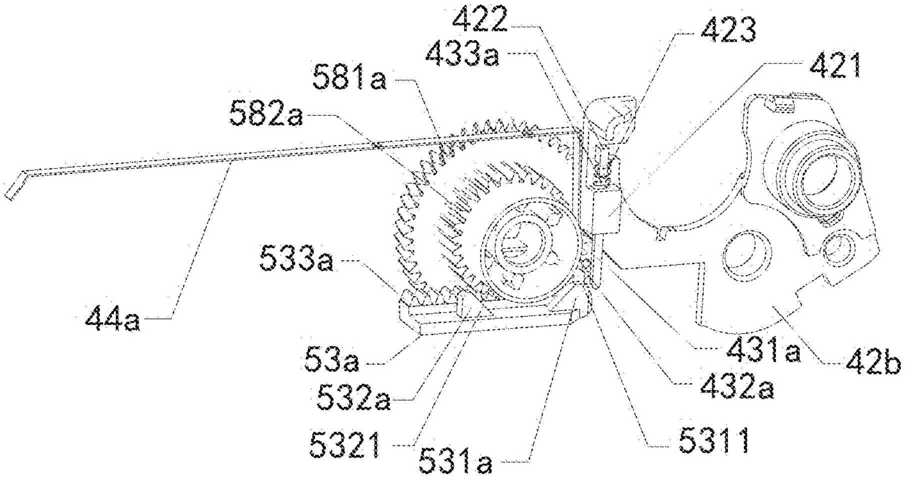
FIG. 57 illustrates a structural schematic of a second conductive part, an intermediate conductive part, a grounding conductive part, a transmission gear, and a translation part provided by exemplary embodiment sixteen of the present disclosure.

As shown in FIGS. 55-57, the difference between exemplary embodiment sixteen and exemplary embodiment fourteen is the following. In one embodiment, a transmission gear 58*a* may be included; the transmission gear 58*a* may include a first transmission gear 581*a* and a second transmission gear 582*a* which are coaxially arranged; the radius of the second transmission gear 582*a* may be less than the radius of the first transmission gear 581*a*; and the second transmission gear 582*a* may be integrally formed on the left end surface of the first transmission gear 581*a*.

A supporting plate protruding to the right may be fixedly disposed on the first side 11. The supporting plate may extend in the front-rear direction and protrude to the right from the first side 11.

The control assembly may further include a translation part 53*a* which may be installed on the supporting plate and slide on the supporting plate in the front-rear direction. The translation part 53*a* may be disposed with a first control protrusion 531*a*, a second control protrusion 532*a* and a plurality of teeth 533*a*. The plurality of teeth 533*a* may be arranged along the movement direction of the translation part 53*a* (i.e., arranged in the front-rear direction). The plurality of teeth 533*a* may be engaged with the second transmission gear 582*a*; that is, the translation part 53*a* in one embodiment may be a rack. The first control protrusion 531*a* and the second control protrusion 532*a* may be on the left side of the plurality of teeth 533*a* and arranged at intervals along the movement direction of the translation part 53*a* (i.e. arranged along the front-rear direction). The first control protrusion 531*a* may be at the front side of the second control protrusion 532*a*. The first control protrusion 531*a* may be disposed with a first contact surface 5311; and the second control protrusion 532*a* may be disposed with a second contact surface 5321. The first contact surface 5311 and the second contact surface 5321 may be inclined relative to the front-rear direction, and the front ends of the first contact surface 5311 and the second contact surface 5321 may be lower than the rear ends in the up-down direction.

In one embodiment, a second guiding portion 421 may be disposed on the left end surface of the first bracket 42*b*. The second guiding portion 421 may protrude to the left from the left end surface of the first bracket 42*b*. A second guiding hole may be formed in the up-down direction on the second guiding portion 421 and pass through the second guiding portion 421. A second protruding portion 422 may be also integrally formed on the left end surface of the first bracket 42*b*, and a second positioning portion 423 extending from top to bottom may be integrally formed on the second protruding portion 422. A gap may be between the second positioning portion 423 and the first bracket 42*b* along the left-right direction. The second positioning portion 423 and the second protruding portion 422 may be both located on the upper side of the second guiding portion 421.

In one embodiment, the intermediate conductive part 43*a* may include a third elastic portion 433*a* and a third sliding part 431. The third sliding part 431 may be installed in the second guiding hole of the second guiding portion 421 and slide in the second guiding hole along the up-down direction. The lower end and the upper end of the third sliding part 431 may extend downwardly and upwardly out of the second guiding hole respectively. The upper end of the third sliding part 431 may be fixedly connected to the lower end of the third elastic portion 433*a*. In one embodiment, the third elastic portion 433*a* may be a compression spring. The third positioning portion may be inserted into the third elastic portion 433*a*, and the upper end of the third elastic portion 433*a* may be abutted against the third protrusion, thereby positioning the third elastic portion 433*a* and preventing the third elastic portion 433*a* from falling off. The lower end of the third sliding part 431 may be a movable portion 432*a* which may be formed by extending rightward from the lower end of the third sliding part 431. When projection is performed along the front-rear direction, the projection of the movable portion 432*a* may be overlapped with the projections of the first control protrusion 531*a* and the second control protrusion 532*a*. The third sliding part 431 may be electrically connected to the first bracket 42*b* through the third elastic portion 433*a* and also electrically connected to the first bracket 42*b* through the contact with the second guiding hole.

In one embodiment, the grounding conductive part 44*a* may further include a fourth extension portion which may be formed by extending downward from the front end of the fourth main body portion 441; the first electrical contact portion 442 of the grounding conductive part 44*a* may be disposed at the lower end of the fourth extension portion; and the first electrical contact portion 442 may be formed by extending forward from the lower end of the fourth extension portion. The first electrical contact portion 442 may be at the upper side of the movable portion 432*a*. When the movable portion 432*a* is in the separation position, a gap may be between the movable portion 432*a* and the first electrical contact portion 442 along the vertical direction. When the movable portion 432*a* is in the contact position, no gap may be between the movable portion 432*a* and the first electrical contact surface 33 along the vertical direction.

When the first transmission gear 581*a* drives the second transmission gear 582*a* to rotate, the second transmission gear 582*a* may transmit force to the translation part 53*a* through the plurality of teeth 533*a*, such that the translation part 53*a* may move to the left, and the first control protrusion 531*a* and the second control protrusion 532*a* may contact the movable portion 432*a* in sequence.

The duration from the start of the movement of the translation part 53*a* to the contact between the first control protrusion 531*a* and the movable portion 432*a* may be T1.

As the translation part 53*a* moves, the first control protrusion 531*a* may be in contact with the movable portion 432*a*, and the contact duration may be T2. When the first control protrusion 531*a* is in contact with the movable portion 432*a*, since the first contact surface 5311 is inclined relative to the front-rear direction, the first contact surface 5311 may generate an upward force component on the movable portion 432*a*. Furthermore, the movable portion 432*a* may drive the third sliding part to slide upward and compress the third elastic portion 433*a*, such that the movable portion 432*a* may move from the separation position to the contact position, and the movable portion 432*a* may form electrical connection with the grounding conductive part 44*a*.

As the translation part 53*a* moves, entire process duration from the time that the first control protrusion 531*a* is disengaged from the movable portion 432*a* to the time that the second control protrusion 532*a* contacts the movable portion 432*a* may be T3. During such process, the movable portion 432*a* may move from the contact position to the separation position together with the third sliding part 431 under the elastic force of the third elastic portion 433*a*.

Subsequently, the second control protrusion 532*a* may be in contact with the movable portion 432*a*, and a corresponding duration may be T4, such that the movable portion 432*a* may move from the separation position to the contact position again.

As the translation part 53*a* continues to move forward, the second control protrusion 532*a* may be disengaged from the movable portion 432*a*, and the movable portion 432*a* may move from the contact position to the separation position again.

Finally, as the translation part 53*a* moves, the plurality of teeth 533*a* may be all disengaged from the second transmission gear 582*a*, such that the translation part 53*a* may stop moving, the detection process of the image-forming apparatus may stop, and the developing cartridge 1 may successfully pass the detection.

That is, in one embodiment, the translation part 53*a* may be the detected part; and the translation part 53*a* may include the first control protrusion 531*a* which may be configured as the first detected protrusion and include the second control protrusion 532*a* which may be configured as the second detected protrusion.

In one embodiment, the translation part 53*a* may be engaged with the second transmission gear 582*a* and move along the up-down direction; the plurality of teeth 533*a* may be arranged along the up-down direction; and the first control protrusion 531*a* and the second control protrusion 532*a* may be also arranged at intervals along the up-down direction. The intermediate conductive part 43*a* may be fixed on the second conductive part 42*a* by an adhering manner. The intermediate conductive part 43*a* may include an adhesive portion and the movable portion 433. The adhesive portion may be fixed to the second conductive part 42*a* by the adhering manner and electrically connected to the second conductive part 42*a*. An angle may be between the movable portion 433 and the adhesive portion, and the extension direction of the movable portion 433 may intersect the up-down direction. The first angle when the movable portion 433 is in the contact position may be greater than the second angle when the movable portion 433 is in the separation position. The front end of the grounding conductive part 44*a* may be the first electrical contact portion 442. The projections of the first electrical contact portion 442 and the movable portion 433 may be overlapped with each other along the left-right direction.

The translation part 53*a* may receive force and move upward along the sliding groove, such that the first control protrusion 531*a* and the second control protrusion 532*a* may successively contact the movable portion 433, and the movable portion 433 may move from the separation position to the contact position with the grounding conductive part 44*a*.

Or the movable portion may be disposed on the grounding conductive part 44*a*. When the translation part 53*a* slides along the up-down direction, the first control protrusion 531*a* and the second control protrusion 532*a* may be abutted against the grounding conductive part 44*a* to make the grounding conductive part 44*a* swing. The swing axis of the grounding conductive part 44*a* may extend along the up-down direction or the left-right direction or the front-rear direction. The grounding conductive part 44*a* may swing to be electrically connected or not electrically connected to the intermediate conductive part 43*a*. The grounding conductive part 44*a* may be connected to the resetting elastic part, such that the grounding conductive part 44*a* may swing along the opposite direction.

Figure 58:
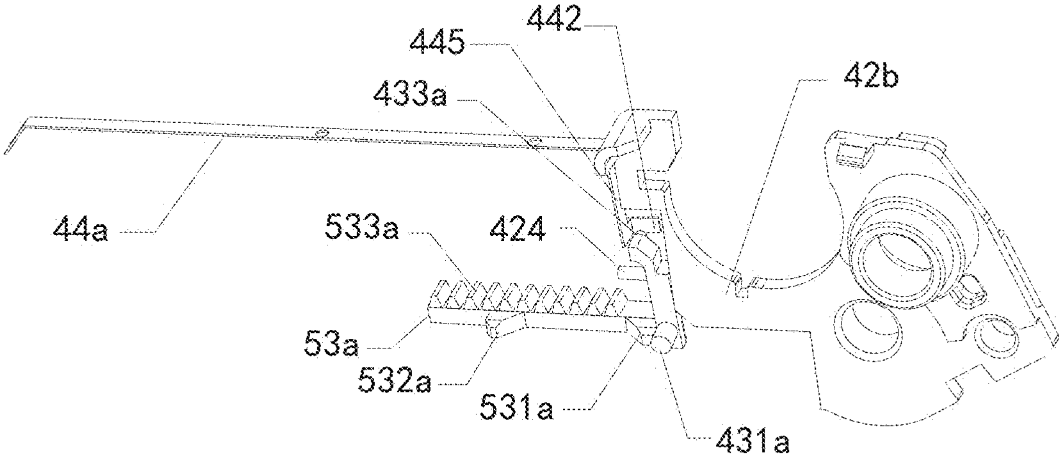
FIG. 58 illustrates a structural schematic of a first bracket, an intermediate conductive part, a grounding conductive part and a translation part provided by modified exemplary embodiment sixteen of the present disclosure.

As shown in FIG. 58, in another embodiment, a swing shaft 424 protruding backward may be disposed at the rear end of the first bracket 42*b*; a through hole for inserting the swing shaft 424 may be formed on the intermediate conductive part 43*a*; and the intermediate conductive part 43*a* may be supported by the swing shaft 424 and swing around the swing shaft. The lower end of the intermediate conductive part 43*a* may be the driven portion 431*a*, the upper end of the intermediate conductive part 43*a* may be the movable portion 433*a*, and the swing shaft 424 may be between the driven portion 431*a* and the movable portion 433*a* along the up-down direction. The resetting elastic part may be installed between the intermediate conductive part 43*a* and the first side 11. The resetting elastic part may be a compression spring.

The intermediate conductive part 43*a* may swing around the swing shaft 424 between the separation position that the movable portion 433*a* is separated from the first electrical contact portion 442 and the contact position that the movable portion 433*a* is in contact with the first electrical contact portion 442.

The first control protrusion 531*a* and the second control protrusion 532*a* may be disposed at the left end of the translation part 53*a* and protrude to the left. When the translation part 53*a* moves from the back to the front, the first control protrusion 531*a* and the second control protrusion 532*a* may successively touch the driven part 431*a*, and the intermediate conductive part 43*a* may swing, such that the movable portion 433*a* may be in contact with the first electrical contact portion 442. When the first control protrusion 531*a* and the second control protrusion 532*a* are out of contact with the driven portion 431*a*, the intermediate conductive part 43*a* may swing along the opposite direction under the elastic force of the resetting elastic part, such that the movable portion 433*a* may be out of contact with the first electrical contact portion 442.

Exemplary Embodiment Seventeen

Unless otherwise specified, the structure of the developing cartridge 1 of exemplary embodiment seventeen may be same as the structure of the developing cartridge 1 of exemplary embodiment sixteen.

Figure 59:
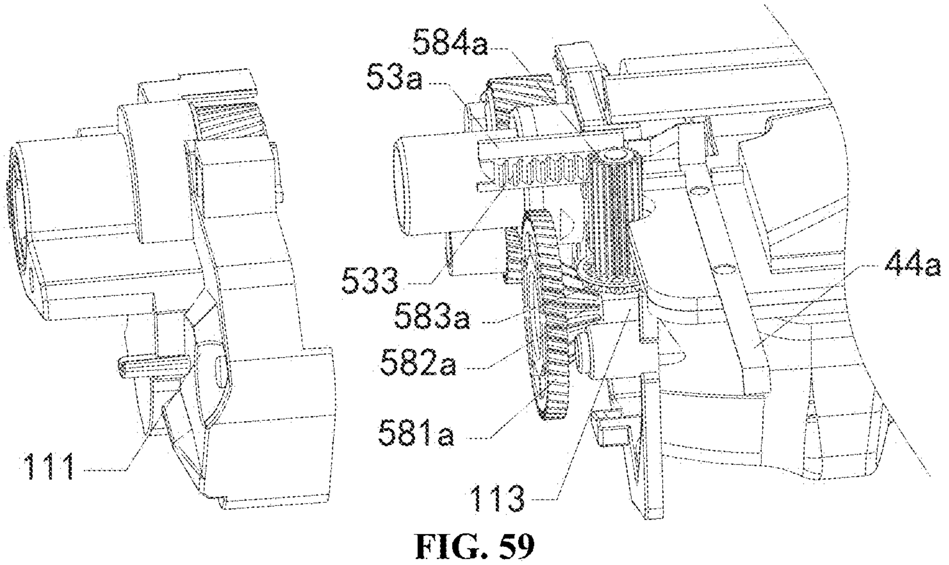
FIG. 59 illustrates a structural schematic of a first side after a first protective cover is separated from a casing provided by exemplary embodiment seventeen of the present disclosure.
Figure 60:
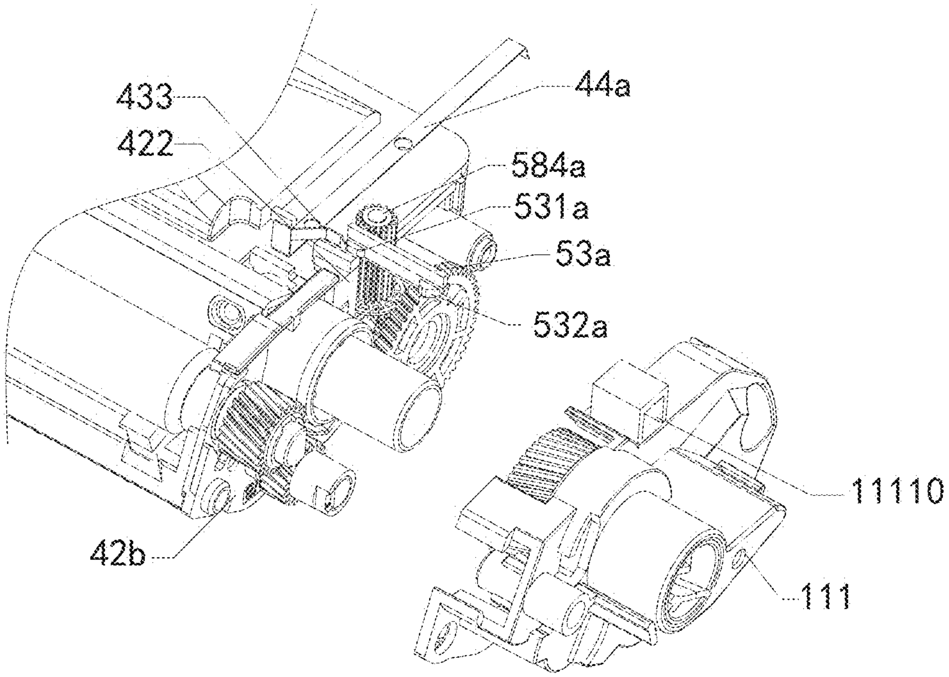
FIG. 60 illustrates a structural schematic of a first side after a first protective cover and a coupling are separated from a casing provided by exemplary embodiment seventeen of the present disclosure.

As shown in FIGS. 59-60, the difference between exemplary embodiment seventeen and exemplary embodiment sixteen is that the second transmission gear 582*a* may be a bevel gear.

The transmission gear may also include the third transmission gear 583*a* and the fourth transmission gear 584*a* which may be coaxially arranged. The third transmission gear 583*a* may be a bevel gear and engaged with the second transmission gear 582*a*. The rotation axis of the third transmission gear 583*a* may extend along the up-down direction. A supporting socket 113 protruding to the right may be fixedly disposed on the first side 11. The third supporting shaft extending upward may be disposed on the supporting socket 113. The third transmission gear 583*a* may be coaxially sleeved on the third supporting shaft and rotate around the third supporting shaft.

The fourth transmission gear 584*a* may be coaxially and fixedly disposed at the upper end of the third transmission gear 583*a* and may be a spur gear.

The first protective cover 111 may be disposed with a limiting hole 11110 for supporting and limiting the translation part 53*a*. The translation part 53*a* may be slidably installed in the limiting hole 11110 relative to the limiting hole 11110.

The translation part 53*a* may extend along the left-right direction; the first control protrusion 531*a* and the second control protrusion 532*a* may be arranged at intervals along the left-right direction; and the plurality of teeth 533*a* may be engaged with the fourth transmission gear 584*a*.

In one embodiment, the intermediate conductive part 43*a* may be not disposed. The upper end of the first bracket 42*b* may be disposed with the second protruding portion 422 protruding upward. The first electrical contact portion 442 of the grounding conductive part 44*a* may be configured as the movable portion 433. That is, the first electrical contact portion 442 may move relative to the grounding conductive part 44*a*. The movable portion 433 may extend upward from the front end of the first conductive part 41*a* and then extend to the right to form a bend shape. The projections of the movable portion 433, the first control protrusion 531*a* and the second control protrusion 532*a* along the left-right direction may be overlapped with each other; and the projections of the movable portion 433 and the second protruding portion 422 along the front-rear direction may be overlapped with each other.

When the first transmission gear 581*a* rotates, the force may be transferred through the second transmission gear 582*a* and the third transmission gear 583*a* to finally rotate the fourth transmission gear 584*a*, and the fourth transmission gear 584*a* may drive the translation part 53*a* to move from right to left, such that the first control protrusion 531*a* and the second control protrusion 532*a* may successively contact the movable portion 433, and the movable portion 433 may move from the separation position to the contact position twice.

Exemplary Embodiment Eighteen

Unless otherwise specified, the structure of the developing cartridge 1 of exemplary embodiment eighteen may be same as the structure of the developing cartridge 1 of exemplary embodiment thirteen.

Figure 61:
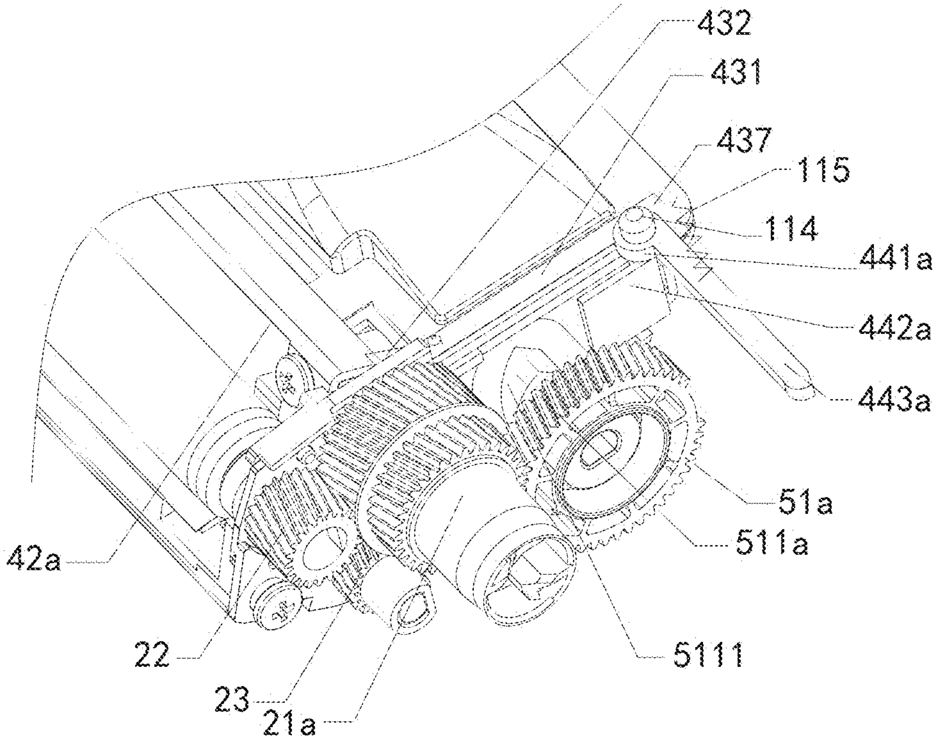
FIG. 61 illustrates a structural schematic of a first side after a first protective cover is hidden provided by exemplary embodiment eighteen of the present disclosure.

As shown in FIG. 61, the difference between exemplary embodiment eighteen and exemplary embodiment sixteen is the following. The first side 11 may be disposed with a pivot shaft 114 protruding upward along the up-down direction. The grounding conductive part 44*a* may be sleeved on the pivot shaft 114 and swing around the pivot shaft 114. The grounding conductive part 44*a* may include a pivot portion 441*a*, a driven portion 442*a* and a movable portion 443*a*. The pivot portion 441*a* may be configured with a pivot hole for inserting the pivot shaft 114, such that the grounding conductive part 44*a* may swing around the pivot shaft 114. The driven portion 442*a* may be connected to the lower end of the pivot portion 441*a* and extend downward; and the movable portion 443*a* may extend rightward from the pivot portion 441*a*. The pivot portion 441*a* may be in contact with and electrically connected to the third electrical contact portion 437. In one embodiment, the movable portion 443*a* may be configured to be in contact with and electrically connected to the grounding part in the image-forming apparatus. A resetting elastic part 115 may be also installed between the movable portion 443*a* and the casing 10. The resetting elastic part 115 may be a tension spring. The tension spring may be between the movable portion 443*a* and the casing 10.

The first control protrusion 511*a* may include an inclined first contact surface 5111 which may intersect the front-rear direction and the left-right direction. The first contact surface 5111 may be configured to be that the upstream may be farther from the first side 11 than downstream along the rotation direction of the first rotating part 51*a* (the detected part). The first contact surface 5111 may be configured to contact the driven portion 442*a*. The second control protrusion may a same structure as the first control protrusion 511*a*.

When the first rotating part 51*a* receives force to rotate, the first contact surface 5111 may be in contact with the driven part 442*a*, such that the driven part 442*a* may drive entire grounding conductive part 44*a* to overcome the elastic force of the resetting elastic part 115 and swing around the pivot shaft 114, and the movable portion 443*a* may move from the separation position which is not in contact with the grounding part to the contact position which is in contact with the grounding part.

When the first contact surface 5111 is out of contact with the driven part 442*a*, the grounding conductive part 44*a* may swing along the opposite direction under the elastic force of the resetting elastic part 115, such that the movable portion 443*a* may move from the contact position to the separation position.

The action process of the second control protrusion 512*a* may be same as the action process of the first control protrusion 511*a*, which may not be described in detail herein.

Exemplary Embodiment Nineteen

Unless otherwise specified, the structure of the developing cartridge 1 of exemplary embodiment nineteen may be same as the structure of the developing cartridge 1 of exemplary embodiment sixteen.

Figure 62:
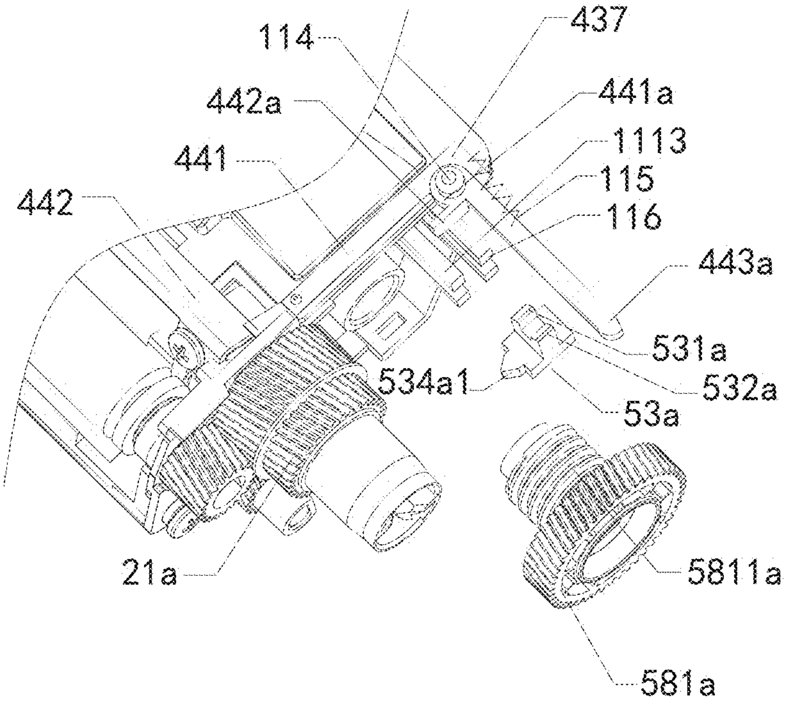
FIG. 62 illustrates an exploded structural view of a first side provided by exemplary embodiment nineteen of the present disclosure.

As shown in FIG. 62, the difference between exemplary embodiment nineteen and exemplary embodiment sixteen is the following. In one embodiment, only one transmission gear may be disposed; the left end of the first transmission gear 581*a* may be disposed with a thread portion 5811*a*; and a thread groove may be disposed on the outer peripheral surface of the thread portion 5811*a*.

The first side 11 may be disposed with a first guiding rail 116 extending along the left-right direction. The translation part 53*a* may be slidably installed on the first guiding rail 116. The upper end of the translation part 53*a* may be disposed with the first control protrusion 531*a* and the second control protrusion 532*a* arranged along the left-right direction at intervals. The first control protrusion 531*a* and the second control protrusion 532*a* may be respectively disposed with the first contact surface and the second contact surface, which are inclined surfaces. The first contact surface and the second contact surface may intersect the left-right direction and the up-down direction. The left end of the translation part 53*a* may be disposed with an insertion protrusion 534*a*1 which may protrude to the left and be inserted into the thread groove. The translation part 53*a* may be configured as the detected part having the detected protrusion.

When the first transmission gear 581*a* drives the thread portion 5811*a* to rotate together, through the cooperation between the thread groove and the insertion protrusion 534*a*1, the translation part 53*a* may slide to the left and drive the first control protrusion 531*a* and the second control protrusion 532*a* to move to the left. In such way, the first contact surface and the second contact surface may contact the driven part 442*a* in sequency, the grounding conductive part 44*a* may swing, and furthermore the movable portion 443*a* may move from the separation position to the contact position. When the first contact surface is out of contact with the driven part 442*a*, the grounding conductive part 44*a* may swing along the opposite direction under the action of the resetting elastic part 115, such that the movable portion 443*a* may move from the contact position to the separation position.

Exemplary Embodiment Twenty

Unless otherwise specified, the structure of the developing cartridge 1 of exemplary embodiment twenty may be same as the structure of the developing cartridge 1 of exemplary embodiment fourteen.

Figure 63:
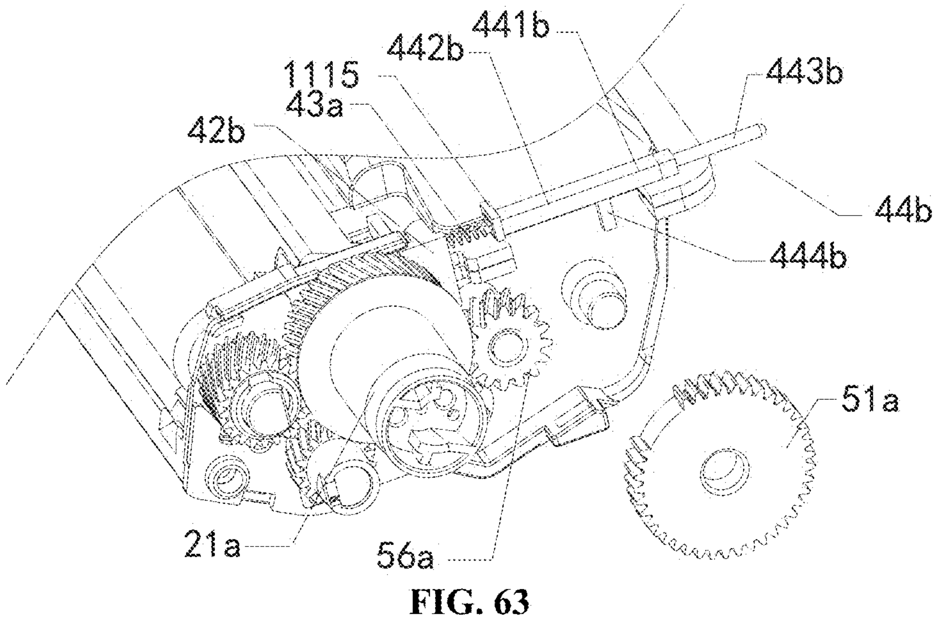
FIG. 63 illustrates an exploded structural view of a first side provided by exemplary embodiment twenty of the present disclosure.

As shown in FIG. 63, the difference between exemplary embodiment twenty and exemplary embodiment fourteen is the following. In one embodiment, the intermediate conductive part 43*a* may be a conductive elastic part, optionally, a tension spring. The front end of the intermediate conductive part 43*a* may be fixedly and electrically connected to the first bracket 42*b*, and the rear end may be fixedly and electrically connected to the first electrical contact portion of the grounding conductive part 44*b*. The fixed connection may be a locking or welding manner.

The first side 11 may be disposed with the first rail, and the grounding conductive part 44*b* may move relative to the casing 10 along the front-rear direction along the first rail. The grounding conductive part 44*b* may include a first electrical contact portion, a fourth main body portion and a movable portion 443*b*. The front end of the fourth main body may be the first electrical contact portion, and the movable portion 443*b* may be fixedly arranged at the rear end of the fourth main body and extend backward. The movable portion 443*b* may move between the contact position, which is in contact with and electrically connected to the grounding part in the image-forming apparatus, and the separation position, which is not in contact with and not electrically connected to the grounding part in the image-forming apparatus. A driven portion 442*b* may be also disposed at the lower end of the fourth main body. The driven portion 442*b* may be formed by extending downward from the fourth main body.

In one embodiment, the transmission assembly may also include the first idler gear. The first idler gear may include a large-diameter gear portion and a small-diameter gear portion which are coaxially integrally formed. The large-diameter gear portion may be engaged with the driving gear, and the small-diameter gear portion may be engaged with the first rotating part 51*a*, such that the axis position and the transmission ratio of the first rotating part 51*a* may be adjusted.

When the first rotating part 51*a* receives force to rotate, the first control protrusion 511*a* and the second control protrusion 512*a* may contact the driven part 442*b* in sequence, such that the grounding conductive part 44*a* may move backward and stretch the intermediate conductive part 43*a*, and the movable portion 443*b* may move backward from the separation position to the contact position. When the first control protrusion 511*a* is out of contact with the driven part 442*b*, the grounding conductive part 44*a* may move forward under the elastic force of the intermediate conductive part 43*a*, such that the movable portion 443*b* may move forward from the contact position to the separation position. The working process of the second control protrusion 512*a* may be same as that of the first control protrusion 511*a*, which may not be described in detail herein. In some embodiments, the grounding conductive part 44*a* may also move or swing in the second direction or the third direction.

Exemplary Embodiment Twenty One

Unless otherwise specified, the structure of the developing cartridge 1 of exemplary embodiment twenty one may be same as the structure of the developing cartridge 1 of exemplary embodiment seventeen.

Figure 64:
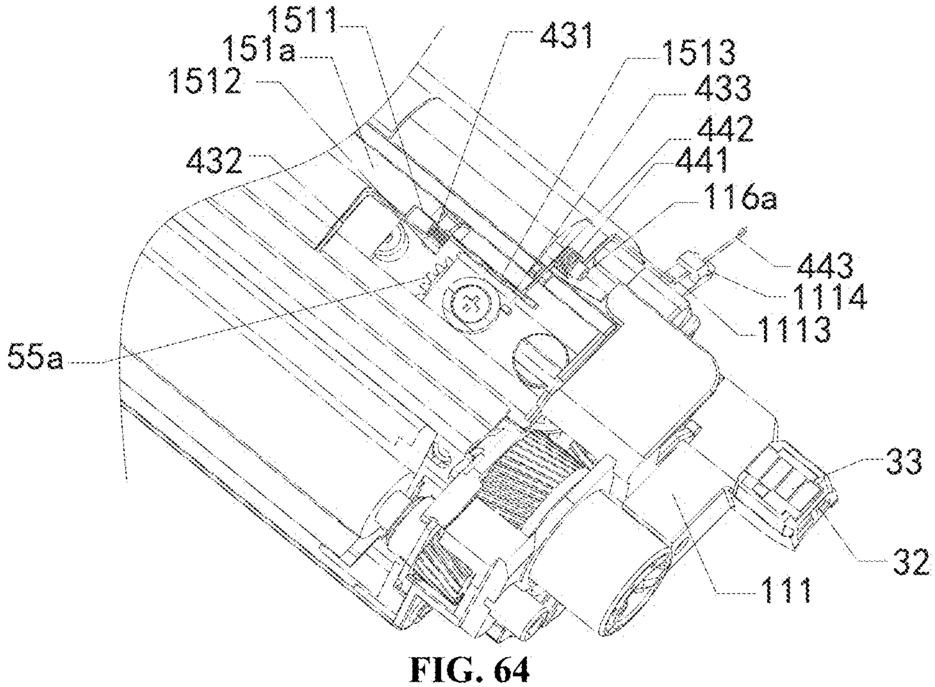
FIG. 64 illustrates a structural schematic of a first side provided by exemplary embodiment twenty one of the present disclosure.
Figure 65:
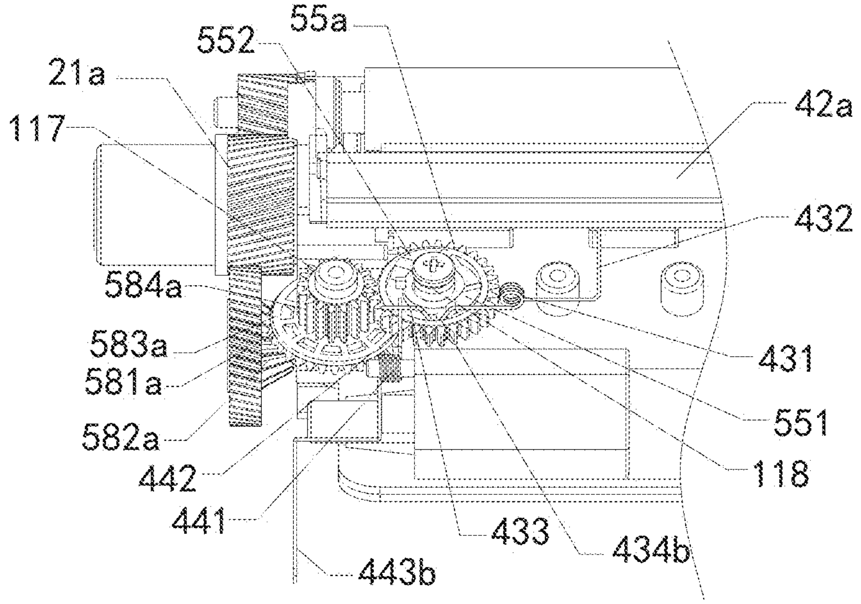
FIG. 65 illustrates a structural schematic of a first side after a covering part is hidden provided by exemplary embodiment twenty one of the present disclosure.

As shown in FIGS. 64-65, the difference between exemplary embodiment twenty one and exemplary embodiment seventeen is the following. The first rotating part 55*a* may be a spur gear and engaged with the fourth transmission gear 584*a*. The first side 11 may be disposed with the second rotating shaft 118. The first rotating part 55*a* may be rotatably sleeved on the second rotating shaft 118. The rotation axis of the first rotating part 55*a* may extend along the up-down direction. The first control protrusion 551 and the second control protrusion 552 may be disposed on the upper end surface of the first rotating part 55*a*. The first control protrusion 551 and the second control protrusion 552 may be arranged along the circumferential direction of the first rotating part 55*a*. The toothless portion may be disposed on the circumferential surface of the first rotating part 55*a*. That is, in one embodiment, the first rotating part 55*a* may be configured as the detected part with the detected protrusion.

A covering part 151*a* may be also installed at the upper end of the casing 10. The covering part 151*a* may cover the third transmission gear 583*a*, the fourth transmission gear 584*a* and the first rotating part 55*a*. An observation opening 1511 may be disposed on the covering part 151*a*, and the first rotating part 55*a* may be exposed through the observation opening 1511 along the up-down direction, such that the first rotating part 55*a* may be observed from the outside. The fifth positioning column 1512 may be fixedly disposed on the rear wall of the observation opening 1511. The fifth positioning column 1512 may protrude forward.

The intermediate conductive part 43*a* and the grounding conductive part 44*a* may be respectively torsion spring shapes formed by bending steel wires. The front end of the third conductive portion 432 may be in contact with and electrically connected to the layer thickness regulating blade. The third main body portion 431 may be installed on the fifth positioning column 1512. The covering part 151*a* may be also disposed with a movable opening 1513 which may pass through the covering part 151*a* along the vertical direction. The right end of the movable opening 1513 may be disposed with the first abutted portion. The movable portion 433 may be in the movable opening 1513. The movable portion 433 may include the driven portion 434*b*. The motion trajectory of the driven portion 434*b* may be overlapped with the motion trajectories of the first control protrusion 551 and the second control protrusion 552 along the up-down direction. The movable portion 433 may be abutted against the upper surface of the first abutted portion.

The first side 11 may be fixedly disposed with the sixth positioning column 116*a* which may protrude to the right. The first electrical contact portion 44 of the grounding conductive part 44*a* may be abutted against the upper surface of the cover part 151*a*. The first electrical contact portion 442 may be below the movable portion 433. The movable portion 433 may be abutted downwardly against the first electrical contact portion 442 under the action of elastic force. Furthermore, when the movable portion 433 is in the contact position, the first electrical contact portion 442 may be in contact with and electrically connected to the movable portion 433; and when the movable portion 433 is in the separation position, the first electrical contact portion 442 may be not in contact with and electrically connected to the movable portion 433. The fourth main body portion 441 may be sleeved on the sixth positioning column 116*a*, such that the grounding conductive part 44*a* may be supported by the sixth positioning column 116*a*. The second electrical contact portion 443 may be formed by extending backward from the fourth main body portion 441. The rear end of the first protective cover 111 may be fixedly disposed with the second abutted portion 1113, and the second electrical contact portion 443 may be abutted against the upper surface of the second abutted portion 1113. A limiting portion 1114 may be also fixedly disposed on the second abutted portion 1113. The limiting portion 1114 and the second abutted portion 1113 may jointly form a limiting groove with openings at the left end, the front end and the rear end, such that the second electrical contact portion 443 may be limited along the up-down direction and the right direction when being inserted into the limiting groove, which may prevent the second electrical contact portion 443 from being misaligned.

When the coupling 21*a* rotates, the force may be transmitted to the first rotating part 55*a* through the coupling 21*a*, the first transmission gear 581*a*, the second transmission gear 582*a*, the third transmission gear 583*a*, and the fourth transmission gear 584*a*, such that the first rotating part may rotate.

During the rotation of the first rotating part 55*a*, the first control protrusion 551 and the second control protrusion 552 may contact the driven part 434*b* in sequence, such that the driven portion 434*b* may be pushed upward by the first control protrusion 551 and the second control protrusion 552 in sequence, and the movable portion 433 may swing upward twice and move from the contact position to the separation position. When the driven portion 434*b* is out of contact with the first control protrusion 551 and the second control protrusion 552, the movable portion 433 may swing downward under the action of the elastic force and move from the separation position to the contact position.

Exemplary Embodiment Twenty Two

Unless otherwise specified, the structure of the developing cartridge 1 of exemplary embodiment twenty two may be same as the structure of the developing cartridge 1 of exemplary embodiment twenty one.

Figure 66:
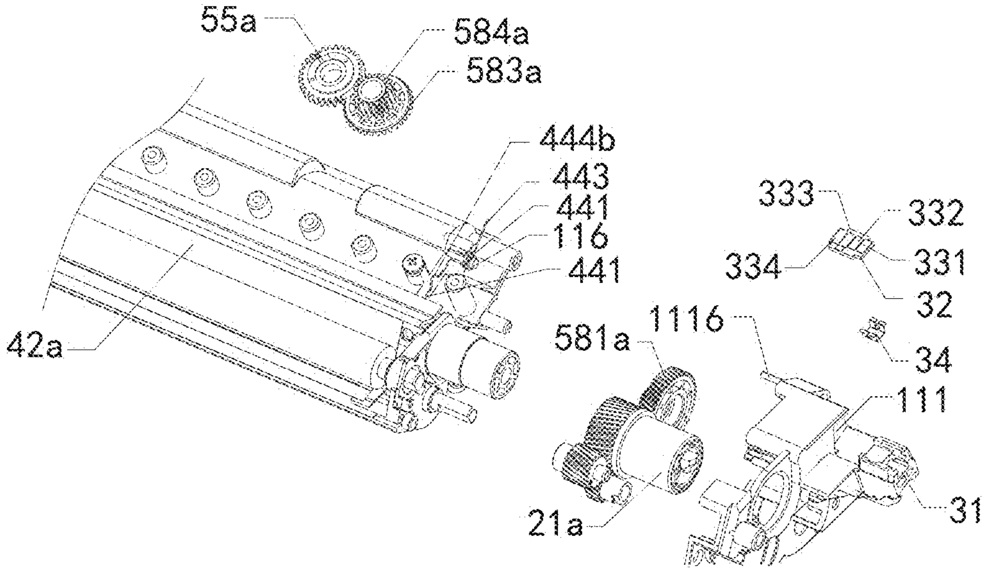
FIG. 66 illustrates an exploded structural view of a developing cartridge provided by exemplary embodiment twenty two of the present disclosure.
Figure 67:
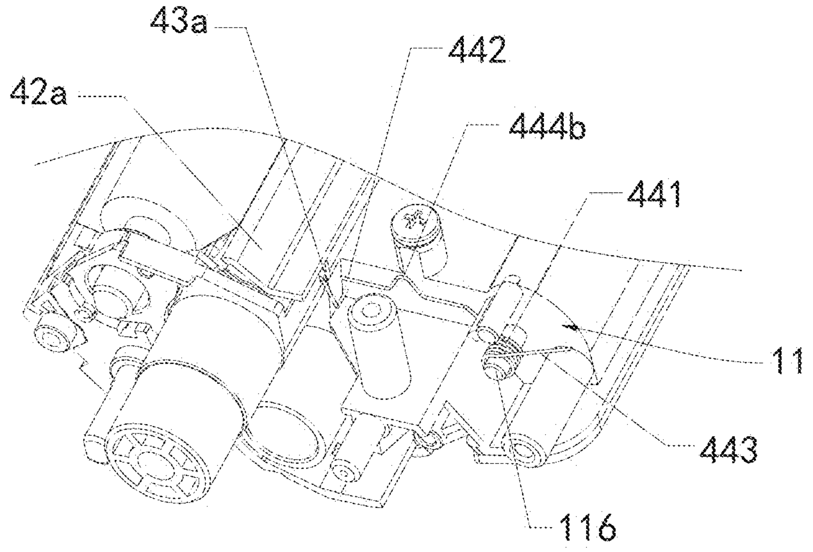
FIG. 67 illustrates a structural schematic of a first side provided by exemplary embodiment twenty two of the present disclosure.
Figure 68:
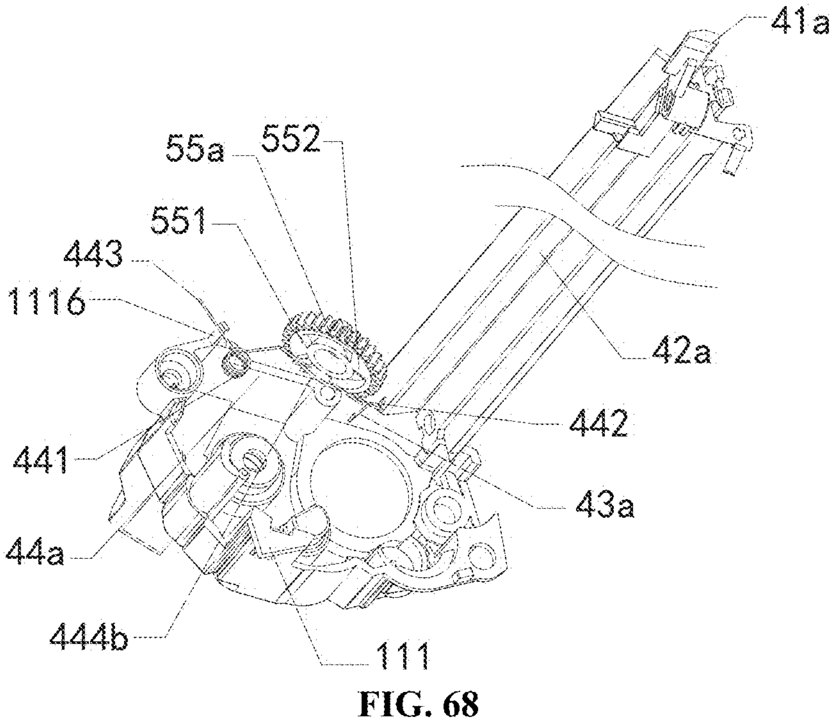
FIG. 68 illustrates a structural schematic of a first protective cover, a first rotating part and a conductive assembly provided by exemplary embodiment twenty two of the present disclosure.

As shown in FIGS. 66-68, the difference between exemplary embodiment twenty two and exemplary embodiment twenty one is the following. The identification assembly may include the first chip 32 including the storage medium and the electrical contact surface. The number of electrical contact surfaces may be four. The number of electrical contact surfaces may be other values in other embodiments. The electrical contact surfaces may be arranged in the first direction, and may be the first electrical contact surface 331, the grounding electrical contact surface 332, the third electrical contact surface 333, and the fourth electrical contact surface 334 from right to left in the first direction. When the developing cartridge 1 is installed in the image-forming apparatus, the electrical contact surfaces may be in contact with and electrically connected to the identification terminal in the image-forming apparatus. The identification terminal may also have four electrical contacts. The four electrical contacts may be arranged in the first direction; and may be the first electrical contact, the second electrical contact, the third electrical contact, and the fourth electrical contact from right to left in the first direction. The first electrical contact, the second electrical contact, the third electrical contact, and the fourth electrical contact may respectively correspond to the first electrical contact surface 331, the grounding electrical contact surface 332, the third electrical contact surface 333, and the fourth electrical contact surface 334; and the second electrical contact may be electrically connected to the grounding part.

The intermediate conductive part 43*a* may be fixedly installed on the first side 11; and the front end of the intermediate conductive part 43*a* may be in contact with and electrically connected to the layer thickness regulating blade.

The first electrical contact portion 442 may be the movable portion and at the front end of the grounding conductive part 44*a*. The driven portion 444*b* may be between the first electrical contact portion 442 and the fourth main body portion 441 along the front-rear direction. The driven portion 444*b* may be in the shape of the protrusion protruding upward. The first electrical contact portion 442 and the driven portion 444*b* may be both below the first rotating part 55*a*. The first control protrusion 551 and the second control protrusion 552 may be disposed on the lower surface of the first rotating part 51*a*. Under the action of the force applied by the first control protrusion 551 and the second control protrusion 552 and the elastic force of the grounding conductive part 44*a* itself, the driven portion 444*b* may drive the first electrical contact portion 442 to move between the contact position, which is in contact with and electrically connected to the intermediate conductive part 43*a*, and the separation position, which is not in contact with and not electrically connected to the intermediate conductive part 43*a*. In one embodiment, the second electrical contact portion 443 may not directly contact the grounding part.

A chip socket 34 may be fixedly disposed on the substrate. The chip socket 34 may be fixed on the substrate by a welding or adhering manner and electrically connected to the grounding electrical contact surface 332. The chip socket 34 may be also in contact with and electrically connected to the chip holder 31. In one embodiment, the chip holder 31 and the first protective cover 111 may be both made of a conductive material such as conductive resin or metal. The chip holder 31 may be fixedly installed on the right end of the first protective cover 111 and electrically connected to the first protective cover 111. The chip socket 34 may be configured as the grounding conductive part.

The left end of the first protective cover 111 may be disposed with an extension portion 1116 which may extend to the left from the left end of the first protective cover 111. The extension portion 1116 may be abutted against and electrically connected to the second electrical contact portion 443. The first control protrusion 551 and the second control protrusion 552 may move together with the fourth transmission gear 584*a*. When the first control protrusion 551 is in contact with the driven part 444*b*, the driven part 444*b* may be pressed downward, such that the driven part 444*b* may drive the first electrical contact portion 442 to generate elastic deformation and move downward from the separation position to the contact position. As the first control protrusion 551 moves, when the first control protrusion 551 is out of contact with the driven part 444*b*, under the elastic action of the grounding conductive part 44*a* itself, the first electrical contact portion 442 may move upward from the contact position to the separation position. The working process of the second control protrusion 552 may be same as that of the first control protrusion 552, which may not be described in detail herein.

Compared with other embodiments, in one embodiment, the grounding electrical contact surface 332 may be electrically connected to the grounding part; and the conductive part which may extend outward from the developing cartridge 1 and be in contact with the grounding part may not need to be disposed on the developing cartridge 1, which may greatly reduce the risk of the conductive part used for grounding being deformed by collision during transportation.

Exemplary Embodiment Twenty Three

Unless otherwise specified, the structure of the developing cartridge 1 of exemplary embodiment twenty three may be same as the structure of the developing cartridge 1 of exemplary embodiment thirteen.

Figure 69:
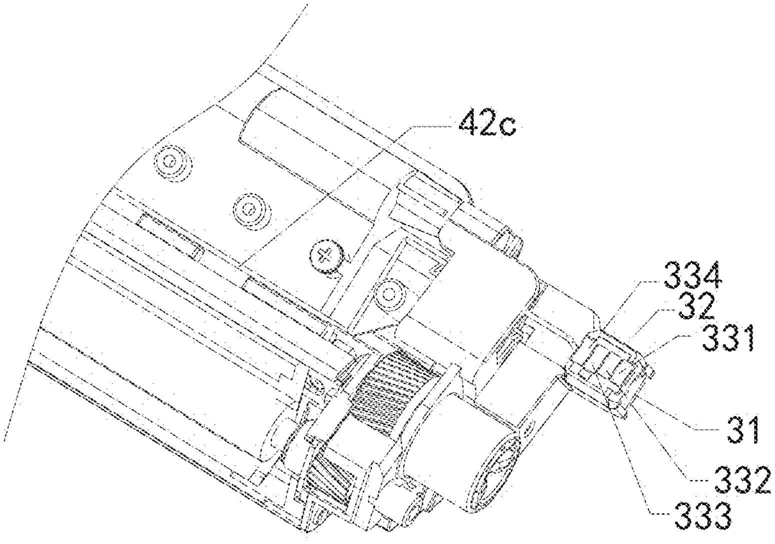
FIG. 69 illustrates a structural schematic of a first side provided by exemplary embodiment twenty three of the present disclosure.
Figure 70:
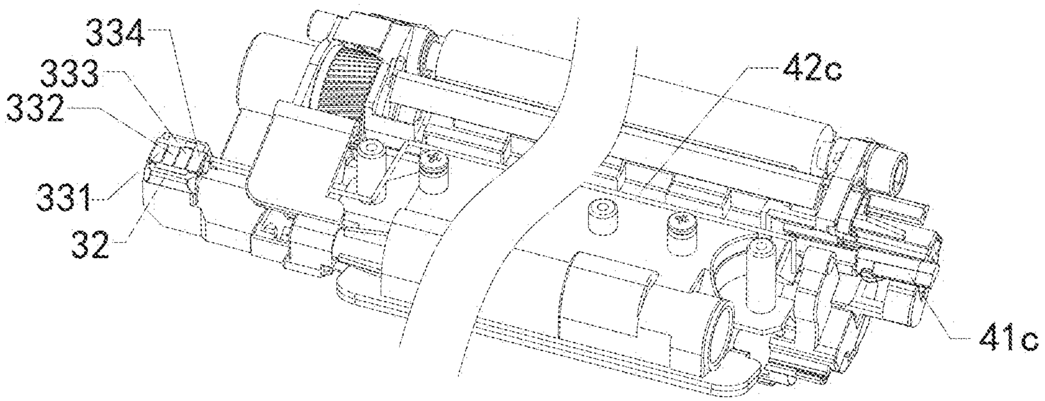
FIG. 70 illustrates a structural schematic of a developing cartridge provided by exemplary embodiment twenty three of the present disclosure.

As shown in FIGS. 69-70, the difference between exemplary embodiment twenty three and exemplary embodiment thirteen is that the identification assembly may include the first chip 32 which may include the storage medium and the control module.

In one embodiment, the second conductive part 42*c* may be a wire which may extend from the second side 12 to the first side 11 in the first direction. The left end of the wire may be fixedly and electrically connected to the electrical receiving portion, and the right end of the wire may be fixedly connected to the chip 32 and electrically connected to the control module. The control module may be also electrically connected to the grounding electrical contact surface 332. The control module may be configured to control whether the second conductive part 42*c* is electrically connected to the grounding electrical contact surface 332. That is, the control module in one embodiment may be configured as the detected part.

In one embodiment, other gears except the coupling 21*a*, the developing gear 22 and the developer feeding gear 23 may not need to be disposed; and the intermediate conductive part 43*a* and the grounding conductive part 44*a* may not need to be disposed, thereby reducing the number of parts, reducing costs and simplifying the structure.

In one embodiment, when the developing cartridge 1 is installed in the image-forming apparatus, the first electrical contact, the third electrical contact, and the fourth electrical contact may supply electricity to the chip. In other embodiments, one or more of the first electrical contact, the third electrical contact, and the fourth electrical contact may supply electricity to the chip. When the chip receives the electricity provided by the image-forming apparatus, the image-forming apparatus may read the information stored in the storage medium to determine the model, capacity, lifetime and other information of the developing cartridge 1 and prompt the information to the user. Meanwhile, the control module may start to work, such that the second conductive part 42*c* and the grounding electrical contact surface 332 may be connected and disconnected according to rules. When the developing cartridge 1 is installed in the image-forming apparatus and the chip receives the electricity provided by the image-forming apparatus, the second conductive part 42*c* and the grounding electrical contact surface 332 may be first in a disconnection state (i.e., not electrically connected), and the duration of the disconnection state may last for T1; and then the control module may make the second conductive part 42*c* and the grounding electrical contact surface 332 enter a conduction state (i.e., electrically connected), and the duration of the conduction state may last for T2, such that the second conductive part 42*c* may be grounded through the grounding electrical contact surface 332. Subsequently, the control module may make the second conductive part 42*c* and the grounding electrical contact surface 332 enter the disconnection state, and the duration of the disconnection state may last for T3; and then the control module may make the second conductive part 42*c* and the grounding electrical contact surface 332 enter the conduction state again, and the duration of the conduction state may last for T4. Finally, the control module may keep the second conductive part 42*c* and the grounding electrical contact surface 332 in the disconnection state.

The control module may be configured to repeat abovementioned process when the electricity is turned off and then turned on again, such that the developing cartridge 1 may be reused after the user removes the developing cartridge 1 out of the image-forming apparatus without replacing new chip.

Exemplary Embodiment Twenty Four

Unless otherwise specified, the structure of the developing cartridge 1 of exemplary embodiment twenty four may be same as the structure of the developing cartridge 1 of exemplary embodiment twenty three.

Figure 71:
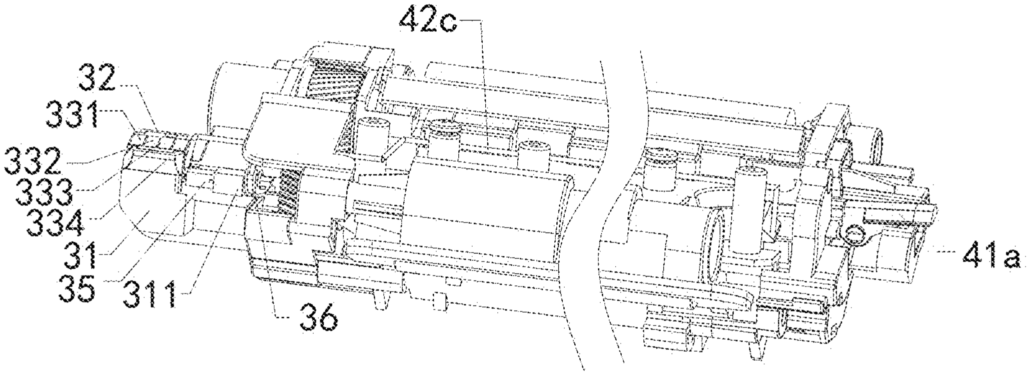
FIG. 71 illustrates a structural schematic of a developing cartridge provided by exemplary embodiment twenty four of the present disclosure.
Figure 72:
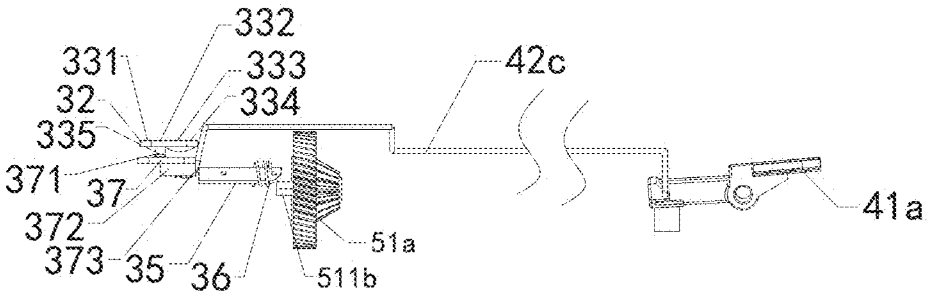
FIG. 72 illustrates a structural schematic of a first chip, a second chip, a translation part, a first rotating part, a first conductive part, and a second conductive part provided by exemplary embodiment twenty four of the present disclosure.
Figure 73:
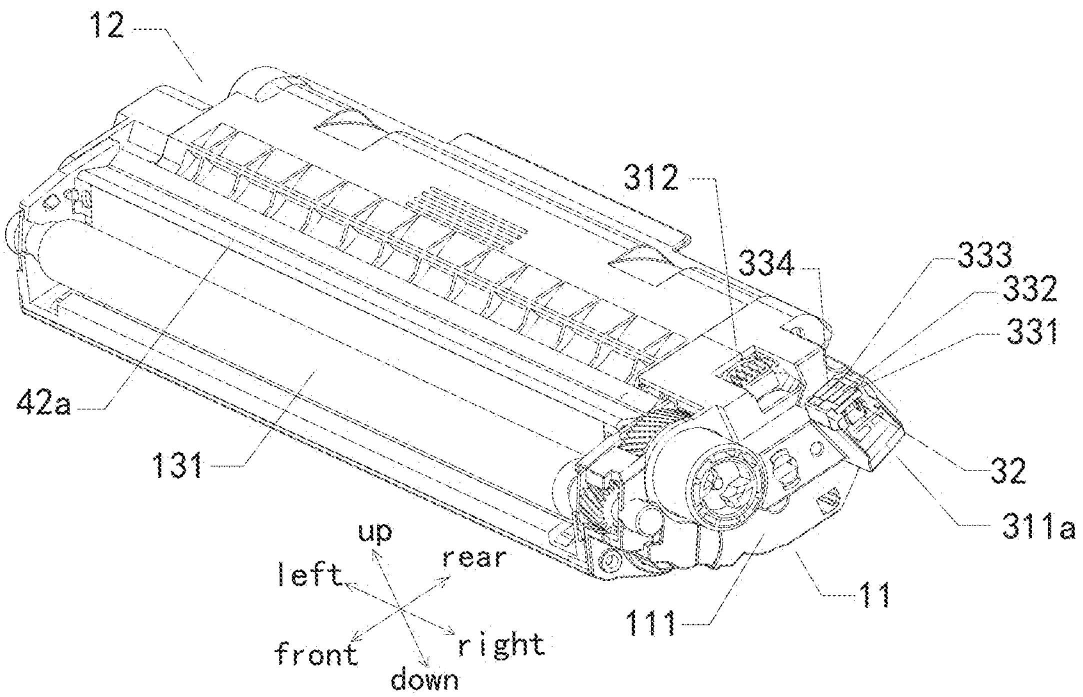
FIG. 73 illustrates a structural schematic of a developing cartridge provided by exemplary embodiment twenty five of the present disclosure.
Figure 74:
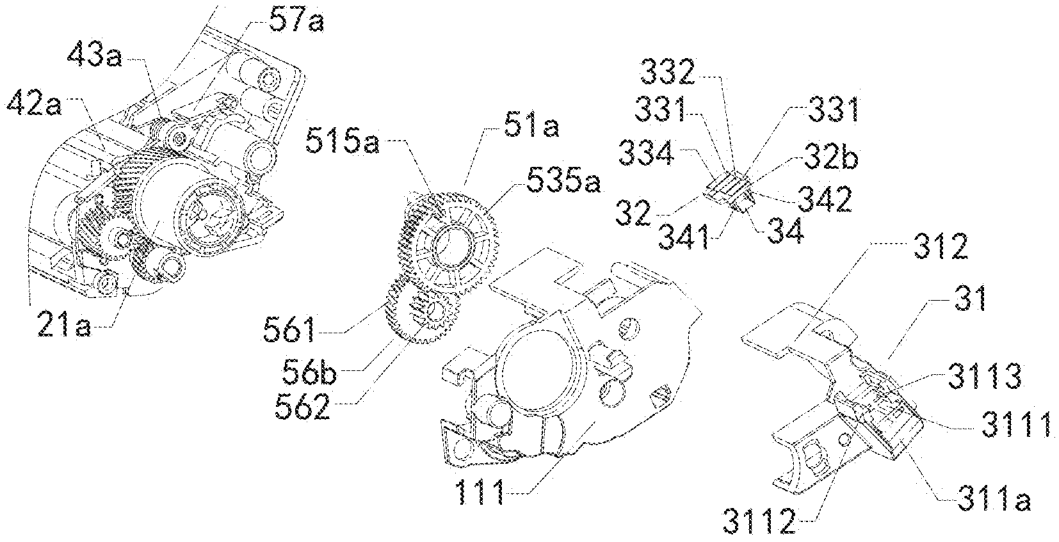
FIG. 74 illustrates an exploded structural view of a first side of a casing provided by exemplary embodiment twenty five of the present disclosure.
Figure 75:
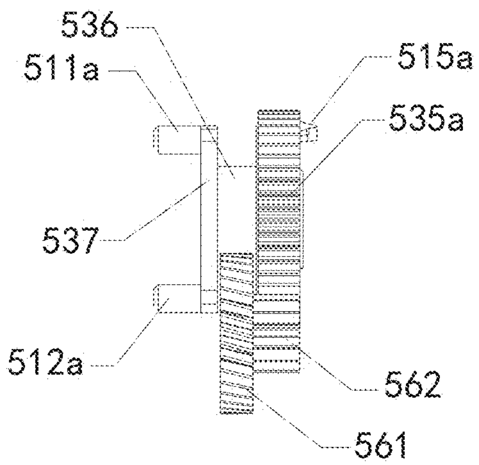
FIG. 75 illustrates a structural schematic of a first rotating part and an idler gear provided by exemplary embodiment twenty five of the present disclosure.
Figure 76:
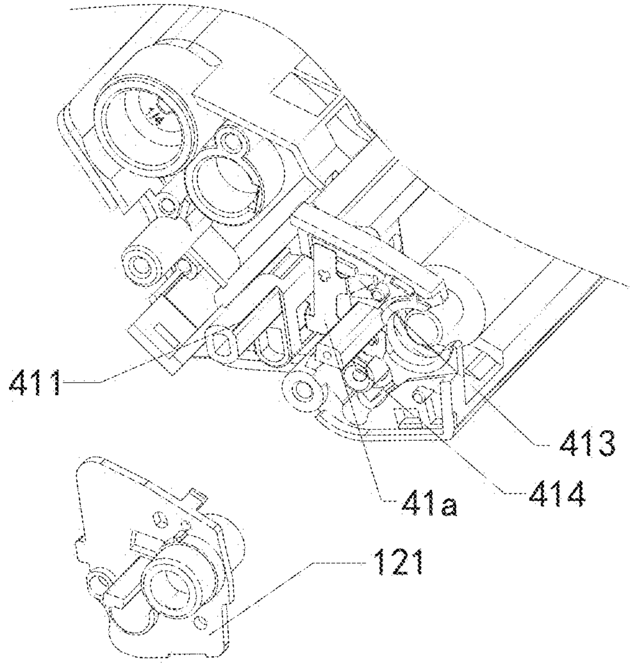
FIG. 76 illustrates an exploded structural view of a second side provided by exemplary embodiment twenty five of the present disclosure.
Figure 77:
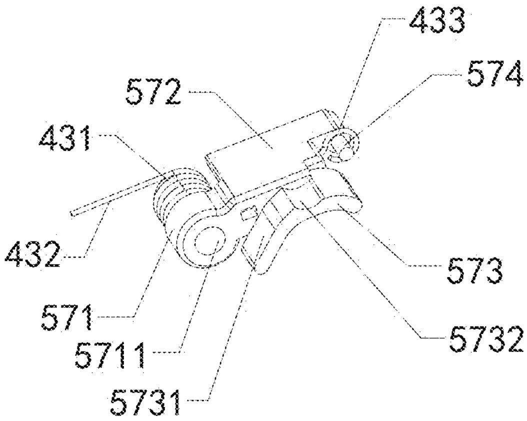
FIG. 77 illustrates a structural schematic of a movable portion and an intermediate conductive part provided by exemplary embodiment twenty five of the present disclosure.
Figure 78:
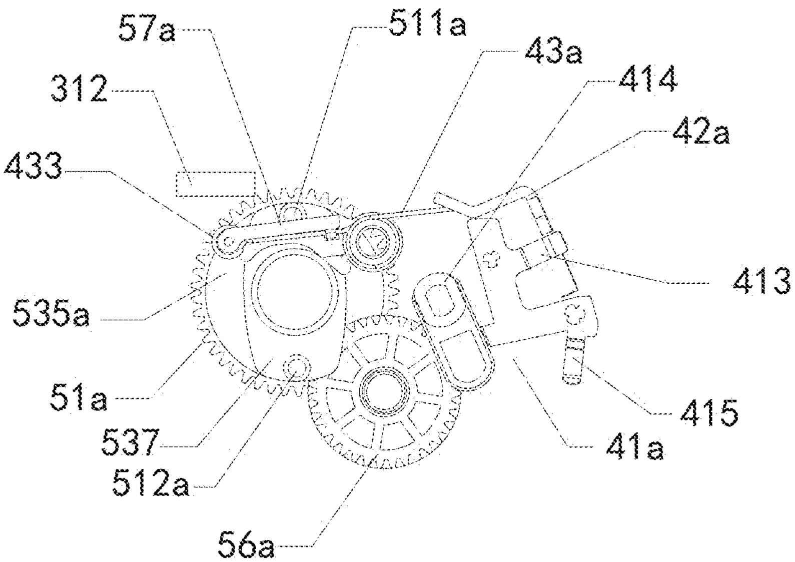
FIG. 78 illustrates a structural schematic of matching relationship of an idler gear, a first rotating part, and a conductive assembly when a movable portion and a moving portion are in a separation position when viewed from left to right provided by exemplary embodiment twenty five of the present disclosure.
Figure 79:
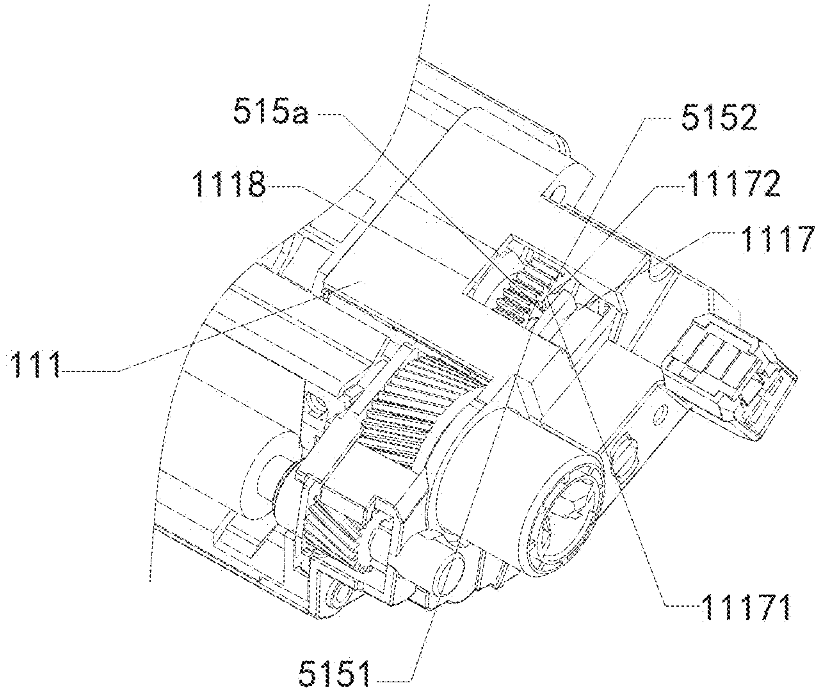
FIG. 79 illustrates a structural schematic of a resetting protrusion and a resetting matching protrusion provided by exemplary embodiment twenty five of the present disclosure.

As shown in FIGS. 71-72, the difference between exemplary embodiment twenty four and exemplary embodiment twenty three is the following. The identification assembly may include the first chip 32 and the second chip 37. The first chip 32 may include the storage medium, and the second chip 37 may include the control module. The first electrical contact surface 331, the grounding electrical contact surface 332, the third electrical contact surface 333, and the fourth electrical contact surface 334 may be arranged on the upper surface of the first chip 32. The lower surface of the first chip 32 may be also disposed with the fifth electrical contact surface 335. The fifth electrical contact surface 335 may be electrically connected to the grounding electrical contact surface 332.

The upper surface of the second chip 37 may be disposed with the sixth electrical contact surface 371. The second chip 37 may be installed on the chip holder 31 and located below the first chip 32. The sixth electrical contact surface 371 may be in contact with and electrically connected to the fifth electrical contact surface 335. The second chip 37 may be disposed with a switching part 373 and a battery 372 for supplying electricity to the control module. The switching part 373 may be configured to control the conduction and disconnection between the battery 372 and the control module. The switching part 373 may move between the conduction position that the loop between the battery 372 and the control module is formed and the disconnection position that the loop between the battery 372 and the control module is disconnected. In one embodiment, the switching part 373 may be a metal sheet. The second conductive part 42*a* may be electrically connected to the control module of the second chip 37.

The chip holder 31 may be disposed with a sliding rail 311. A movable part 35 sliding in the first direction may be installed in the sliding rail 311. A resetting elastic part 36 may be sleeved on the movable part 35. The left end of the resetting elastic part 36 may be abutted against the right end of the sliding rail 311, and the right end of the resetting elastic part 36 may be abutted against the limiting protrusion on the movable part 35. The right end of the movable part 35 may be disposed with an inclined surface. The right end of the first rotating part 51*a* may be disposed with a switch protrusion 511*b* protruding rightward in the first direction. The switch protrusion 511*b* may be configured to contact the inclined surface on the movable part 35 to apply a rightward force to the movable part 35. In one embodiment, the first rotating part 51*a* may be a toothless gear. That is, in one embodiment, the control module may be configured as the second detected part, the first rotating part 51*a* may be configured as the first detected part, and the switch protrusion 511*b* may be configured as the control protrusion.

When the developing cartridge 1 is installed in the image-forming apparatus, the first rotating part 51*a* may receive force and start to rotate, such that the switch protrusion 511*b* may be in contact with the movable part 35, and the movable part 35 may move to the right and compress the resetting elastic part 36. The right end of the movable part 35 may push the switching part 373, such that the switching part 373 may move from the disconnection position to the conduction position, such that the battery 372 may start to supply electricity to the control module of the second chip 37, thereby starting the control module to operate. The working process of the control module may be same as that in exemplary embodiment twenty three, which may not be described in detail herein. Compared with existing detection structure, exemplary embodiment twenty four may also have the effect of simple structure and small number of parts.

In other embodiments, the second chip 37 may also be fixedly installed on the second side 12 to achieve same effect.

Exemplary Embodiment Twenty Five

Unless otherwise specified, the structure of the developing cartridge 1 of exemplary embodiment twenty five may be same as the structure of the developing cartridge 1 of exemplary embodiment thirteen.

As shown in FIGS. 73-79, the difference between exemplary embodiment twenty five and exemplary embodiment thirteen is the following. In one embodiment, the electrical receiving portion 411 may be fixedly installed on the second side 12 and made of a conductive resin material (may also be other conductive materials such as metal). The electrical receiving portion 411 may be configured to be in contact with a detection rod in the image-forming apparatus and to be in contact with and electrically connected to the power supply terminal in the image-forming apparatus. In one embodiment, the first conductive part 41*a* may not be disposed with the developing contact portion in contact with the developing roller shaft 1311; that is, may not be electrically connected to the developing roller shaft 1311. The developer feeding contact portion 414 may be electrically connected to the developer feeding roller shaft.

The second conductive part 42*a* (the layer thickness regulating blade) may be in contact with the developing body to transfer potential. In one embodiment, the developing body and the developing roller shaft 1311 may not be electrically connected to each other.

The intermediate conductive part 43*a* may be a conductive torsion spring. The conductive torsion spring may include the third conductive portion 432, the third main body portion 431, and the movable portion 433 which may be formed into a single piece. The third main body portion 431 may be a hollow cylinder formed by winding conductive steel wires. The third conductive portion 432 may be configured to be in contact with and electrically connected to the second conductive part 42*a*. An abutting protrusion protruding to the right may be fixedly disposed on the first side 11, and the third conductive portion 432 may be abutted upwardly against the abutting protrusion. Therefore, the third conductive portion 432 may be limited by the abutting protrusion to prevent the third conductive portion 432 from swinging upward, thereby ensuring the stable contact between the third conductive portion 432 and the second conductive part 42*a*. The movable portion 433 may be configured to be in contact with and electrically connected to the chip holder 31.

The grounding conductive part may be the chip holder 31. In one embodiment, the chip holder 31 may be made of a conductive resin material (may also be other conductive materials such as metal, or additional disposed wires for conduction). The chip holder 31 may include a chip supporting portion 311*a* and a conductive extension portion 312 which may be formed into a single piece. The chip supporting portion 311*a* may be further to the right than the conductive extension portion 312; that is, the conductive extension portion 312 may be formed by extending from the chip supporting portion 311*a* to the left. When viewed from the top and bottom, the conductive extension portion 312 may at least cover a portion of the intermediate conductive part 43*a* (in one embodiment, the conductive extension portion 312 may cover the movable portion 433 of the intermediate conductive part 43*a*). The chip supporting portion 311*a* may include a chip supporting groove 3111 formed by being recessed from top to bottom. The first protruding edge 3112 and the second protruding edge 3113 may be respectively arranged on the front sidewall and the rear sidewall of the chip supporting groove 3111. The first protruding edge 3112 may protrude backward from the front sidewall of the chip supporting groove 3111, and the second protruding edge 3113 may protrude forward from the rear sidewall of the chip supporting groove 3111.

The first chip 32 may include the storage medium, the electrical contact surface, a substrate 32*b* and the electrical contact part. The electrical contact surface may include the first electrical contact surface 331, the grounding electrical contact surface 332, the third electrical contact surface 333, and the fourth electrical contact surface 334. The storage medium, the electrical contact surface and the chip socket 34 may be all fixedly arranged on the substrate 32*b*, and the storage medium may be electrically connected to the electrical contact surface. The first electrical contact surface 331, the grounding electrical contact surface 332, the third electrical contact surface 333, and the fourth electrical contact surface 334 may be sequentially arranged from right to left with intervals on the upper surface of the substrate 32*b*. The electrical contact surface may be in contact with and electrically connected to the identification terminal, and the grounding electrical contact surface 332 may be configured to be in contact with and electrically connect to the grounding terminal in the identification terminal, such that the grounding electrical contact surface 332 may be grounded.

The chip socket 34 may be electrically connected to the grounding electrical contact surface 332 and fixedly disposed on the lower surface of the substrate 32*b*. The chip socket 34 may be formed by bending a steel sheet as a whole (in other embodiments, may also be formed by integral injection molding of conductive resin). When the substrate 32*b* is installed on the chip supporting groove 3111, the lower surface of the substrate 32*b* may be supported by the upper surfaces of the first protruding edge 3112 and the second protruding edge 3113. The chip socket 34 may be between the first protruding edge 3112 and the second protruding edge 3113 along the front-rear direction. The first locking portion 341 and the second locking portion 342 may be fixedly disposed on the front wall and the rear wall of the chip socket 34, respectively. The first locking portion 341 may be formed by extending obliquely forward and upward from the front wall of the chip socket 34, and the second locking portion 342 may be formed by extending obliquely backward and upward from the rear wall of the chip socket 34. The lower ends of the first locking portion 341 and the second locking portion 342 may be connected to the chip socket 34; and the upper ends of the first locking portion 341 and the second locking portion 342 may be configured to be abutted against the lower surface of the first protruding edge 3112 and the lower surface of the second protruding edge 3113, respectively, such that the movement of the substrate 32*b* may be limited to position the substrate 32*b*, and entire chip may be fixed on the chip supporting groove 3111 to prevent loosening. In other embodiments, the storage medium, the substrate 32*b* and the chip socket 34 may also be arranged at other positions of the developing cartridge 1. An additional wire may only need to be disposed between the storage medium and the electrical contact surface for electrical connection. Similarly, an additional wire may only need to be disposed on the chip socket 34 to be connected to the grounding electrical contact surface 332.

The control assembly may include a movable part 57*a* and a first rotating part 51*a* (i.e., the detected part).

The movable part 57*a* may include a movable pivot portion 571, an extension arm 572, a positioning matching portion 574, and a movable guiding portion 573 which may be formed into a single piece.

A cylindrical movable supporting portion may be fixedly disposed on the first side 11. The movable supporting portion may be formed by extending rightward from the first side 11 in the first direction. The movable pivot portion 571 of the movable part 57*a* may be a cylindrical shape and disposed with a movable hole 5711 extending in the first direction. The movable hole 5711 may be rotatably matched with the movable supporting portion, such that the movable part 57*a* may rotate around the movable supporting portion, and the rotation axis of the movable part 57*a* may extend in the first direction.

The extension arm 572 may extend backward from the circumferential surface of the movable pivot part 571 along the radial direction of the movable pivot part 571. The positioning matching portion 574 may be at the rear end of the extension arm 572, that is, the free end of the extension arm 572. The movable guiding portion 573 may protrude to the right from the right end of the extension arm 572. The upper surface of the movable guiding portion 573 may be a guiding surface 5731. The guiding surface 5731 may be in an arc shape that arches upward (in other embodiments, the guiding surface 5731 may also be configured as an inclined surface, such as tilting from the front lower side to the rear upper side). A maintaining surface 5732 may be also configured on the guiding surface 5731. The maintaining surface 5732 may be formed by being recessed downward from the middle of the guiding surface 5731.

The third main body portion 431 of the intermediate conductive part 43*a* may be sleeved on the movable pivot portion 571, that is, the movable pivot portion 571 may be inserted into the third main body portion 431, thereby supporting the intermediate conductive part 43*a*. The third conductive portion 432 may extend forward from the third main body portion 431 to the second conductive part 42*a* to be in contact with and electrically connected to the second conductive part 42*a*. The movable portion 433 may extend backward to the rear end of the movable part 57*a*. The movable portion 433 may be disposed with an annular movable positioning portion formed by bending. The positioning matching portion 574 may be fixedly disposed at the free end of the extension arm 572 and protrude from left to right. The movable positioning portion may be sleeved on the positioning matching portion 574, such that the movable portion 433 may move with the movement of the movable part 57*a*. The movable part 57*a* may move between the contact position and the separation position, together with the movable portion 433, around the movable supporting portion. When the movable part 57*a* is in the contact position, the movable portion 433 may be in contact with and electrically connected to the lower surface of the conductive extension portion 312. When the movable part 57*a* is in the separation position, the movable portion 433 may not be in contact with the conductive extension portion 312, and the electrical connection may be disconnected; and the movable portion 433 may provide a resetting force for the movable part 57*a* through the intermediate conductive part 43*a*. When the movable part 57*a* moves from the contact position to the separation position, the intermediate conductive part 43*a* may generate elastic deformation, such that the intermediate conductive part 43*a* may make the movable part 57*a* move from the separation position to the contact position.

The first rotating part 51*a* may include a connecting portion 536 and a plate-shaped portion 537 in addition to the toothless gear 535*a*. The connecting portion 536 may be formed by extending from the left end of the toothless gear 535*a* to the left. The plate-shaped portion 537 may be formed by extending from the left end of the connecting portion 536 to the left. The plate-shaped portion 537 may be disposed with the first control protrusion 511*a* and the second control protrusion 512*a*. The first control protrusion 511*a* and the second control protrusion 512*a* may be formed by protruding leftward from the left end surface of the plate-shaped portion 537. The first control protrusion 511*a* and the second control protrusion 512*a* may be symmetrically arranged relative to the rotation axis of the first rotating part 51*a*. The first control protrusion 511*a* and the second control protrusion 512*a* may move by following the first rotating part 51*a*. When the first rotating part 51*a* moves from the engagement state to the disengagement state, the first control protrusion 511*a* and the second control protrusion 512*a* may sequentially contact the guiding surface 5731 to apply downward force to the movable part 57*a*, such that the movable part 57*a* may drive the movable portion 433 to move from the contact position to the separation position twice. Furthermore, when the toothless gear 535*a* finally rotates to the disengagement state, the second control protrusion 512*a* may move to the position of the maintaining surface 5732. Therefore, the outer circumferential surface of the second control protrusion 512*a* may match the concave shape of the maintaining surface 5732, such that the second control protrusion 512*a* may be maintained in the maintaining surface 5732, and the movable part 57*a* may be maintained in the separation position; and the first rotating part 51*a* may be prevented from continuing to rotate under the elastic force of the intermediate conductive part 43*a*.

The diameter of the connecting portion 536 may be less than the diameter of the toothless gear 535*a*, and the diameter of the connecting portion 536 may be than the distance between the first control protrusion 511*a* and the second control protrusion 512*a*. A resetting protrusion 515*a* may be fixedly disposed on the right end surface of the toothless gear 535*a*. The resetting protrusion 515*a* may include the first inclined surface 5151 and the second inclined surface 5152. The first inclined surface 5151 may be at the front size of the second inclined surface 5152. The right ends of the first inclined surface 5151 and the second inclined surface 5152 may intersect to form the tip of the resetting protrusion 515*a*.

The first protective cover 111 may be disposed with the observation opening. At least a portion of the first rotating part 51*a* may be observed through the observation opening. The first protective cover 111 may be also disposed with an elastic arm extending from front to rear. Optionally, the front end of the elastic arm and the first protective cover 111 may be formed into a single piece. The rear end of the elastic arm may be a free end. The rear end of the elastic arm may be disposed with a resetting matching protrusion 1117 protruding from right to left. The resetting matching protrusion 1117 may include the third inclined surface 11171 and the fourth inclined surface 11172. The third inclined surface 11171 may be at the front side of the fourth inclined surface 11172; and the left ends of the third inclined surface 11171 and the fourth inclined surface 11172 may intersect to form the tip of the resetting matching protrusion 1117. The first direction may intersect the first inclined surface 5151, the second inclined surface 5152, the third inclined surface 11171, and the fourth inclined surface 11172. When the first rotating part 51*a* rotates to the disengagement state, the second inclined surface 5152 of the resetting protrusion 515*a* may be abutted against the third inclined surface 11171. Therefore, if the first rotating part 51*a* continues to rotate, the first rotating part 51*a* may need to press the resetting matching protrusion 1117, such that the elastic arm may generate elastic deformation. Therefore, it ensures that the resetting protrusion 515*a* of the first rotating part 51*a* cannot pass over the resetting matching protrusion 1117 when there is no external force, and continued rotation of the first rotating part 51*a* may be limited. During production, since workers need to check the availability of the developing cartridge 1, the workers may rotate the control assembly to confirm whether the developing cartridge 1 is successfully matched with the image-forming apparatus and passes the detection of the image-forming apparatus. When the detection is completed, the first rotating part 51*a* of the control assembly may have moved to the disengagement state. At this point, in order to reduce loss, the developing cartridge 1 that has been tested may be ready for being sold in the market after the resetting operation. During the resetting process, the first rotating part 51*a* may only need to be turned, such that the resetting protrusion 515*a* may overcome the elastic force of the elastic arm under the action of external force and pass over the resetting matching protrusion 1117; and finally, the first inclined surface 5151 and the third inclined surface 11171 may be abutted against each other, and the resetting may be completed. After the resetting is completed, the elastic force of the elastic arm may act on the first inclined surface 5151. In such way, the first rotating part 51*a* may have a slight tendency to rotate. Therefore, when the coupling 21*a* receives the force provided by the image-forming apparatus to rotate, the first rotating part 51*a* may easily enter the engagement state from the non-engagement state with the elastic force provided by the elastic arm and the resetting matching protrusion 1117.

In one embodiment, the transmission assembly may also include an idler gear 56*b* (i.e., the transmission gear). The idler gear 56*b* may include a small diameter gear 562 and a large diameter gear 561 which may be coaxially integrally formed. The large diameter gear 561 may be on the left side of the small diameter gear 56. The large diameter gear 561 may be engaged with the driving gear, and the small diameter gear 562 may be engaged with the toothless gear 535*a*. The large diameter gear 561 may be between the plate-shaped portion 537 and the toothless gear 535*a* in the first direction. Therefore, when the first rotating part 51*a* rotates, the plate-shaped portion 537 may not interfere the idler gear 56*b*. Furthermore, in order to simplify the installation process of the idler gear 56*b* and the first rotating part 51*a*, the plate-shaped portion 537 may be elliptical, such that the idler gear 56*b* may be installed first and then the first rotating part 51*a* may be installed. There is no need to first assemble the first rotating part 51*a* and the idler gear 56*b*, and then install the first rotating part 51*a* and the idler gear 56*b* which are assembled together on the casing 10, thereby simplifying the installation process.

Exemplary Embodiment Twenty Six

Unless otherwise specified, the structure of the developing cartridge 1 of exemplary embodiment twenty six may be same as the structure of the developing cartridge 1 of exemplary embodiment twenty three.

Figure 80:
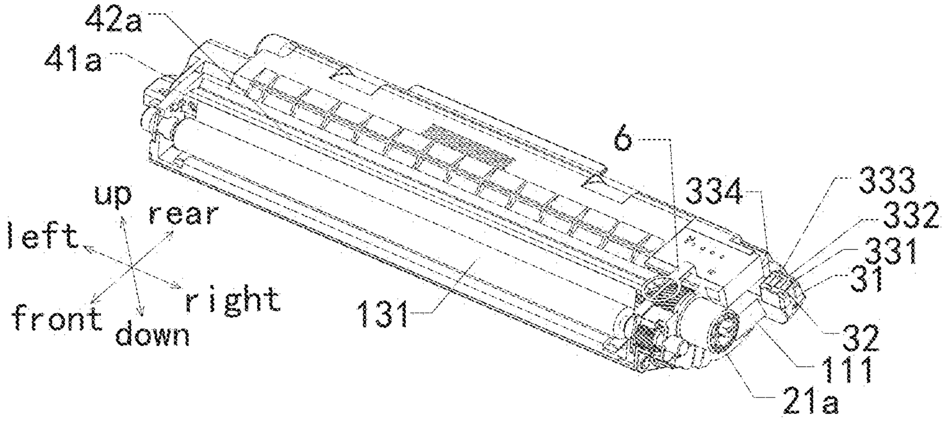
FIG. 80 illustrates a structural schematic of a developing cartridge provided by exemplary embodiment twenty six of the present disclosure.
Figure 81:
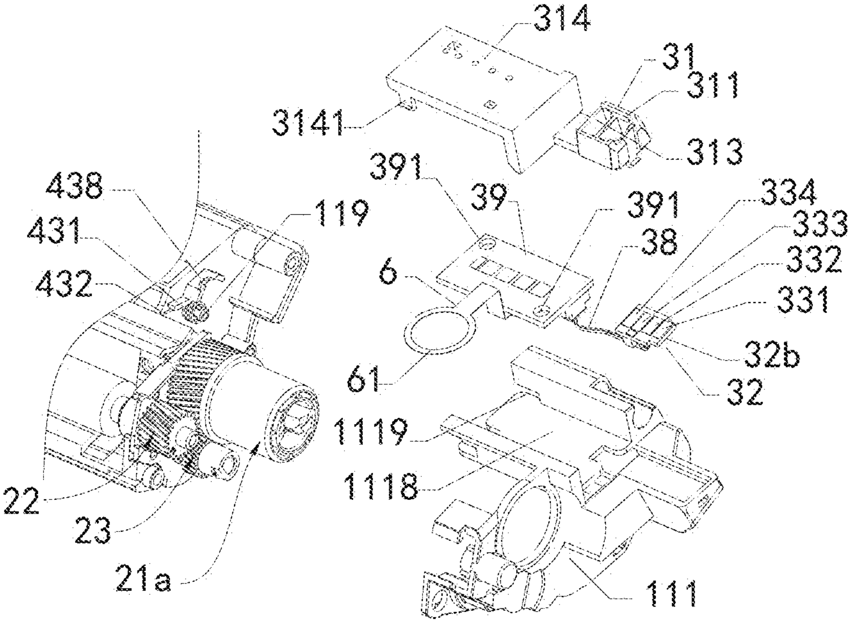
FIG. 81 illustrates an exploded structural view of a first protective cover, a chip holder, a chip, and a second chip provided by exemplary embodiment twenty six of the present disclosure.
Figure 82:
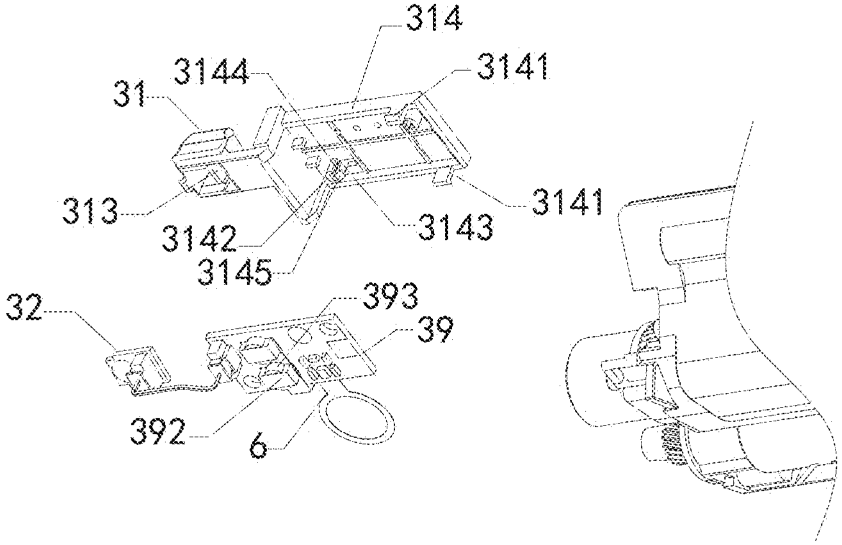
FIG. 82 illustrates another exploded structural view of a first protective cover, a chip holder, a chip, and a second chip provided by exemplary embodiment twenty six of the present disclosure.

As shown in FIGS. 80-82, the difference between exemplary embodiment twenty six and exemplary embodiment twenty three is the following. The intermediate conductive part 43*a* may be a conductive torsion spring. The intermediate conductive part 43*a* may include the third main body portion 431, the third conductive portion 432, and the fourth conductive portion 438 which may be formed into a single piece. The third main body portion 431 may be a hollow cylindrical shape formed by winding steel wires. The third conductive portion 432 may be formed by extending forward from the third main body portion 431. The fourth conductive portion 438 may be formed by extending backward from the third main body portion 431. The first side may be integrally formed with a conductive supporting portion 119 protruding to the right. The conductive supporting portion 119 may be inserted into the third main body portion 431 to support the intermediate conductive part 43*a*. The front end of the third conductive portion 432 may be configured to be abutted against and electrically connected to the layer thickness regulating blade.

In one embodiment, the first chip 32 may include the substrate 32*b*, the storage medium, the first electrical contact surface 331, the grounding electrical contact surface 332, the third electrical contact surface 333, and the fourth electrical contact surface 334. The storage medium, the first electrical contact surface 331, the grounding electrical contact surface 332, the third electrical contact surface 333, and the fourth electrical contact surface 334 may be all fixedly arranged on the substrate 32*b*. The storage medium may be fixedly disposed on the lower surface of the substrate 32*b*. The first electrical contact surface 331, the grounding electrical contact surface 332, the third electrical contact surface 333, and the fourth electrical contact surface 334 may be fixedly arranged on the upper surface of the substrate 32*b*.

The developing cartridge 1 may be also disposed with the second chip 39, and the control module may be disposed on the second chip 39; that is, the second chip 39 may be configured as the control assembly. The fourth conductive portion 438 may be electrically connected to the second chip 39. A wire 38 may be disposed between the second chip 39 and the first chip 32. One end of the wire 38 may be electrically connected to the second chip 39, and another end of the wire 38 may be electrically connected to the grounding electrical contact surface 332 on the first chip 32. A battery installation portion may be disposed on the lower surface of the second chip 39. The number of the battery installation portions may be two. The battery installation portion may be configured to install a battery 393 for providing electricity to the second chip 39. The battery installation portion may include a conductive surface and a maintaining bracket 392 electrically connected to the second chip 39. The conductive surface and the maintaining bracket 392 may be fixedly disposed on the lower surface of the second chip 39. The maintaining bracket 392 may be made of metal. An accommodating space may be formed between the maintaining bracket 392 and the lower surface of the second chip 39. The conductive surface may be disposed in the accommodating space. The conductive surface may be configured to contact the positive electrode of the battery 393. The maintaining bracket 392 may be configured to contact the negative electrode of the battery 393.

The lower surface of the second chip 39 may be fixedly disposed with the seventh electrical contact surface 394 which may be configured to be in contact with and electrically connected to the fourth conductive portion 438.

The second chip 39 may also include an insulating part 6 between the battery 393 and the conductive surface, such that the electrical connection between the battery 393 and the conductive surface may be blocked by the insulating part 6. In one embodiment, the insulating part 6 may be, optionally, a plastic sheet. One end of the insulating part 6 may be inserted between the battery 393 and the conductive surface, and another end of the insulating part 6 may be disposed with a pull ring 61 for the user to pull.

In one embodiment, the second chip 39 may be rectangular; the right front corner and the left rear corner of the second chip 39 may be respectively disposed with installation holes 391; and the installation holes 391 may be circular through holes.

The first side 11 may be also disposed with the first protective cover 111. The first protective cover 111 may be configured to cover the transmission assembly at the first side of the casing to protect the transmission assembly. The first protective cover 111 may be disposed with an installation groove 1118. The installation groove 1118 may be configured to install the chip holder 31.

The chip holder 31 may include a chip supporting portion and a covering portion. The chip supporting portion may be disposed with the chip supporting groove 311 formed by being recessed from top to bottom. A connecting hole 313 may be formed on the bottom surface of the chip supporting groove 311. The wire 38 may be connected to the chip through the connecting hole 313. The covering portion may be formed by extending from the chip supporting portion to the left. The covering portion may be configured to cover the installation groove 1118. The covering portion and the installation groove 1118 may enclose to form an installation space. The second chip 39 may be installed in the installation space and covered by the covering portion, thereby protecting the second chip 39. The covering portion may include a cover plate 314. The cover plate 314 may be formed by extending in the first direction. The cover plate 314 may cover the second chip 39 along the up-down direction. Two downwardly protruding installation columns 3142 may be fixedly disposed on the lower surface of the cover plate 314. The installation columns 3142 and the installation holes 391 may be in a one-to-one correspondence. When viewed from bottom to top, the circumferential surface of the installation column 3142 may be semicircular. A downwardly protruding elastic column 3143 may be also disposed on the cover plate 314 on the side of the installation column 3142. The lower end of the elastic column 3143 may be disposed with an installation protrusion 3144. The installation protrusion 3144 may include an installation inclined surface 3145. The inclination direction of the installation inclined surface 3145 may be configured to be that the end away from the installation column 3142 may be higher than the end adjacent to the installation column 3142. In addition, the distance from the end of the installation inclined surface 3145 away from the installation column 3142 to the center of the circumferential surface of the installation column 3142 may be greater than the radius of the installation hole 391. The distance from the end of the installation inclined surface 3145 away from the installation column 3142 to the center of the circumferential surface of the installation column 3142 may be greater than the distance from the end of the elastic column 3143, away from the installation column 3142 along the radial direction, to the center of the circumferential surface of the installation column 3142. Therefore, a supporting surface may be formed on the installation protrusion 3144 and may protrude radially from the sidewall of the elastic column 3143 along the direction away from the installation column 3142. When the second chip 39 is installed on the cover plate 314, the installation hole 391 may be pressed and aligned with the installation column 3142 and the elastic column 3143, such that the circumferential surface of the installation hole 391 may be in contact with and press the installation inclined surface 3145, and the installation inclined surface 3145 may drive the elastic column 3143 to bend along the direction adjacent to the installation column 3142 and produce elastic deformation. When the installation hole 391 passes through the installation protrusion 3144, the installation inclined surface 3145 may be no longer abutted against the installation hole 391. In such way, the elastic column 3143 may return to its original shape along the direction away from the installation column 3142. Therefore, the supporting surface on the installation protrusion 3144 may be abutted against the lower surface of the second chip 39, thereby supporting the second chip 39 between the supporting surface and the cover plate 314 and completing the positioning of the second chip 39 along the up-down direction.

The installation column 3142 may be in transitional fit with the installation hole 391. Therefore, when the installation column 3142 and the elastic column 3143 are inserted into the installation hole 391 together, the outer circumferential surface of the installation column 3142 may fit with the inner circumferential surface of the installation hole 391, thereby positioning the second chip 39 along the left-right and front-rear directions.

The cover plate 314 may be also fixedly disposed with an installation lock 3141 which may be configured to be engaged with the engaged portion 1119 on the first protective cover 111, such that the cover plate 314 may be fixed relative to the first protective cover 111.

The insulating part 6 may extend from the installation space to the outside, and the pull ring 61*a* may be located outside the installation space, thereby being convenient for the user to pull. Before the user installs the developing cartridge 1 into the image-forming apparatus, the user may pull the pull ring 61*a* out the insulating part 6. Therefore, the battery 393 may be electrically connected to the conductive surface, the battery 393 may provide electricity to the second chip 39, and the second chip 39 may start to operate normally. The structures in above-mentioned embodiments may be used in combination or separately.

Compared with the existing technology, the technical solutions provided by the present disclosure may achieve at least following beneficial effects.

Compared to the exiting technology, for the technical solution provided in the present disclosure, the optical signal or electrical signal and corresponding change needed for the image-forming apparatus to identify the developing cartridge may be disposed on the developing cartridge, such that the structure and function of the developing cartridge may be more desirable; and it may be the developing cartridge can be identified by the image-forming apparatus when relevant functional parts in the image-forming apparatus are damaged.

Above may be only optional embodiments of the present disclosure and may not intended to limit the present disclosure. Through above description, those skilled in the art may make various changes and modifications without deviating from the technical idea of the present disclosure. The technical scope of the present disclosure may be not limited to the contents of the specification. All equivalent changes and modifications of the shapes, structures, features and spirits described in the scope of the present disclosure should be included in the scope of the claims of the present disclosure.

What is claimed is:

1. A developing cartridge, comprising:

a casing including a first side and a second side arranged oppositely in a first direction, and including a third side and a fourth side arranged oppositely in a second direction intersecting the first direction;

a developing roller positioned at the third side and rotatable around a first axis extending in the first direction;

a coupling positioned at the first side for rotation;

a storage medium including an electrical contact surface, the electrical contact surface positioned at the first side;

a light-emitting part capable of emitting light, wherein the light-emitting part is closer to the fourth side than the developing roller in the second direction; and an abutting part positioned at the second side, wherein the electrical contact surface is closer to the developing roller than the abutting part in the second direction.

2. The developing cartridge according to claim 1, further including:

a detected part, wherein the detected part is closer to the first side than the second side and moves according to rotation of the coupling.

3. The developing cartridge according to claim 2, further including:

a power supply part and a switching part, wherein the power supply part and the light-emitting part are electrically connected to each other, and the detected part drives the switching part to move between a conduction position and a disconnection position.

4. The developing cartridge according to claim 3, further including:

a connecting part, the connecting part electrically connected to the power supply part, the light-emitting part and the switching part.

5. The developing cartridge according to claim 3, wherein:

the switching part is closer to the first side than the second side in the first direction.

6. The developing cartridge according to claim 3, further including:

a control unit, the control unit electrically connected to the light-emitting part, the power supply part and the switching part, wherein when the switching part is in the conduction position, the power supply part, the switching part and the control unit are electrically connected to each other; and the control unit controls the light-emitting part to emit light or be turned off.

7. The developing cartridge according to claim 2, wherein:

the detected part is a rotating part capable of being directly or indirectly engaged with the coupling.

8. The developing cartridge according to claim 1, further including:

a control unit, wherein the control unit is electrically connected to an electrode, and the electrode is positioned at the second side.

9. The developing cartridge according to claim 1, wherein:

a range of a distance between the light-emitting part and the first axis is from about 50 mm to about 75 mm in the second direction.

10. The developing cartridge according to claim 1, wherein:

the abutting part is closer to the developing roller than the light-emitting part in the second direction.

11. The developing cartridge according to claim 1, further including: a protective cover, wherein the protective cover holds the light-emitting part, and the abutting part is directly disposed on the protective cover.

* * * * *